(12) United States Patent
Levien et al.

(10) Patent No.: US 9,503,550 B2
(45) Date of Patent: Nov. 22, 2016

(54) MULTI-MODALITY COMMUNICATION MODIFICATION

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 13/374,079

(22) Filed: Dec. 9, 2011

(65) Prior Publication Data

US 2013/0080917 A1 Mar. 28, 2013

Related U.S. Application Data

(63) Continuation-in-part of application No. 13/200,741, filed on Sep. 28, 2011, and a continuation-in-part of application No. 13/200,805, filed on Sep. 30, 2011, and a continuation-in-part of application No.

(Continued)

(51) Int. Cl.
*G06F 15/16* (2006.01)
*H04L 29/08* (2006.01)

(52) U.S. Cl.
CPC .................................. *H04L 67/36* (2013.01)

(58) Field of Classification Search
CPC ....... H04L 12/66; H04L 29/06; H04L 51/24; H04L 51/38; H04L 67/04; H04L 67/2823; H04L 67/2842; H04L 67/2895; H04L 67/306; H04L 69/329; H04L 67/18; H04L 29/06027; H04L 51/043; H04L 51/066; H04L 12/1813; H04L 12/1827; H04L 12/585; H04L 12/587; H04L 12/589; H04L 29/06523; H04L 29/12009; H04M 2201/38; H04M 2203/254; H04M 2203/651; H04M 3/42382; H04M 3/493
USPC ........................................................ 709/204
See application file for complete search history.

(56) References Cited

U.S. PATENT DOCUMENTS

| | | | |
|---|---|---|---|
| 5,280,521 | A | 1/1994 | Itoh |
| 5,710,806 | A | 1/1998 | Lee et al. |
| 5,724,410 | A | 3/1998 | Parvulescu et al. |
| 6,249,808 | B1 | 6/2001 | Seshadri |
| 6,259,706 | B1 | 7/2001 | Shimada |
| 6,301,338 | B1 | 10/2001 | Mäkelä et al. |
| 6,366,651 | B1 | 4/2002 | Griffith et al. |

(Continued)

OTHER PUBLICATIONS

"Apache Wave;" Wikipedia, Sep. 24, 2011, pp. 1-6; located at: http://en.wikipedia.org/wiki/Apache_Wave.

(Continued)

*Primary Examiner* — Monica C King

(57) ABSTRACT

Disclosed herein are example embodiments for multi-modality communication modification. By way of example but not limitation, a communication device may interact with a user for a first portion of a communication in a manner corresponding to a first communication modality in accordance with at least one intimacy setting. A communication device may further discern at least one modification to at least one user interaction communication modality of at least one intimacy setting and interact with a user for a second portion of a communication in a manner corresponding to a second communication modality in accordance with the at least one intimacy setting responsive at least partly to the at least one modification.

33 Claims, 21 Drawing Sheets

Related U.S. Application Data

13/200,804, filed on Sep. 30, 2011, and a continuation-in-part of application No. 13/317,985, filed on Oct. 31, 2011, and a continuation-in-part of application No. 13/317,983, filed on Oct. 31, 2011, and a continuation-in-part of application No. 13/317,987, filed on Oct. 31, 2011, and a continuation-in-part of application No. 13/373,643, filed on Nov. 21, 2011, and a continuation-in-part of application No. 13/373,824, filed on Nov. 30, 2011.

(56) References Cited

U.S. PATENT DOCUMENTS

| | | |
|---|---|---|
| 6,504,910 B1 | 1/2003 | Engelke et al. |
| 6,701,162 B1 | 3/2004 | Everett |
| 6,742,059 B1* | 5/2004 | Todd et al. .............. 710/19 |
| 6,954,781 B2 | 10/2005 | Bhattacharya |
| 7,076,255 B2 | 7/2006 | Parupudi et al. |
| 7,103,349 B2 | 9/2006 | Himanen et al. |
| 7,133,899 B2 | 11/2006 | Rowe |
| 7,184,786 B2 | 2/2007 | Mumick et al. |
| 7,359,492 B2 | 4/2008 | Myers et al. |
| 7,428,580 B2 | 9/2008 | Hullfish et al. |
| 7,496,625 B1 | 2/2009 | Belcher et al. |
| 7,523,226 B2 | 4/2009 | Anderson et al. |
| 7,551,583 B1 | 6/2009 | Gazzard |
| 7,555,521 B1 | 6/2009 | McLaughlin et al. |
| 7,702,792 B2 | 4/2010 | Shaffer et al. |
| 7,725,116 B2 | 5/2010 | Mumick et al. |
| 7,733,903 B2 | 6/2010 | Bhogal et al. |
| 7,814,160 B2 | 10/2010 | Burtner et al. |
| 7,912,187 B1 | 3/2011 | Mikan et al. |
| 7,921,158 B2 | 4/2011 | Mandalia et al. |
| 7,983,706 B2 | 7/2011 | Wolter |
| 8,041,025 B2 | 10/2011 | Dolph et al. |
| 8,260,332 B2* | 9/2012 | Reunamäki .............. 455/466 |
| 8,315,361 B1 | 11/2012 | Becker et al. |
| 2001/0033639 A1 | 10/2001 | Martin |
| 2002/0046262 A1 | 4/2002 | Heilig et al. |
| 2002/0055350 A1 | 5/2002 | Gupte et al. |
| 2002/0077830 A1 | 6/2002 | Suomela et al. |
| 2002/0169610 A1 | 11/2002 | Luegger |
| 2003/0028601 A1 | 2/2003 | Rowe |
| 2003/0064716 A1 | 4/2003 | Gailey et al. |
| 2003/0069997 A1* | 4/2003 | Bravin et al. .............. 709/250 |
| 2003/0081739 A1 | 5/2003 | Hikishima |
| 2003/0125952 A1 | 7/2003 | Engelke et al. |
| 2003/0174155 A1 | 9/2003 | Weng et al. |
| 2004/0015504 A1 | 1/2004 | Ahad et al. |
| 2004/0015547 A1 | 1/2004 | Griffin et al. |
| 2004/0034531 A1 | 2/2004 | Chou et al. |
| 2004/0034690 A1 | 2/2004 | Schmitz et al. |
| 2004/0057562 A1 | 3/2004 | Myers et al. |
| 2004/0082317 A1 | 4/2004 | Graefen |
| 2004/0117804 A1 | 6/2004 | Scahill et al. |
| 2004/0139157 A1 | 7/2004 | Neely, III et al. |
| 2004/0203708 A1 | 10/2004 | Khan et al. |
| 2004/0267527 A1 | 12/2004 | Creamer et al. |
| 2004/0268265 A1 | 12/2004 | Berger |
| 2005/0021868 A1 | 1/2005 | Sharma et al. |
| 2005/0049879 A1* | 3/2005 | Audu et al. .............. 704/277 |
| 2005/0135595 A1 | 6/2005 | Bushey et al. |
| 2005/0136955 A1 | 6/2005 | Mumick et al. |
| 2005/0198096 A1 | 9/2005 | Shaffer et al. |
| 2005/0250550 A1 | 11/2005 | Fields |
| 2005/0255837 A1* | 11/2005 | Kwon .............. 455/414.4 |
| 2006/0052127 A1 | 3/2006 | Wolter |
| 2006/0066717 A1 | 3/2006 | Miceli |
| 2006/0104293 A1 | 5/2006 | Kopp et al. |
| 2006/0159099 A1 | 7/2006 | Hensley |
| 2006/0168095 A1 | 7/2006 | Sharma et al. |
| 2006/0189333 A1 | 8/2006 | Othmer |
| 2006/0217159 A1* | 9/2006 | Watson .............. 455/563 |
| 2006/0224623 A1 | 10/2006 | Graziadio et al. |
| 2006/0293888 A1 | 12/2006 | Jindal |
| 2007/0005366 A1 | 1/2007 | Sravanapudi et al. |
| 2007/0082686 A1 | 4/2007 | Mumick et al. |
| 2007/0192418 A1 | 8/2007 | Adams et al. |
| 2007/0203987 A1 | 8/2007 | Amis |
| 2007/0238474 A1* | 10/2007 | Ballas et al. .............. 455/466 |
| 2007/0260984 A1 | 11/2007 | Marks et al. |
| 2008/0057925 A1 | 3/2008 | Ansari |
| 2008/0068671 A1 | 3/2008 | Yoshida et al. |
| 2008/0095332 A1 | 4/2008 | Myers et al. |
| 2008/0119137 A1 | 5/2008 | Lee |
| 2008/0148154 A1 | 6/2008 | Burrell et al. |
| 2008/0192736 A1 | 8/2008 | Jabri et al. |
| 2008/0232248 A1 | 9/2008 | Barave et al. |
| 2008/0248818 A1 | 10/2008 | Venkatesulu et al. |
| 2009/0028306 A1 | 1/2009 | Rhie |
| 2009/0037170 A1 | 2/2009 | Williams |
| 2009/0135741 A1* | 5/2009 | Mykhalchuk et al. ....... 370/260 |
| 2009/0150574 A1 | 6/2009 | Kawahara et al. |
| 2009/0186636 A1 | 7/2009 | Salonen |
| 2009/0216840 A1 | 8/2009 | Pajunen et al. |
| 2009/0238346 A1 | 9/2009 | Toutain et al. |
| 2009/0276539 A1 | 11/2009 | Huerta et al. |
| 2009/0279455 A1 | 11/2009 | Wang et al. |
| 2009/0290691 A1 | 11/2009 | Salonen |
| 2009/0319918 A1 | 12/2009 | Affronti et al. |
| 2009/0325546 A1 | 12/2009 | Reddy et al. |
| 2010/0011069 A1 | 1/2010 | Haruna et al. |
| 2010/0030557 A1* | 2/2010 | Molloy et al. .............. 704/235 |
| 2010/0053212 A1 | 3/2010 | Kang et al. |
| 2010/0057466 A1 | 3/2010 | Garg et al. |
| 2010/0100809 A1 | 4/2010 | Thomas et al. |
| 2010/0150333 A1 | 6/2010 | Goodman et al. |
| 2010/0169096 A1 | 7/2010 | Lv et al. |
| 2010/0174421 A1 | 7/2010 | Tsai et al. |
| 2010/0191590 A1 | 7/2010 | Hakkarainen et al. |
| 2010/0211389 A1 | 8/2010 | Marquardt |
| 2010/0211695 A1* | 8/2010 | Steinmetz et al. .......... 709/242 |
| 2010/0239081 A1 | 9/2010 | Krantz et al. |
| 2010/0251124 A1 | 9/2010 | Geppert et al. |
| 2010/0269134 A1 | 10/2010 | Storan et al. |
| 2010/0322395 A1 | 12/2010 | Michaelis et al. |
| 2011/0028168 A1 | 2/2011 | Champlin et al. |
| 2011/0038512 A1 | 2/2011 | Petrou et al. |
| 2011/0105087 A1 | 5/2011 | Toebes et al. |
| 2011/0116610 A1 | 5/2011 | Shaw et al. |
| 2011/0130168 A1 | 6/2011 | Vendrow et al. |
| 2011/0170675 A1 | 7/2011 | Mikan et al. |
| 2011/0177800 A1 | 7/2011 | Gilson |
| 2011/0179180 A1 | 7/2011 | Schleifer et al. |
| 2011/0211679 A1 | 9/2011 | Mezhibovsky et al. |
| 2011/0212737 A1 | 9/2011 | Isidore |
| 2011/0270613 A1 | 11/2011 | Da Palma et al. |
| 2011/0294525 A1 | 12/2011 | Jonsson |
| 2012/0034904 A1 | 2/2012 | LeBeau et al. |
| 2012/0077526 A1 | 3/2012 | Riffe |
| 2012/0096095 A1* | 4/2012 | Bhargava .............. 709/206 |
| 2012/0237009 A1 | 9/2012 | Szpilfogel |
| 2013/0040660 A1 | 2/2013 | Fisher et al. |
| 2013/0079061 A1 | 3/2013 | Jadhav et al. |
| 2013/0158988 A1 | 6/2013 | Katis et al. |

OTHER PUBLICATIONS

"Telecommunications device for the deaf;" Wikipedia, Sep. 25, 2011, pp. 1-8; located at: http://en.wikipedia.org/wiki/Telecommunications_device_for_the_deaf.

"Google Wave Federation Protocol," Wikipedia, Sep. 24, 2011, pp. 1-3; located at: http://en.wikipedia.org/wiki/Google_Wave_Federation_Protocol.

"Interactive voice response," Wikipedia, Sep. 25, 2011, pp. 1-8; located at: http://en.wikipedia.org/wiki/Interactive_voice_response.

Brown, D.M.; "How to Make a Phone Call Using Text to Speech Software;" eHow.com, pp. 1-2; located at: http://www.ehow.com/print/how_6075364_make-using-text-speech-software.html.

\* cited by examiner

MULTI-MODALITY COMMUNICATION MODIFICATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:

the present application constitutes a continuation-in-part of U.S. patent application Ser. No. 13/200,741, entitled "MULTI-MODALITY COMMUNICATION", naming Royce A. Levien, Richard T. Lord, Robert W. Lord, Mark A. Malamud, John D. Rinaldo Jr. as inventors, filed 28 Sep. 2011, which is currently co-pending, or is an application of which a currently co-pending application is entitled to the benefit of the filing date;

the present application constitutes a continuation-in-part of U.S. patent application Ser. No. 13/200,805, entitled "MULTI-MODALITY COMMUNICATION PARTICIPATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/200,804, entitled "USER INTERFACE FOR MULTI-MODALITY COMMUNICATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/317,985, entitled "MULTI-MODALITY COMMUNICATION WITH CONVERSION OFFLOADING", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/317,983, entitled "MULTI-MODALITY COMMUNICATION WITH INTERCEPTIVE CONVERSION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/317,987, entitled "MULTI-MODALITY COMMUNICATION INITIATION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/373,643, entitled "MULTI-MODALITY COMMUNICATION AUTO-ACTIVATION", naming Royce A. Levien, Richard T. Lord, Robert W. Lord, Mark A. Malamud, John D. Rinaldo Jr. as inventors, filed 21 Nov. 2011, which is currently co-pending, or is an application of which a currently co-pending application is entitled to the benefit of the filing date; and the present application constitutes a continuation-in-part of U.S. patent application Ser. No. 13/373,824, entitled "MULTI-MODALITY COMMUNICATION NETWORK AUTO-ACTIVATION", naming Royce A. Levien, Richard T. Lord, Robert W. Lord, Mark A. Malamud, John D. Rinaldo Jr. as inventors, filed $30^{th}$ Nov. 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

DETAILED DESCRIPTION

Figure 1:
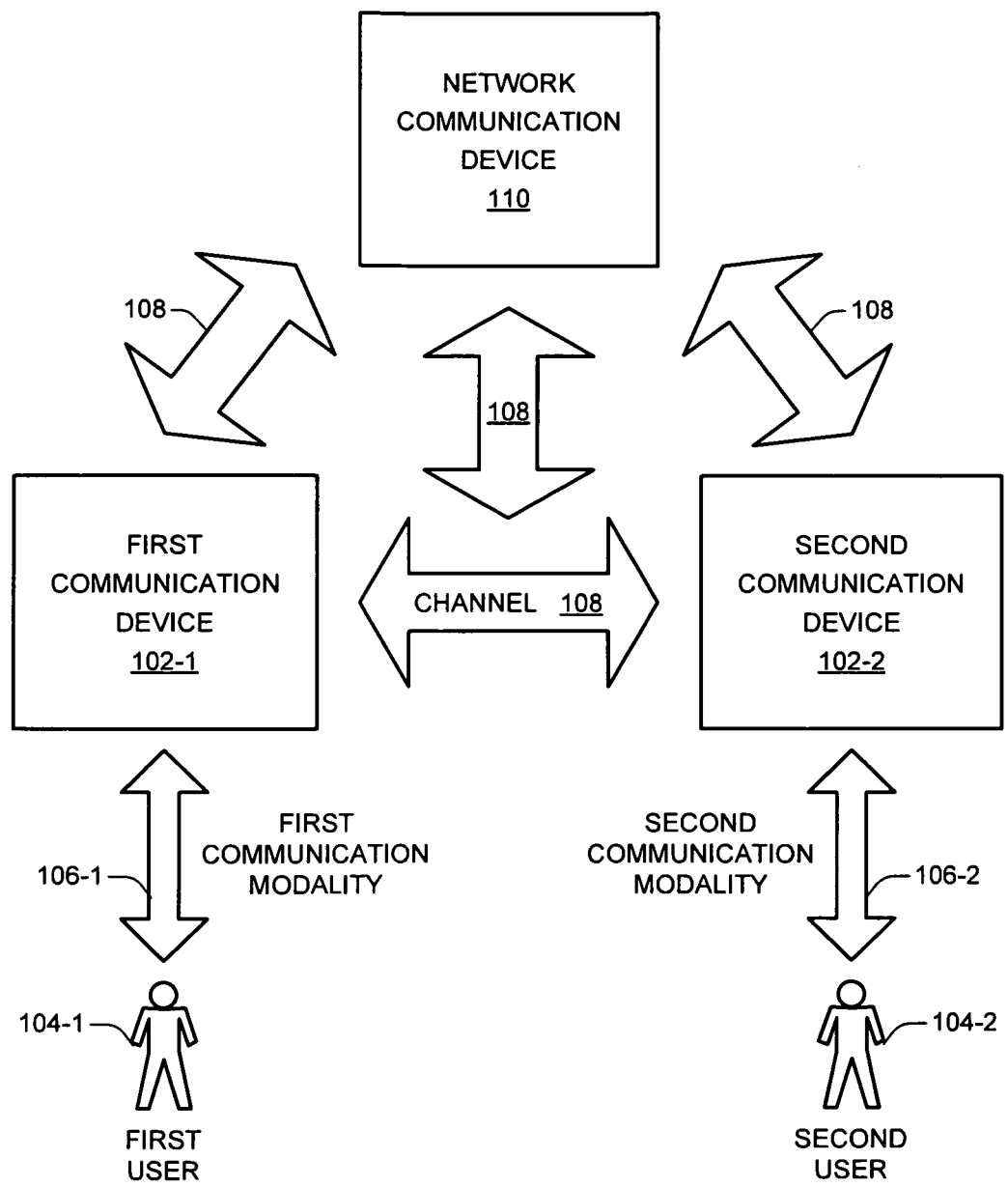
FIG. 1 is a schematic diagram of a network communication device and two communication devices that may participate in an example communication in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a network communication device and two communication devices that may participate in an example communication in accordance with certain example embodiments. As shown in FIG. 1, by way of example but not limitation, schematic diagram 100 may include communication devices 102, users 104, communication modalities 106, at least one channel 108, or at least one network communication device 110. More specifically, schematic diagram 100 may include a first communication device 102-1, a first user 104-1, a first communication modality 106-1, a second communication device 102-2, a second user 104-2, a second communication modality 106-2, one or more channels 108, or at least one network communication device 110.

For certain example embodiments, a user 104 may be associated with at least one communication device 102. A user 104 may be interacting with a communication device 102 via at least one communication modality 106. Communication devices 102 may comprise, by way of example but not limitation, a mobile phone, a mobile terminal, a laptop or notebook computer, a personal digital assistant (PDA), a netbook, an entertainment appliance (e.g., a television, a gaming console, a set-top box, a music player, some combination thereof, etc.), a smart phone, a portable gaming device, a user equipment, a tablet or slate computer, a home phone, a desktop computer, a personal navigation device (PND), a vehicle with user-accessible communication capabilities, a private branch exchange (PBX)-based phone, videoconferencing equipment, any combination thereof, and so forth. A user 104 may comprise, by way of example only, at least one person. Example communication modalities 106 may include, by way of example but not limitation, a textual communication modality (e.g., wherein text may be communicated such as via a text message), a vocal communication modality (e.g., wherein sounds may be communicated such as via a voice call or teleconference), a visual communication modality (e.g., wherein moving images may be communicated such as via a video call or video conference), any combination thereof, and so forth.

For certain example embodiments, first user 104-1 may be associated with first communication device 102-1. First user 104-1 may be interacting with first communication device 102-1 via at least one first communication modality 106-1. Second user 104-2 may be associated with second communication device 102-2. Second user 104-2 may be interacting with second communication device 102-2 via at least one second communication modality 106-2. First communication device 102-1 or first user 104-1 may be participating in at least one communication (not explicitly shown in FIG. 1) with second communication device 102-2 or second user 104-2 via one or more channels 108. A communication may comprise, by way of example but not limitation, a transmission of data, a reception of data, an exchange of data, a flow of data (e.g., between or among two or more endpoints), any combination thereof, and so forth.

For certain example embodiments, a channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, at least part of an internet backbone, at least part of a satellite network, at least part of a fibre network, multiple instances of any of the above, any combination of the above, and so forth. A channel 108 may include one or more nodes (e.g., a telecommunication node, an access point, a base station, an internet server, a gateway, an internet or telecommunication switch, any combination thereof, etc.) through which signals are propagated. A network communication device 110 may comprise, by way of example but not limitation, at least one node through which signals are propagated for a communication that includes a first communication device 102-1 or a second communication device 102-2. A network communication device 110 may communicate with first communication device 102-1 or second communication device 102-2 using any one or more of multiple channels 108, a few examples of which are illustrated in schematic diagram 100.

For certain example implementations, a communication may be initiated by first communication device 102-1, first user 104-1, second communication device 102-2, second user 104-2, any combination thereof, and so forth. For certain example implementations, first communication modality 106-1 may comprise at least one different communication modality from second communication modality 106-2. Furthermore, for certain example implementations, first communication modality 106-1 or second communication modality 106-2 may change from one communication modality to another communication modality during a single communication, across different communications, and so forth. Additionally or alternatively, another (e.g., different) communication modality may be referred to herein as a "third communication modality" or a "fourth communication modality", for example.

Moreover, it should be understood that the terms "first" or "second" may, depending on context, be a matter of perspective. For instance, a communication device 102 or a user 104 or a communication modality 106 may be considered a first one at a given moment, for a given communication, from a given perspective, etc. but may be considered a second one at a different moment, for a different communication, from a different perspective, etc. However, one of ordinary skill in the art will recognize that the term "first" or "second" (or "third" or "fourth" etc.) may serve, depending on context, to indicate that different interactions, acts, operations, functionality, a combination thereof, etc. may be occurring at, may be more closely associated with, a combination thereof etc. one side, aspect, location, combination thereof, etc. of a particular communication as compared to another side, aspect, location, combination thereof, etc. of the particular communication. For example, one signal including data may be transmitted from a first communication device 102-1 and received at a second communication device 102-2, or another signal including data may be transmitted from a second communication device 102-2 and received at a first communication device 102-1.

Figure 2:
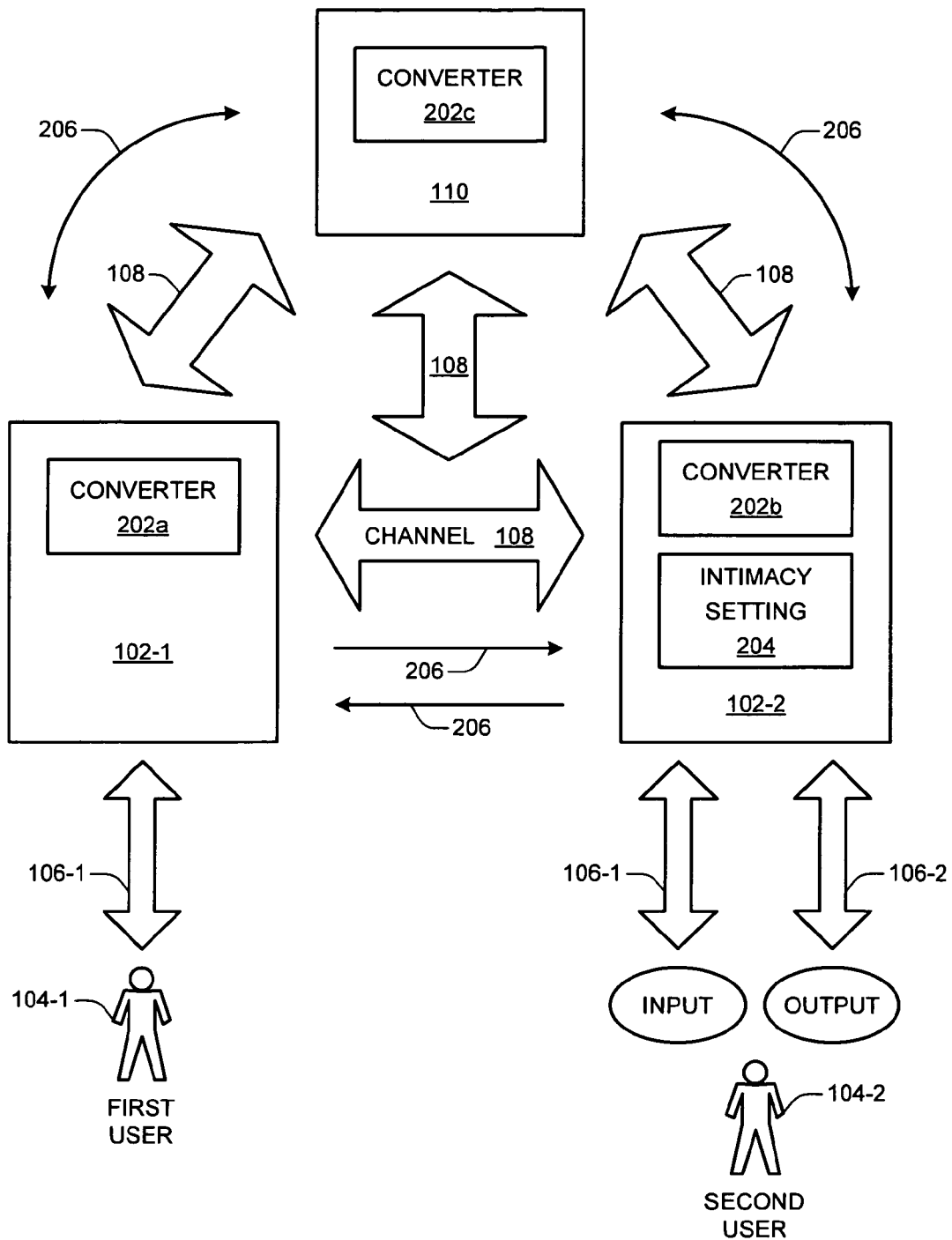
FIG. 2 is a schematic diagram of communication devices that may be involved in a communication relating to at least two communication modalities or one or more converters responsive to at least one example intimacy setting in accordance with certain example embodiments.

FIG. 2 is a schematic diagram 200 of communication devices that may be involved in a communication relating to at least two communication modalities or one or more converters responsive to at least one example intimacy setting in accordance with certain example embodiments. As shown in FIG. 2, by way of example but not limitation, schematic diagram 200 may include communication devices 102, users 104, communication modalities 106, at least one channel 108, at least one network communication device 110, or one or more signals 206. More specifically, schematic diagram 200 may include a first communication device 102-1, a first user 104-1, a first communication modality 106-1, a second communication device 102-2, a second user 104-2, a second communication modality 106-2, one or more channels 108, at least one network communication device 110, or one or more signals 206. Furthermore, one or more of first communication device 102-1, second communication device 102-2, or network communication device 110 may include at least one converter 202 (e.g., a converter 202a, a converter 202b, or a converter 202c, respectively). Additionally or alternatively, at least second communication device 102-2 may include (e.g., store, establish, have access to, a combination thereof, etc.) at least one intimacy setting 204.

For certain example embodiments, first user 104-1 may be associated with first communication device 102-1. First user 104-1 may be interacting with first communication device 102-1 via at least one first communication modality 106-1. Second user 104-2 may be associated with second communication device 102-2. Second user 104-2 may be interacting with second communication device 102-2 via at least one second communication modality 106-2. Additionally or alternatively, second user 104-2 may be interacting with second communication device 102-2 via at least one first communication modality 106-1. As described further herein below, at least one user 104 for at least one side of a communication may be engaged in a multi-modality communication by interacting with an associated communication device 102 using two or more communication modalities 106, such as a first communication modality 106-1 and a second communication modality 106-2. First communication modality 106-1 may differ from second communication modality 106-2. First communication device 102-1 or first user 104-1 may be participating in at least one communication with second communication device 102-2 or second user 104-2 via one or more signals 206, a few examples of which are shown in FIG. 2. Signals 206 may propagate via one or more channels 108. Signals 206, by way of example but not limitation, may comprise, electrical signals, magnetic signals, electromagnetic signals, photonic signals, wireless signals, wired signals, multiples ones thereof, any combination thereof, and so forth.

For certain example embodiments, a second communication device 102-2 may receive one or more signals 206 corresponding to a first communication modality 106-1. A second communication device 102-2 may respond to one or more received signals 206 corresponding to first communication modality 106-1 based at least partly on second user 104-2 interaction via a second communication modality 106-2 in accordance with at least one intimacy setting 204. By way of example but not limitation, at least one intimacy setting 204 may indicate what kind or kinds of one or more communication modalities 106 a user 104 is willing to expose for at least one communication.

For certain example embodiments, at least one intimacy setting 204 may indicate how a user 104 is to interact with a communication device 102 with respect to a given communication without condition (e.g., a user may limit any current communications to text, to voice, to video, etc.). Additionally or alternatively, at least one intimacy setting 204 may indicate how a user 104 is to interact with a communication device with respect to a given communication on a conditional basis. By way of example only, a user 104 may indicate a communication modality (e.g., as represented by at least one intimacy setting 204) in at least partial dependence on whether an associated communication device 102 initiated a communication or terminated a communication. For instance, at least one intimacy setting 204 may indicate that communications are to be initiated using an interaction in accordance with a voice communication modality, but the at least one intimacy setting 204 may indicate that communications are to be terminated (e.g., accepted, received, a combination thereof, etc.) using a textual communication modality.

As another example of a conditional intimacy setting 204, a second user 104-2 may indicate a second communication modality 106-2 in at least partial dependence on a first communication modality 106-1. For instance, at least one intimacy setting 204 may indicate that if a first communication modality 106-1 corresponds to text, a second communication modality 106-2 is also to correspond to text; furthermore, the at least one intimacy setting 204 may indicate that if a first communication modality 106-1 corresponds to voice, a second communication modality 106-2 is to correspond to text; moreover, the at least one intimacy setting 204 may indicate that if a first communication modality 106-1 corresponds to video, a second communication modality 106-2 is to correspond to voice. Additionally or alternatively, a second user 104-2 may indicate a second communication modality 106-2 that is based at least partially on: an identity of a first user 104-1; a time of day, day of week, a combination thereof, etc.; an environmental condition (e.g., an ambient lighting level, a level or type of movement—e.g. vehicle motion may be detected, a combination thereof, etc.) detectable by sensor(s) or otherwise determinable by a device; a calendar; any combination thereof; and so forth. However, claimed subject matter is not limited to any particular examples.

For certain example embodiments, a user 104 may interact with a single device (or multiple devices) for a single communication using one communication modality 106. Additionally or alternatively, a user 104 may interact with a single device (or multiple devices) for a single communication using two or more communication modalities 106. For certain example implementations, and as illustrated with respect to second communication device 102-2 in schematic diagram 200, a second user 104-2 may interact with input features of second communication device 102-2 in accordance with a first communication modality 106-1 and may interact with output features of second communication device 102-2 in accordance with a second communication modality 106-2. For instance, if first communication modality 106-1 comprises voice interaction, second communication modality 106-2 may comprise textual interaction. In such an instance, first user 104-1 may interact with first communication device 102-1 using voice (e.g., for both input and output) for a voice call initiated at first communication device 102-1, and second user 104-2 may interact with second communication device 102-2 using voice with respect to input features of second communication device 102-2 (e.g., second user 104-2 may speak into a microphone to input vocal sounds). However, with respect to output features of second communication device 102-2, second user 104-2 may interact with second communication device 102-2 using text. Second communication device 102-2 may, for example, display text on a screen (e.g., a LCD or LED screen) or a projection surface for the data that corresponds to vocal input from first user 104-1 at first communication device 102-1. To provide a textual version for display of voice input data, voice data may be converted to text data (e.g., at a converter).

For certain example embodiments, communication data (e.g., video data, voice data, text data, a combination thereof, etc.) may be converted from corresponding to one type of communication modality 106 to corresponding to another type of communication modality 106 by at least one converter 202. For certain example implementations, a converter 202 may perform a conversion of a correspondence with one communication modality 106 to a correspondence with another communication modality 106. By way of example but not limitation, a converter 202 may perform a conversion (e.g., of signals) from a correspondence with a first communication modality 106-1 to a correspondence with a second communication modality 106-2, may perform a conversion (e.g., of signals) from a correspondence with a second communication modality 106-2 to a correspondence with a first communication modality 106-1, some combination thereof, and so forth. By way of example only, a converter 202 may convert voice data to text data, text data to video data, text data to voice data, voice data to video data, any combination thereof, and so forth. A given multi-modality communication may be subject to one or more conversions by one or more converters 202.

For certain example embodiments, a device may include (e.g., comprise at least a portion of, have access to, implement, realize, execute, a combination thereof, etc.) at least one converter 202. As shown in schematic diagram 200, but by way of example only, a first communication device 102-1 may include a converter 202a, a second communication device 102-2 may include a converter 202b, or a network communication device 110 may include a converter 202c. Additional or alternative implementations are described herein. One or more converters 202 may be employed in different communication path or conversion scenarios.

FIGS. 3A-3H are schematic diagrams illustrating different communication path or conversion scenarios 300A-300H for different example communications in accordance with certain example embodiments. As illustrated, each schematic diagram includes at least one conversion 302 or at least one communication path 304. By way of example but not limitation, a conversion 302 may comprise a conversion of data from corresponding to one communication modality to corresponding to another communication modality. By way of example but not limitation, a communication path 304 may comprise a path in which one or more signals (e.g., one or more signals 206) that include data (e.g., text data, voice data, video data, a combination thereof, etc.) traverse between two or more devices via one or more channels 108 (e.g., of FIGS. 1 and 2). Although not explicitly illustrated in FIGS. 3A-3H for the sake of visual clarity, a first user 104-1, a second user 104-2, a first communication modality 106-1, and a second communication modality 106-2 (e.g., each of FIGS. 1 and 2) are referred to herein below with regard to one or more of example scenarios 300A-300H.

Figure 3A:
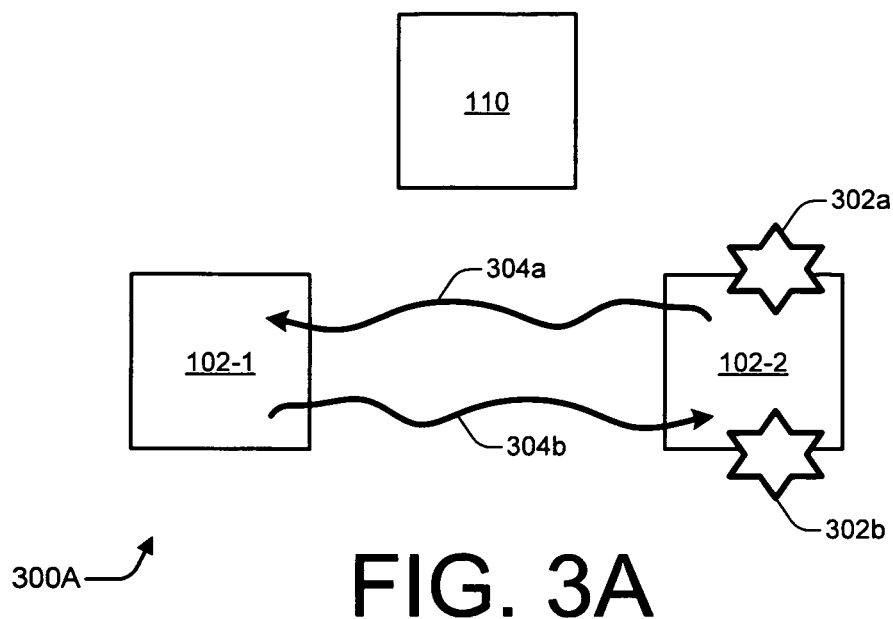
FIGS. 3A-3H are schematic diagrams illustrating different communication path or conversion scenarios for different example communications in accordance with certain example embodiments.

For certain example embodiments, with regard to example scenario 300A of FIG. 3A, a conversion 302a or a conversion 302b may be performed at a second communication device 102-2. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction (e.g., video, voice, text, a combination thereof, etc.) at second communication device 102-2 in accordance with second communication modality 106-2. Data corresponding to second communication modality 106-2 may be converted to data corresponding to first communication modality 106-1 via conversion 302a. Data corresponding to first communication modality 106-1 may be transmitted from second communication device 102-2 or received at first communication device 102-1 via communication path 304a.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304b. At conversion 302b, data corresponding to first communication modality 106-1 may be converted to data corresponding to second communication modality 106-2. Second communication device 102-2 may present data corresponding to second communication modality 106-2 as user output to second user 104-2. By way of example only, first communication modality 106-1 may comprise voice interaction, and second communication modality 106-2 may comprise text interaction. With conversion 302a or conversion 302b, first user 104-1 may interact with first communication device 102-1 via voice, and second user 104-2 may interact with second communication device 102-2 via text.

Figure 3B:
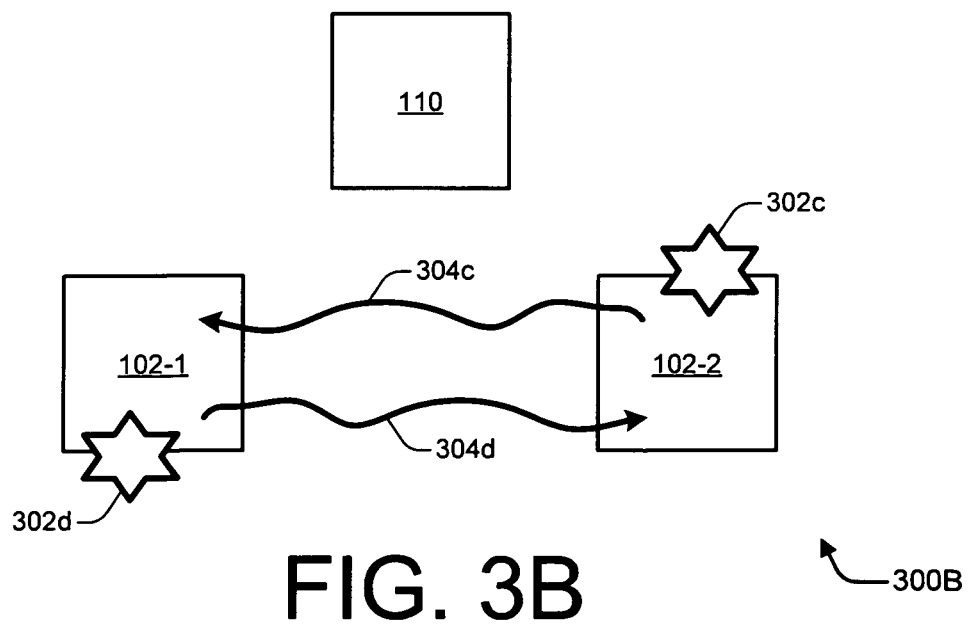

For certain example embodiments, with regard to example scenario 300B of FIG. 3B, a conversion 302c may be performed at a second communication device 102-2, or a conversion 302d may be performed at a first communication device 102-1. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction at second communication device 102-2 in accordance with second communication modality 106-2. Data corresponding to second communication modality 106-2 may be converted to data corresponding to first communication modality 106-1 via conversion 302*c*. Data corresponding to first communication modality 106-1 may be transmitted from second communication device 102-2 or received at first communication device 102-1 via communication path 304*c*.

For certain example implementations, first communication device 102-1 may present data corresponding to first communication modality 106-1 to first user 104-1 as user output. First communication device 102-1 may accept user input to acquire data corresponding to first communication modality 106-1. At conversion 302*d*, data corresponding to first communication modality 106-1 may be converted to data corresponding to second communication modality 106-2. First communication device 102-1 may transmit or second communication device 102-2 may receive data corresponding to second communication modality 106-2 via communication path 304*d*. Second communication device 102-2 may present data corresponding to second communication modality 106-2 as user output to second user 104-2. By way of example only, first communication modality 106-1 may comprise text interaction, and second communication modality 106-2 may comprise voice interaction. With conversion 302*c* or conversion 302*d*, first user 104-1 may interact with first communication device 102-1 via text, and second user 104-2 may interact with second communication device 102-2 via voice, with conversions 302*c* and 302*d* being performed prior to transmission on both sides of a communication or at a device that receives user input data that is to be converted. A given communication device 102 may have expertise at converting user input data from a frequent user of the given communication device 102 (e.g., by using recorded sound samples—for conversion of text to voice, vocal training samples—for converting voice to text, a combination thereof, etc.). Alternatively, conversion 302*c* or conversion 302*d* may be performed on received data after transmission on one side or on two sides of a communication.

Figure 3C:
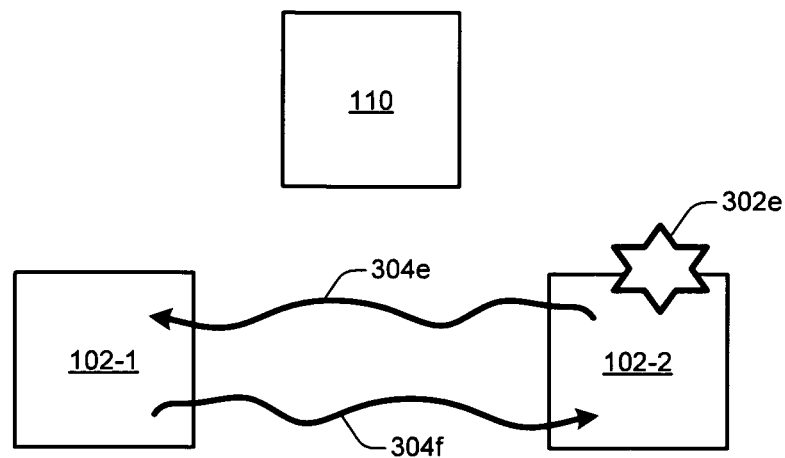

For certain example embodiments, with regard to example scenario 300C of FIG. 3C, a conversion 302*e* may be performed at a second communication device 102-2. For certain example implementations, a first user 104-1 may interact with a first communication device 102-1 in accordance with a first communication modality 106-1, or a second user 104-2 may interact with second communication device 102-2 in accordance with a second communication modality 106-2 for user input interaction and in accordance with first communication modality 106-1 for user output interaction. Second user 104-2 may provide user input interaction at second communication device 102-2 in accordance with second communication modality 106-2. Data corresponding to second communication modality 106-2 may be converted to data corresponding to first communication modality 106-1 via conversion 302*e*. Data corresponding to first communication modality 106-1 may be transmitted from second communication device 102-2 or received at first communication device 102-1 via communication path 304*e*.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304*f*. Second communication device 102-2 may present data corresponding to first communication modality 106-1 as user output to second user 104-2. By way of example only, first communication modality 106-1 may comprise voice interaction, and second communication modality 106-2 may comprise text interaction. With conversion 302*e*, first user 104-1 may interact with first communication device 102-1 via voice, and second user 104-2 may interact with second communication device 102-2 via voice for user output interaction (e.g., may listen to sounds at second communication device 102-2 as produced by first user 104-1 at first communication device 102-1) and via text for user input interaction (e.g., may type text into second communication device 102-2). Conversion 302*e* may convert input text data into converted voice data for transmission via communication path 304*e*.

Although not explicitly shown in FIGS. 3A-3C, a communication path between e.g. first communication device 102-1 and second communication device 102-2 may traverse one or more network communication devices. However, for example scenarios 300A-300C, conversion(s) 302 are performed at first communication device 102-1 or second communication device 102-2. In contrast, for example scenarios 300D-300F of FIGS. 3D-3F, at least one conversion 302 is performed at a network communication device 110. If a communication path 304 is "naturally" traversing a network communication device 110 (e.g., if a communication path 304 is to traverse a network communication device 110 regardless of whether a multi-modality-communication-related feature is to be facilitated by network communication device 110), then network communication device 110 may intercept communication data flowing along communication path 304. Communication data may be intercepted by a network communication device 110 on its own accord or based on its own instructions, in response to a request by a first communication device 102-1, in response to a request by a second communication device 102-2, in response to a request from a third party, in response to one or more stored settings, in response to an indication in a communication initiation or setup message, any combination thereof, and so forth. By way of example but not limitation, a network communication device 110 that comprises a telecommunication node, an internet node facilitating a voice over internet protocol (VoIP) communication, a combination thereof, etc. may be capable of intercepting a communication flow along a communication path 304 and implementing a multi-modality-communication-related-feature (e.g., a communication modality conversion) for an intercepted communication flow. Additionally or alternatively, a communication path 304 may be redirected so as to traverse a network communication device 110 that is capable of implementing a multi-modality-communication-related-feature (e.g., a communication modality conversion) for a redirected communication flow. A communication path may be redirected in response to a command by a first communication device 102-1, in response to a command by a second communication device 102-2, in response to a request from a third party, any combination thereof, and so forth.

Figure 3D:
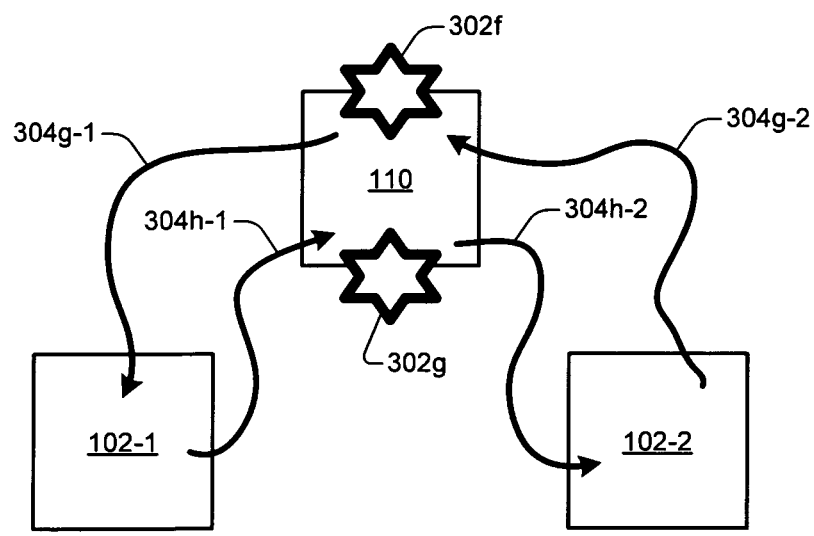

For certain example embodiments, with regard to example scenario 300D of FIG. 3D, a conversion 302f or a conversion 302g may be performed at a network communication device 110. For certain example implementations, a first user 104-1 may interact with a first communication device 102-1 in accordance with a first communication modality 106-1, or a second user 104-2 may interact with a second communication device 102-2 in accordance with a second communication modality 106-2. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304g-2. Data corresponding to second communication modality 106-2 may be converted to data corresponding to first communication modality 106-1 via conversion 302f. Data corresponding to first communication modality 106-1 may be transmitted from network communication device 110 or received at first communication device 102-1 via communication path 304g-1.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or network communication device 110 may receive data corresponding to first communication modality 106-1 via communication path 304h-1. Data corresponding to first communication modality 106-1 may be converted to data corresponding to second communication modality 106-2 via conversion 302g. Data corresponding to second communication modality 106-2 may be transmitted from network communication device 110 or received at second communication device 102-2 via communication path 304h-2. Second communication device 102-2 may present data corresponding to second communication modality 106-2 as user output to second user 104-2. By way of example only, first communication modality 106-1 may comprise video interaction, and second communication modality 106-2 may comprise voice interaction. With conversion 302f and conversion 302g at network communication device 110, first user 104-1 may interact with first communication device 102-1 via video, and second user 104-2 may interact with second communication device 102-2 via voice. It should be understood that conversion 302f may not be a reciprocal or inverse process of conversion 302g (or vice versa); additionally or alternatively, data corresponding to first communication modality 106-1 may be converted to data corresponding to a third communication modality via a conversion 302g, for example if user output interaction at second communication device 102-2 corresponds to a third communication modality. Additionally or alternatively, first communication device 102-1 or second communication device 102-2 may perform at least one conversion (e.g., a conversion 302f or 302g in lieu of two conversions being performed by network communication device 110 as shown in example scenario 300D).

Figure 3E:
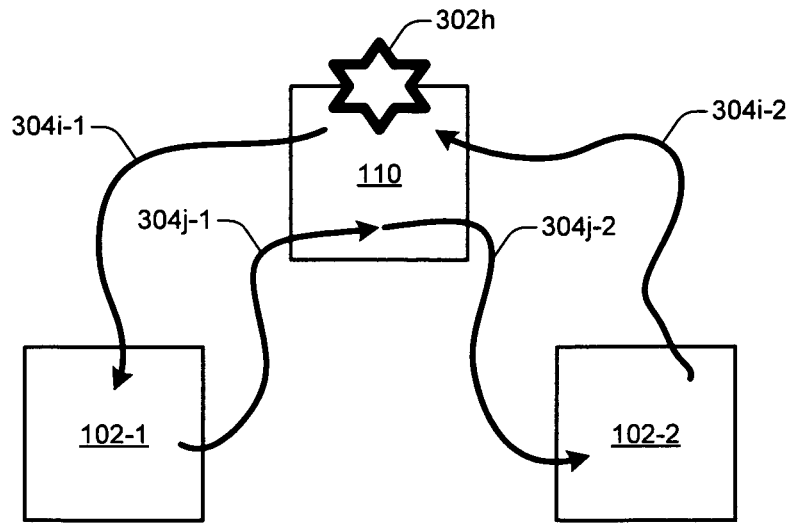

For certain example embodiments, with regard to example scenario 300E of FIG. 3E, a conversion 302h may be performed at a network communication device 110. For certain example implementations, a first user 104-1 may interact with a first communication device 102-1 in accordance with a first communication modality 106-1 for user output interaction and in accordance with a second communication modality 106-2 for user input interaction, or a second user 104-2 may interact with second communication device 102-2 in accordance with a second communication modality 106-2 for user input interaction and for user output interaction. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304i-2. Data corresponding to second communication modality 106-2 may be converted to data corresponding to first communication modality 106-1 via conversion 302h. Data corresponding to first communication modality 106-1 may be transmitted from network communication device 110 or received at first communication device 102-1 via communication path 304i-1.

For certain example implementations, first communication device 102-1 may present data corresponding to first communication modality 106-1 to first user 104-1 as user output. First communication device 102-1 may accept user input to acquire data corresponding to second communication modality 106-2. First communication device 102-1 may transmit or network communication device 110 may receive data corresponding to second communication modality 106-2 via communication path 304j-1. Data corresponding to second communication modality 106-2 may be transmitted from network communication device 110 or received at second communication device 102-2 via communication path 304j-2. Second communication device 102-2 may present data corresponding to second communication modality 106-2 as user output to second user 104-2. By way of example only, first communication modality 106-1 may comprise voice interaction, and second communication modality 106-2 may comprise video interaction. With conversion 302h, first user 104-1 may interact with first communication device 102-1 via voice for user output interaction and via video for user input interaction, and second user 104-2 may interact with second communication device 102-2 via video for user input and user output. As shown for an example scenario 300E, a communication flow may traverse a network communication device 110 without a conversion being applied thereto.

Figure 3F:
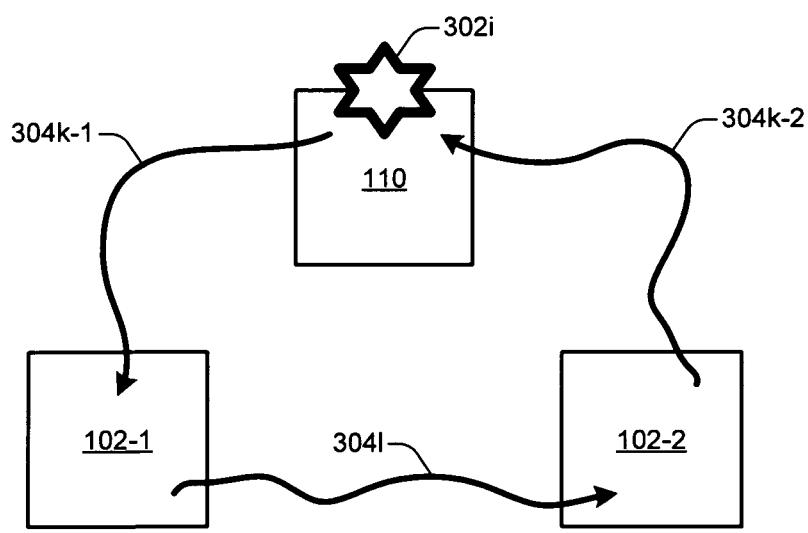

For certain example embodiments, with regard to example scenario 300F of FIG. 3F, a conversion 302i may be performed at a network communication device 110. For certain example implementations, a first user 104-1 may interact with a first communication device 102-1 in accordance with a first communication modality 106-1 for user input interaction and for user output interaction, or a second user 104-2 may interact with second communication device 102-2 in accordance with a second communication modality 106-2 for user input interaction and in accordance with first communication modality 106-1 for user output interaction. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304k-2. Data corresponding to second communication modality 106-2 may be converted to data corresponding to first communication modality 106-1 via conversion 302i. Data corresponding to first communication modality 106-1 may be transmitted from network communication device 110 or received at first communication device 102-1 via communication path 304k-1.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304*l*. Second communication device 102-2 may present data corresponding to first communication modality 106-1 as user output to second user 104-2. As shown by communication path 304*l* for an example scenario 300F, and in contrast with example scenario 300E (of FIG. 3E), a communication may omit traversal of a network communication device 110 for one part of a communication flow even if that network communication device 110 is performing a conversion for another part of the communication flow.

Figure 3G:
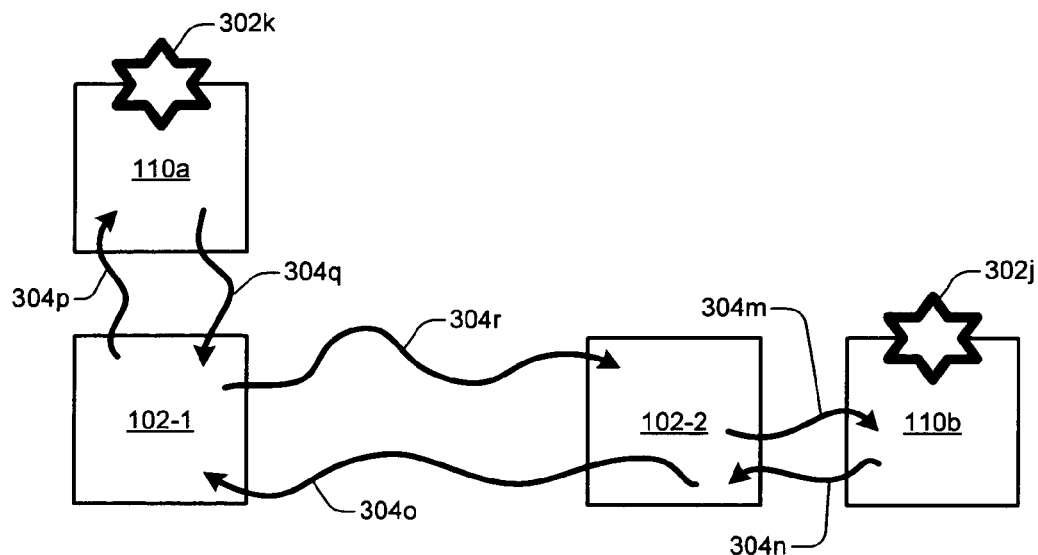
Figure 3H:
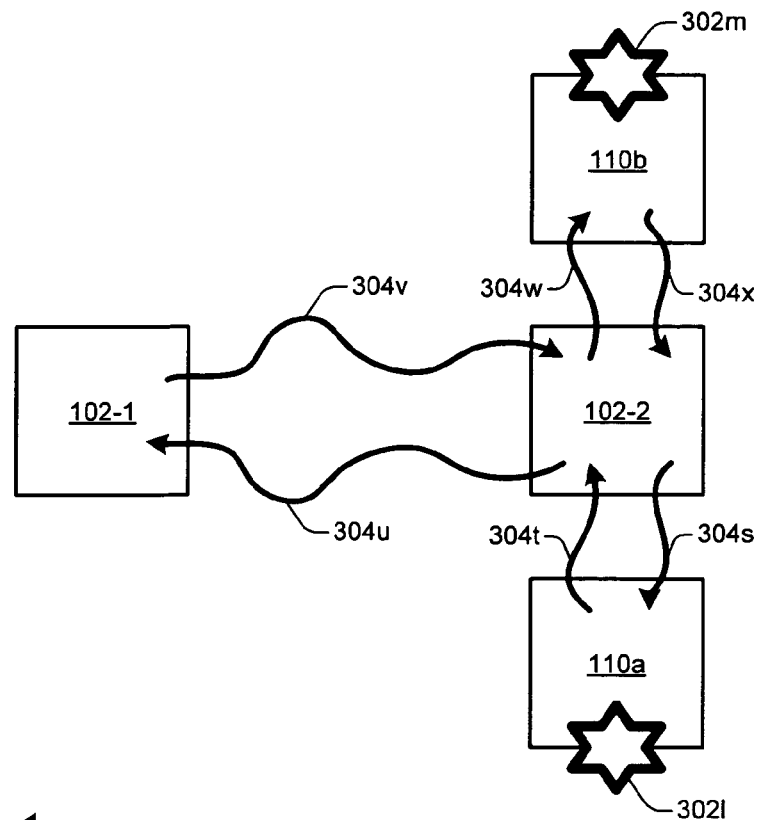

FIGS. 3A-3C illustrate example scenarios 300A-300C in which conversion is performed at a first communication device 102-1 or a second communication device 102-2. A communication device 102 may effectuate a conversion of data from corresponding to one communication modality to corresponding to another communication modality using an on-board converter (e.g., a converter 202). Additionally or alternatively, a communication device 102 may effectuate a conversion of data by causing (e.g., requesting, commanding, notifying, a combination thereof, etc.) a network communication device 110 to perform a conversion. FIGS. 3D-3F illustrate example scenarios 300D-300F in which conversion is performed at a network communication device 110 along a communication path between a first communication device 102-1 and a second communication device 102-2. In contrast, FIGS. 3G and 3H illustrate example scenarios 300G and 300H in which conversion is performed at a network communication device 110 by "farming out" a conversion process. For example, a first communication device 102-1 or a second communication device 102-2 may send data in one communication modality to a network communication device 110 and may receive in return converted data in another communication modality from the network communication device 110.

It should be understood, however, that described scenarios 300A-300H are not mutually exclusive; instead, they may be combined fully or partially or otherwise modified without departing from claimed subject matter. By way of example only, a second communication device 102-2 may perform one conversion itself and farm out another conversion to a network communication device 110. Additionally or alternatively, a network communication device 110 may perform a conversion via an interception of a communication flow, and a first communication device 102-1 may perform another conversion for the communication flow. Additionally or alternatively, a network communication device 110 may itself farm out one, two, or more conversions to other network communication device(s). Moreover, if two or more conversions are farmed out to different network communication devices, the different network communication devices may be associated (e.g., owned by, managed by, operated by, controlled by, a combination thereof, etc.) different entities. Other combinations or modifications of described scenarios may alternatively be implemented.

For certain example embodiments, with regard to example scenario 300G of FIG. 3G, a conversion 302*j* may be performed at a network communication device 110*b*, or a conversion 302*k* may be performed at a network communication device 110*a*. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction at second communication device 102-2 in accordance with second communication modality 106-2. Data corresponding to second communication modality 106-2 may be transmitted from second communication device 102-2 or received at network communication device 110*b* via communication path 304*m*. Data corresponding to second communication modality 106-2 may be converted to data corresponding to first communication modality 106-1 via conversion 302*j*. Data corresponding to first communication modality 106-1 may be transmitted from network communication device 110*b* or received at second communication device 102-2 via communication path 304*n*. Data corresponding to first communication modality 106-1 may be transmitted from second communication device 102-2 or received at first communication device 102-1 via communication path 304*o*.

For certain example implementations, first communication device 102-1 may present data corresponding to first communication modality 106-1 to first user 104-1 as user output. First communication device 102-1 may accept user input to acquire data corresponding to first communication modality 106-1. Data corresponding to first communication modality 106-1 may be transmitted from first communication device 102-1 or received at network communication device 110*a* via communication path 304*p*. At conversion 302*k*, data corresponding to first communication modality 106-1 may be converted to data corresponding to second communication modality 106-2. Data corresponding to second communication modality 106-2 may be transmitted from network communication device 110*a* or received at first communication device 102-1 via communication path 304*q*. First communication device 102-1 may transmit or second communication device 102-2 may receive data corresponding to second communication modality 106-2 via communication path 304*r*. Second communication device 102-2 may present data corresponding to second communication modality 106-2 as user output to second user 104-2. Although conversions 302*j* and 302*k* are described as being performed after receiving user input but prior to transmission to another communication device 102, one or more conversions may additionally or alternatively be performed after receiving a transmission of data corresponding to one communication modality but prior to presentation of converted data corresponding to another communication modality. Additionally or alternatively, first communication device 102-1 and second communication device 102-2 may farm out conversion to a single network communication device 110. A network communication device 110*a* or a network communication device 110*b* may be associated with a same entity or with different entities.

For certain example embodiments, with regard to example scenario 300H of FIG. 3H, a conversion 302*l* may be performed at a network communication device 110*a*, or a conversion 302*m* may be performed at a network communication device 110*b*. For certain example implementations, a first user 104-1 may interact with a first communication device 102-1 in accordance with a first communication modality 106-1, or a second user 104-2 may interact with second communication device 102-2 in accordance with a second communication modality 106-2. Second communication device 102-2 may accept user input interaction from second user 104-2 in accordance with second communication modality 106-2. Data corresponding to second communication modality 106-2 may be transmitted from second communication device 102-2 or received at network communication device 110a via communication path 304s. Data corresponding to second communication modality 106-2 may be converted to data corresponding to first communication modality 106-1 via conversion 302l. Data corresponding to first communication modality 106-1 may be transmitted from network communication device 110a or received at second communication device 102-2 via communication path 304t. Data corresponding to first communication modality 106-1 may be transmitted from second communication device 102-2 or received at first communication device 102-1 via communication path 304u.

For certain example implementations, first communication device 102-1 may present data corresponding to first communication modality 106-1 to first user 104-1 as user output. First communication device 102-1 may accept user input to acquire data corresponding to first communication modality 106-1. Data corresponding to first communication modality 106-1 may be transmitted from first communication device 102-1 or received at second communication device 102-2 via communication path 304v. Data corresponding to first communication modality 106-1 may be transmitted from second communication device 102-2 or received at network communication device 110b via communication path 304w. At conversion 302m, data corresponding to first communication modality 106-1 may be converted to data corresponding to second communication modality 106-2. Network communication device 110b may transmit or second communication device 102-2 may receive data corresponding to second communication modality 106-2 via communication path 304x. Second communication device 102-2 may present data corresponding to second communication modality 106-2 as user output to second user 104-2. Although conversions 302l and 302m are described as being performed at a certain point along a communication flow, conversions may additionally or alternatively be performed at different points along a communication flow. Additionally or alternatively, second communication device 102-2 may farm out conversions to a single network communication device 110.

Figure 4:
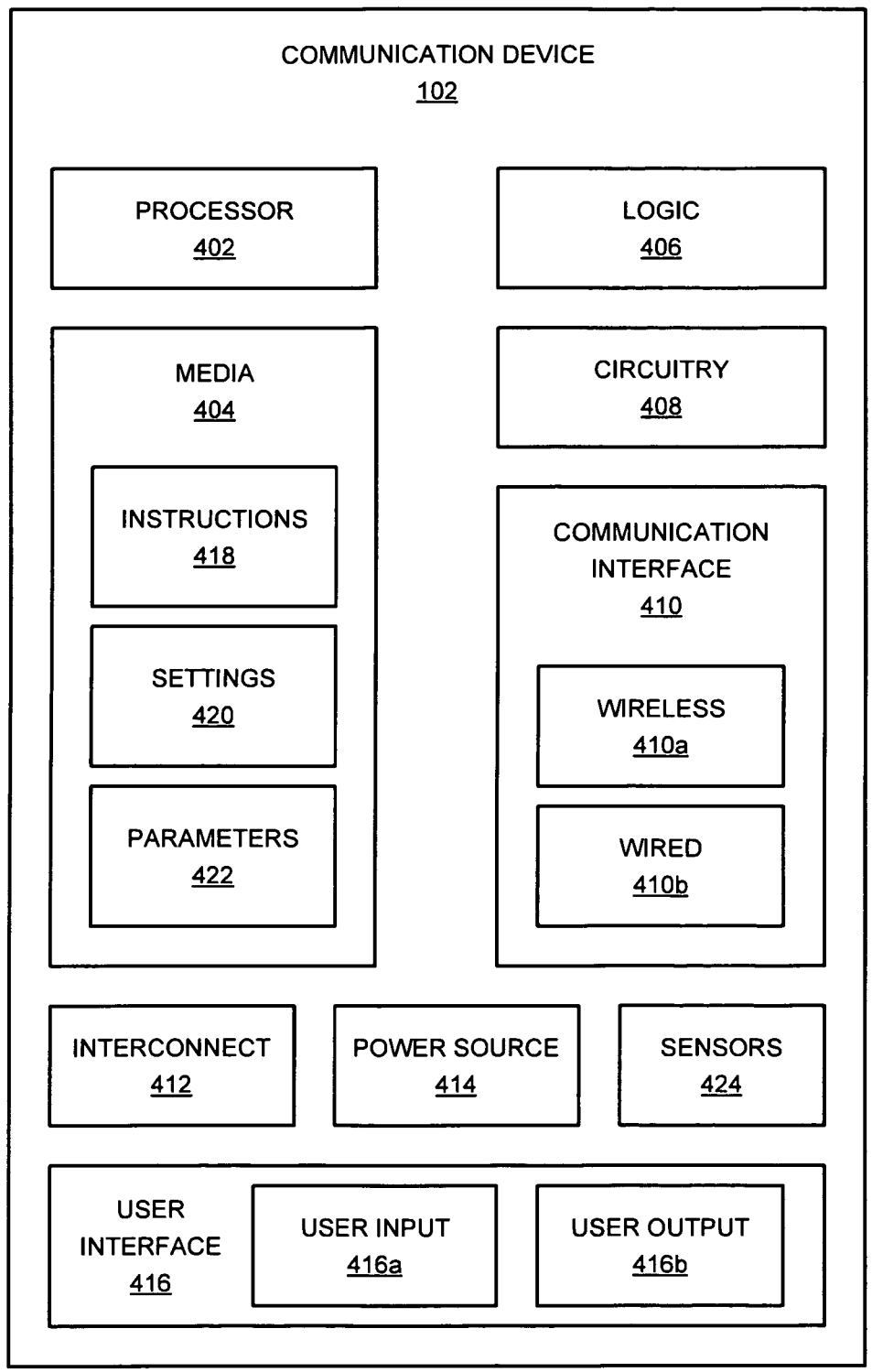
FIG. 4 is a schematic diagram of an example communication device including one or more example components in accordance with certain example embodiments.

FIG. 4 is a schematic diagram 400 of an example communication device including one or more example components in accordance with certain example embodiments. As shown in FIG. 4, a communication device 102 may include one or more components such as: at least one processor 402, one or more media 404, logic 406, circuitry 408, at least one communication interface 410, at least one interconnect 412, at least one power source 414, or at least one user interface 416, one or more sensors 424, any combination thereof, and so forth. Furthermore, as shown in schematic diagram 400, one or more media 404 may comprise one or more instructions 418, one or more settings 420, one or more parameters 422, some combination thereof, and so forth; communication interface 410 may comprise at least one wireless communication interface 410a, at least one wired communication interface 410b, some combination thereof, and so forth; or user interface 416 may comprise at least one user input interface 416a, at least one user output interface 416b, some combination thereof, and so forth. However, a communication device 102 may alternatively include more, fewer, or different components from those that are illustrated without deviating from claimed subject matter.

For certain example embodiments, a communication device 102 may include or comprise at least one electronic device. Communication device 102 may comprise, for example, a computing platform or any electronic device having at least one processor or memory. Processor 402 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 404 may bear, store, contain, provide access to, a combination thereof, etc. instructions 418, which may be executable by processor 402. Instructions 418 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 404 may comprise, by way of example but not limitation, processor-accessible or non-transitory media that is capable of bearing instructions, settings, parameters, a combination thereof, and so forth.

For certain example embodiments, execution of instructions 418 by one or more processors 402 may transform communication device 102 into a special-purpose computing device, apparatus, platform, or any combination thereof, etc. Instructions 418 may correspond to, for example, instructions that are capable of realizing at least a portion of one or more flow diagrams methods, processes, operations, functionality, technology, or mechanisms, etc. that are described herein or illustrated in the accompanying drawings. Settings 420 may comprise, by way of example but not limitation, one or more indicators that may be established by a user or other entity, one or more indicators that may determine at least partly how a communication device 102 is to operate or respond to situations, one or more indicators or other values that may be used to realize flow diagrams, methods, processes, operations, functionality, technology, or mechanisms, etc. that are described herein or illustrated in the accompanying drawings. Parameters 422 may comprise, by way of example but not limitation, one or more indicators that may be established by a user or other entity, one or more indicators that may be determined by a communication device 102, one or more values that may be determined by a user or other entity, one or more values that may be detected by communication device 102, one or more values that may be received from another device that detected them, one or more values that may be determined by communication device 102 or by another device, one or more indicators or values that may determine at least partly how a communication device 102 is to operate or respond to situations, one or more indicators or values that may be used to realize flow diagrams, methods, processes, operations, functionality, technology, or mechanisms, etc. that are described herein or illustrated in the accompanying drawings.

For certain example embodiments, logic 406 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 408 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 408 comprises at least one physical or hardware component or aspect.

For certain example embodiments, one or more communication interfaces 410 may provide one or more interfaces between communication device 102 and another device or a person/operator. With respect to a person/operator, a communication interface 410 may include, by way of example but not limitation, a screen, a speaker, a keyboard or keys, or other person-device input/output features. A wireless communication interface 410a or a wired communication interface 410b may also or alternatively include, by way of example but not limitation, a transceiver (e.g., transmitter or receiver), a radio, an antenna, a wired interface connector or other similar apparatus (e.g., a universal serial bus (USB) connector, a proprietary connector, a Thunderbolt® or Light Peak® connector, a combination thereof, etc.), a physical or logical network adapter or port, or any combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of communication device 102. Interconnect 412 may comprise, by way of example but not limitation, one or more buses, channels, switching fabrics, or combinations thereof, and so forth. Although not explicitly illustrated in FIG. 4, one or more components of communication device 102 may be coupled to interconnect 412 via a discrete or integrated interface. By way of example only, one or more interfaces may couple a communication interface 410 or a processor 402 to at least one interconnect 412. At least one power source 414 may provide power to components of communication device 102. Power source 414 may comprise, by way of example but not limitation, a battery, a power connector, a solar power source or charger, a mechanical power source or charger, a fuel source, any combination thereof, and so forth.

For certain example embodiments, at least one sensor 424 may sense, produce, or otherwise provide at least one sensor value. Sensors 424 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillator, a light sensor, an inertial measurement unit (IMU), a tactile sensor, a flexibility sensor, multiple ones thereof, any combination thereof, and so forth. Values provided by at least one sensor 424 may comprise, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, flex detections, any combination thereof, and so forth.

For certain example embodiments, a user interface 416 may enable one or more users to interact with communication device 102. Interactions between a user and device may relate, by way of example but not limitation, to touch/tactile/feeling/haptic sensory (e.g., a user may shake, bend, twist, or move a device which may be detected by a gyroscope, an accelerometer, a compass, a combination thereof, etc; a user may press a button, slide a switch, rotate a knob, etc.; a user may touch a touch-sensitive screen; a device may vibrate; some combination thereof; etc.), to sound/hearing/speech sensory (e.g., a user may speak into a microphone, a device may generate sounds via a speaker, some combination thereof, etc.), to sights/vision sensory (e.g., a device may activate one or more lights, modify a display screen, a combination thereof, etc.), any combination thereof, and so forth.

For certain example embodiments, a user interface 416 may comprise a user input interface 416a, a user output interface 416b, a combination thereof, and so forth. A user input interface 416a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, any combination thereof, and so forth. A user output interface 416b may comprise, by way of example but not limitation, a speaker, a screen (e.g., with or without touch-sensitivity), a vibrating haptic feature, any combination thereof, and so forth. Certain user interfaces 416 may enable both user input and user output. For example, a touch-sensitive screen may be capable of providing user output and accepting user input. Additionally or alternatively, a user interface component (e.g., that may be integrated with or separate from a communication device 102), such as a headset that has a microphone and a speaker, may enable both user input and user output.

It should be understood that for certain example implementations components illustrated separately in FIG. 4 are not necessarily separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with a user, as a user input interface 416a, or as a user output interface 416b. Additionally or alternatively, one or more instructions 418 may function to realize at least one setting 420 or at least one parameter 422.

It should also be understood that for certain example implementations components illustrated in schematic diagram 400 or described herein may not be integral or integrated with a communication device 102. For example, a component may be removably connected to a communication device 102, a component may be wirelessly coupled to a communication device 102, any combination thereof, and so forth. By way of example only, instructions 418 may be stored on a removable card having at least one medium 404. Additionally or alternatively, a user interface 416 (e.g., a wired or wireless headset, a screen, a video camera, a keyboard, a combination thereof, etc.) may be coupled to communication device 102 wirelessly or by wire. For instance, a user may provide user input or accept user output corresponding to a voice communication modality to or from, respectively, a communication device 102 via a wireless (e.g., a Bluetooth®) headset that may comprise a user interface 416.

Figure 5:
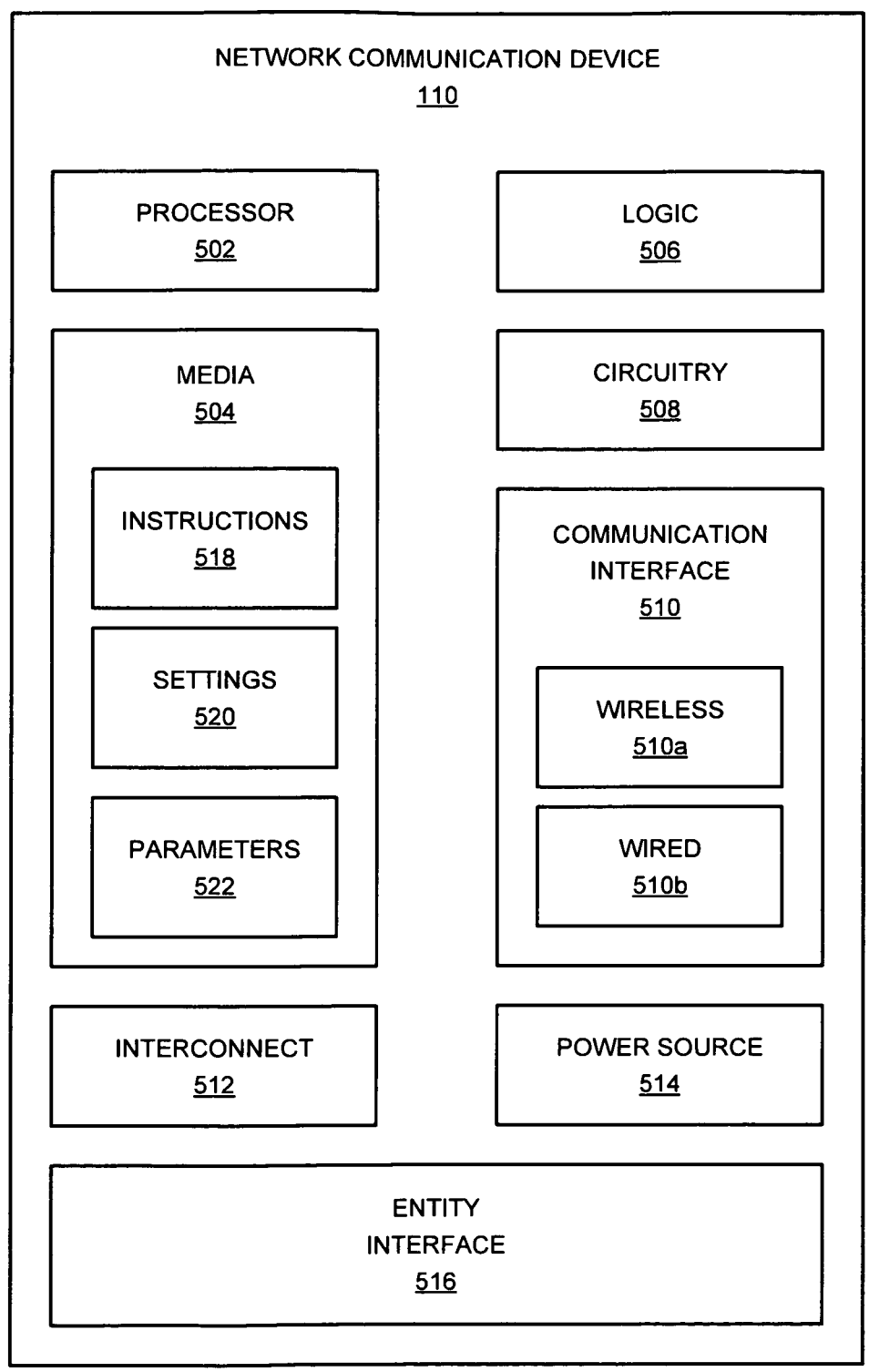
FIG. 5 is a schematic diagram of an example network communication device including one or more example components in accordance with certain example embodiments.

FIG. 5 is a schematic diagram 500 of an example network communication device including one or more example components in accordance with certain example embodiments. As shown in FIG. 5, a network communication device 110 may include one or more components such as: at least one processor 502, one or more media 504, logic 506, circuitry 508, at least one communication interface 510, at least one interconnect 512, at least one power source 514, or at least one entity interface 516, any combination thereof, and so forth. Furthermore, as shown in schematic diagram 500, one or more media 504 may comprise one or more instructions 518, one or more settings 520, one or more parameters 522, some combination thereof, and so forth; or communication interface 510 may comprise at least one wireless communication interface 510a, at least one wired communication interface 510b, some combination thereof, and so forth. However, a network communication device 110 may alternatively include more, fewer, or different components from those that are illustrated without deviating from claimed subject matter.

For certain example embodiments, a network communication device 110 may include or comprise at least one processing or computing device or machine. Network communication device 110 may comprise, for example, a computing platform or any electronic device or devices having at least one processor or memory. Processor 502 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 504 may bear, store, contain, provide access to, a combination thereof, etc. instructions 518, which may be executable by processor 502. Instructions 518 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 504 may comprise, by way of example but not limitation, processor-accessible or non-transitory media that is capable of bearing instructions, settings, parameters, a combination thereof, and so forth.

For certain example embodiments, execution of instructions 518 by one or more processors 502 may transform network communication device 110 into a special-purpose computing device, apparatus, platform, or any combination thereof, etc. Instructions 518 may correspond to, for example, instructions that are capable of realizing at least a portion of one or more flow diagrams methods, processes, operations, functionality, technology, or mechanisms, etc. that are described herein or illustrated in the accompanying drawings. Settings 520 may comprise, by way of example but not limitation, one or more indicators that may be established by a user or other entity, one or more indicators that may determine at least partly how a network communication device 110 is to operate or respond to situations, one or more indicators or other values that may be used to realize flow diagrams, methods, processes, operations, functionality, technology, or mechanisms, etc. that are described herein or illustrated in the accompanying drawings. Parameters 522 may comprise, by way of example but not limitation, one or more indicators that may be established by a user or other entity, one or more indicators that may be determined by a network communication device 110, one or more values that may be determined by a user or other entity, one or more values that may be detected by a network communication device 110, one or more values that may be received from another device that detected them, one or more values that may be determined by network communication device 110 or by another device, one or more indicators or values that may determine at least partly how a network communication device 110 is to operate or respond to situations, one or more indicators or values that may be used to realize flow diagrams, methods, processes, operations, functionality, technology, or mechanisms, etc. that are described herein or illustrated in the accompanying drawings.

For certain example embodiments, logic 506 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 508 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 508 comprises at least one physical or hardware component or aspect.

For certain example embodiments, one or more communication interfaces 510 may provide one or more interfaces between network communication device 110 and another device or a person/operator/entity indirectly. A wireless communication interface 510a or a wired communication interface 510b may also or alternatively include, by way of example but not limitation, a transceiver (e.g., transmitter or receiver), a radio, an antenna, a wired interface connector or other similar apparatus (e.g., a network connector, a universal serial bus (USB) connector, a proprietary connector, a Thunderbolt® or Light Peak® connector, a combination thereof, etc.), a physical or logical network adapter or port, an internet or telecommunications backbone connector, or any combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of network communication device 110. Interconnect 512 may comprise, by way of example but not limitation, one or more buses, channels, switching fabrics, local area networks (LANs), storage area networks (SANs), or combinations thereof, and so forth. Although not explicitly illustrated in FIG. 5, one or more components of network communication device 110 may be coupled to interconnect 512 via a discrete or integrated interface. By way of example only, one or more interfaces may couple a communication interface 510 or a processor 502 to at least one interconnect 512. At least one power source 514 may provide power to components of network communication device 110. Power source 514 may comprise, by way of example but not limitation, a power connector for accessing an electrical grid, a fuel cell, a solar power source, any combination thereof, and so forth.

For certain example embodiments, an entity interface 516 may enable one or more entities (e.g., other devices, persons, groups, a combination thereof, etc.) to provide input to or receive output from network communication device 110. Interactions between entities and a device may relate, by way of example but not limitation, to inputting instructions, commands, settings, parameters, any combination thereof, and so forth. Certain entity interfaces 516 may enable both entity input and entity output at network communication device 110 or over at least one network link.

It should be understood that for certain example implementations components illustrated separately in FIG. 5 are not necessarily separate or mutually exclusive. For example, a given component may provide multiple functionalities. By way of example only, hard-wired logic 506 may form circuitry 508. Additionally or alternatively, a single component such as connector may function as a communication interface 510 or as an entity interface 516. Additionally or alternatively, one or more instructions 518 may function to realize at least one setting 520 or at least one parameter 522.

It should also be understood that for certain example implementations components illustrated in schematic diagram 500 or described herein may not be integral or integrated with a network communication device 110. For example, a component may be removably connected to a network communication device 110, a component may be wirelessly coupled to a network communication device 110, any combination thereof, and so forth. By way of example only, instructions 518 may be stored on one medium 504, and settings 502 or parameters 522 may be stored on a different medium 504, which may comprise a part of a different server of e.g. a server farm. Additionally or alternatively, respective processor-media pairs may be physically realized on respective server blades. Multiple server blades, for instance, may be linked to realize at least one network communication device 110.

Figure 6A:
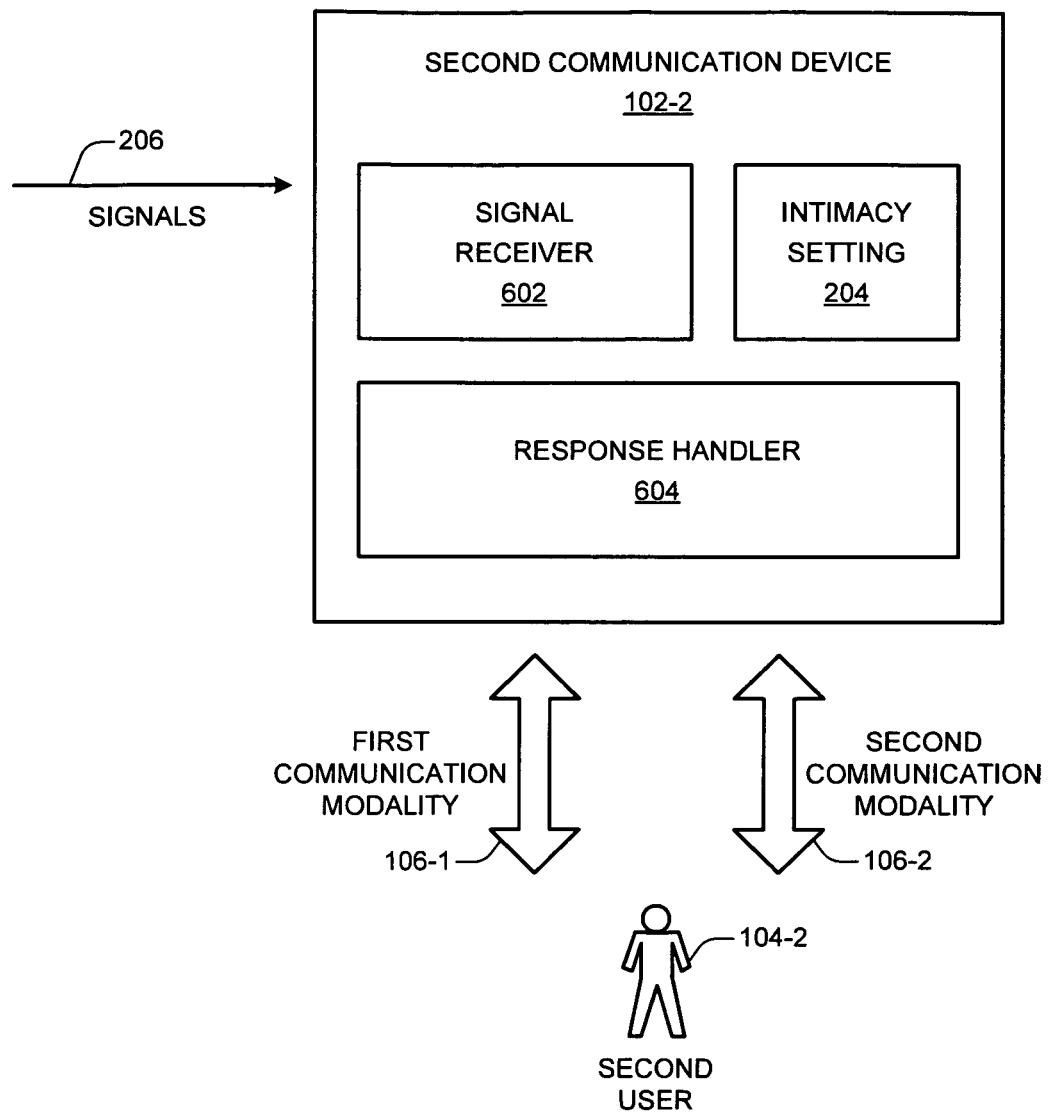
FIG. 6A is schematic diagram of an example communication device that may be participating in a communication using a signal receiver or a response handler in accordance with certain example embodiments.

FIG. 6A is a schematic diagram 600A of an example communication device that may be participating in a communication using a signal receiver or a response handler in accordance with certain example embodiments. As shown in FIG. 6A, by way of example but not limitation, schematic diagram 600A may include a second communication device 102-2, a second user 104-2, a second communication modality 106-2, or one or more signals 206. More specifically, a second communication device 102-2 of schematic diagram 600A may include at least one intimacy setting 204, a signal receiver 602, or a response handler 604.

For certain example embodiments, a second communication device 102-2 may receive one or more signals 206 corresponding to a first communication modality 106-1 (e.g., also of FIG. 1 or 2). A second communication device 102-2 may respond to one or more signals 206 corresponding to first communication modality 106-1 based at least partly on second user 104-2 interaction via a second communication modality 106-2 in accordance with at least one intimacy setting 204. By way of example but not limitation, at least one intimacy setting 204 may indicate what kind of one or more communication modalities a user is willing to expose for at least one communication.

For certain example embodiments, a signal receiver 602 may receive one or more signals 206 corresponding to a first communication modality 106-1. By way of example but not limitation, one or more signals 206 may correspond to first communication modality 106-1 if one or more signals 206 originated at a first communication device 102-1 (e.g., of FIG. 1 or 2) in at least partial dependence on interaction by a first user 104-1 with first communication device 102-1 via first communication modality 106-1, if one or more signals 206 are derived at least partly from interaction by first user 104-1 with first communication device 102-1 via first communication modality 106-1, if one or more signals 206 are encoded to support user input via first communication modality 106-1, if one or more signals 206 are encoded to support user output in accordance with first communication modality 106-1, any combination thereof, and so forth. A response handler 604 may respond to one or more signals 206 corresponding to first communication modality 106-1 based at least partly on second user 104-2 interaction via a second communication modality 106-2 in accordance with at least one intimacy setting 204. Example embodiments with respect to a response handler 604 are described herein below with particular reference to at least FIGS. 6A-6C.

For certain example embodiments, signal receiver 602 and response handler 604 may comprise a single component together, a single component apiece, multiple components, or any combination thereof, and so forth. Example components for a communication device 102 are described herein above with particular reference to at least FIG. 4. By way of example but not limitation, signal receiver 602 may comprise an antenna, a wired connector, a signal downconverter, a baseband processor, a signal processing module (e.g., to account for signal manipulation for a communication protocol, to decrypt, to extract data, a combination thereof, etc.), a processor, hardware, software, firmware, logic, circuitry, any combination thereof, and so forth. By way of example but not limitation, response handler 604 may comprise an intimacy-related module, hardware, software, firmware, logic, circuitry, any combination thereof, and so forth.

Figure 6B:
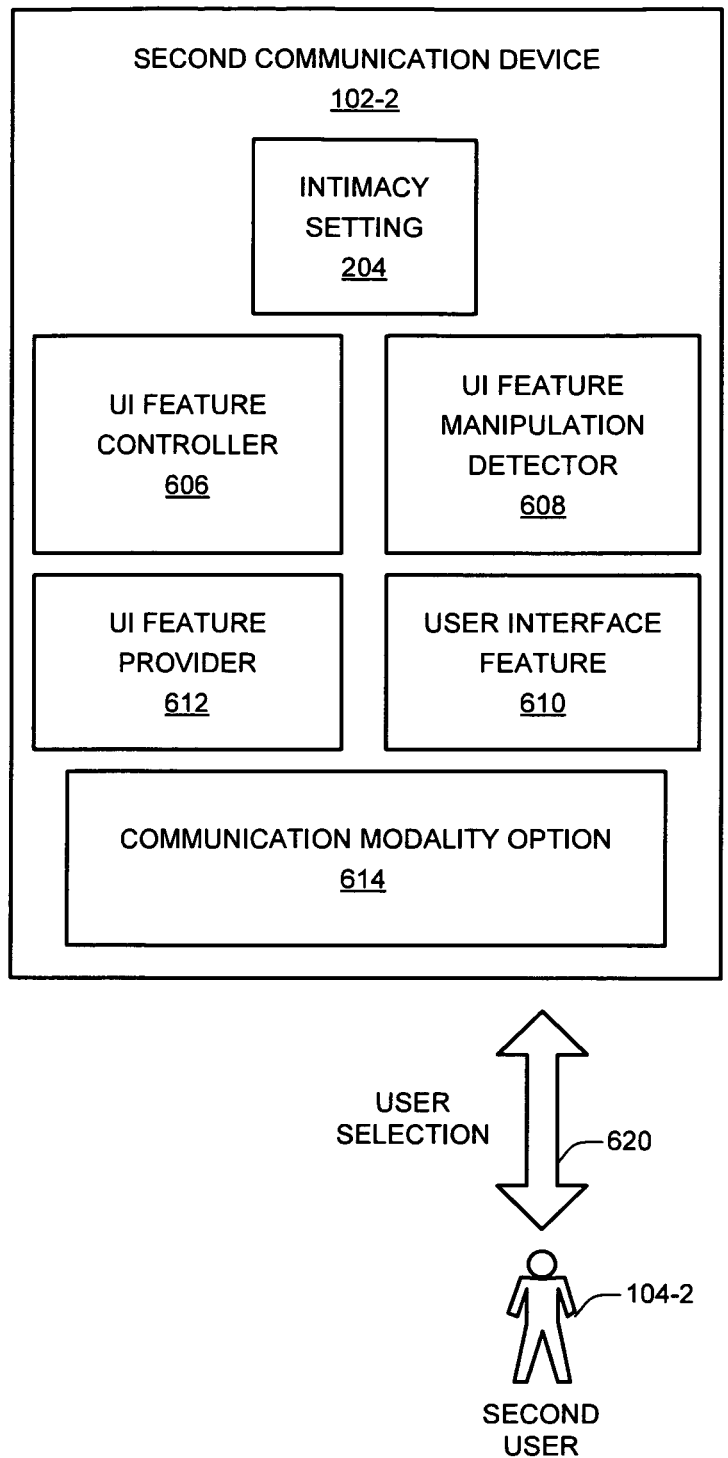
FIG. 6B is a schematic diagram of an example communication device that may realize a user interface feature in accordance with certain example embodiments.

FIG. 6B is a schematic diagram 600B of an example communication device that may realize a user interface feature in accordance with certain example embodiments. As shown in FIG. 6B, by way of example but not limitation, schematic diagram 600B may include a second communication device 102-2, a second user 104-2, or at least one intimacy setting 204. More specifically, a second communication device 102-2 of schematic diagram 600B may include at least one user interface (UI) feature controller 606, at least one user interface feature manipulation detector 608, at least one user interface feature 610, at least one user interface feature provider 612, one or more communication modality options 614, or at least one user selection 620.

For certain example embodiments, a user interface feature 610 may be realized by a second communication device 102-2. Example implementations for a user interface feature 610 are described herein with particular reference to FIGS. 6C-6F, but by way of example and not limitation. A user interface feature 610 may enable a user 104 to operate a communication device 102 with regard to multi-modality communications. A user interface feature 610 may, for example, provide visual, aural, haptic, a combination thereof, etc. output and accept optical, sound, touch, a combination thereof, etc. input to enable a user 104 to establish settings (e.g., at least one intimacy setting 204), to manually or automatically activate a multi-modality communication, any combination thereof, and so forth. For certain example implementations, a user interface feature 610 may include or present one or more communication modality options 614. Certain communication modality options 614 are described, by way of example but not limitation, with particular reference to FIGS. 6D-6F. In an example operation, user selection 620 of a communication modality option hardware, software, firmware, logic, circuitry, any combination thereof, and so forth. By way of example but not limitation, response handler 604 may comprise an intimacy-related module, hardware, software, firmware, logic, circuitry, any combination thereof, and so forth.

FIG. 6B is a schematic diagram 600B of an example communication device that may realize a user interface feature in accordance with certain example embodiments.

As shown in FIG. 6B, by way of example but not limitation, schematic diagram 600B may include a second communication device 102-2, a second user 104-2, or at least one intimacy setting 204. More specifically, a second communication device 102-2 of schematic diagram 600B may include at least one user interface (UI) feature controller 606, at least one user interface feature manipulation detector 608, at least one user interface feature 610, at least one user interface feature provider 612, one or more communication modality options 614, or at least one user selection 620.

For certain example embodiments, a user interface feature 610 may be realized by a second communication device 102-2. Example implementations for a user interface feature 610 are described herein with particular reference to FIGS. 6C-6F, but by way of example and not limitation. A user interface feature 610 may enable a user 104 to operate a communication device 102 with regard to multi-modality communications. A user interface feature 610 may, for example, provide visual, aural, haptic, a combination thereof, etc. output and accept optical, sound, touch, a combination thereof, etc. input to enable a user 104 to establish settings (e.g., at least one intimacy setting 204), to manually or automatically activate a multi-modality communication, any combination thereof, and so forth. For certain example implementations, a user interface feature 610 may include or present one or more communication modality options 614. Certain communication modality options 614 are described, by way of example but not limitation, with particular reference to FIGS. 6D-6F. In an example operation, user selection 620 of a communication modality option 614 may enable a user 104 to establish one or more settings, establish one or more auto-activation parameters, manually activate a multi-modality communication, any combination thereof, and so forth.

For certain example embodiments, a user interface feature provider 612 may provide a user interface feature 610. A user interface feature manipulation detector 608 may detect if or when a user interface feature 610 is being manipulated by a user 104. A user interface feature controller 606 may control an implementation or realization of a user interface feature. For certain example implementations, a user interface feature controller 606 may control interactions between user interface feature manipulation detector 608 or user interface feature provider 612, or a user interface feature controller 606 may control interactions among user interface feature provider 612, user interface feature manipulation detector 608, or one or more other components of a communication device 102. For instance, a user interface feature controller 606 may provide access to one or more signals 206 (e.g., of FIG. 2 or 6A) for user interface feature provider 612, may provide access to calling functionality of a communication device 102, may provide access to display functionality of a communication device 102, may provide access to speaker or vibratory functionality of a communication device 102, may provide access to an operating system resident on a communication device 102 (e.g., to make system or operating system calls, to interact with an application if a user interface feature or multi-modality communication is at least partially implemented by an application that is separate from or executing on an operating system), may provide access to user interface components 416, any combination thereof, and so forth. However, claimed subject matter is not limited to any particular described embodiments, implementations, examples, etc.

Figure 6C:
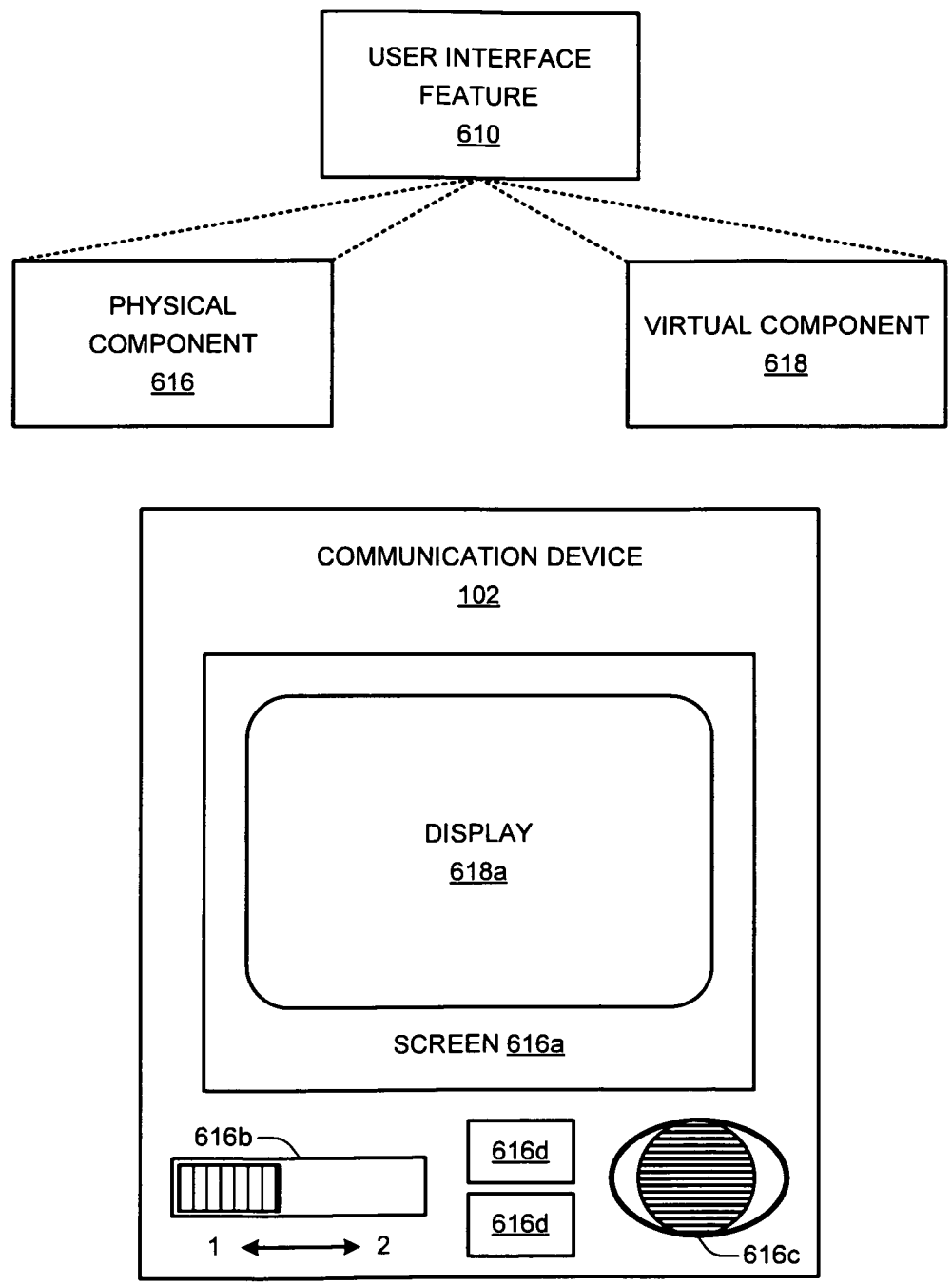
FIG. 6C is a schematic diagram of an example communication device that may include a physical component or a virtual component of a user interface feature in accordance with certain example embodiments.

FIG. 6C is a schematic diagram 600C of an example communication device that may include a physical component or a virtual component of a user interface feature in accordance with certain example embodiments. As shown in FIG. 6C, by way of example but not limitation, schematic diagram 600C may include a communication device 102 or a user interface feature 610. More specifically, schematic diagram 600C may include at least one physical component 616 of a user interface feature 610 or at least one virtual component 618 of a user interface feature 610.

For certain example embodiments, a user interface feature 610 may comprise one or more physical components 616, one or more virtual components 618, any combination thereof, and so forth. By way of example but not limitation, a physical component 616 of a user interface feature 610 may comprise a component that is at least partially implemented in hardware as part of a communication device 102. Examples of physical components 616 may include, but are not limited to, at least one knob, at least one dial, at least one slider, at least one switch, one or more keys (e.g., that are part of a numeric, alphabetical, alphanumeric, etc. keypad or keyboard), one or more buttons, at least one trackball, at least one track wheel, at least one joystick, a track stick, or at least one touch-sensitive surface (e.g., a touch-sensitive screen, a track pad, etc.). Physical components 616 (e.g., a knob, a switch, a slider, a dial, a key, a button, a trackball, a track wheel, etc.) may be physically moveable by a user. A physical component 616 may be integrated with a communication device 102. A physical component 616 may be a hardware input/output component that is dedicated (e.g., temporarily or permanently) to a user interface feature 610. Examples of physical components 616 that are illustrated in schematic diagram 600C may include, by way of example but not limitation, a touch-sensitive screen 616a, a switch 616b, a trackball or track wheel 616c, a button 616d or key 616d, a combination thereof, and so forth. As shown, by way of example but not limitation, a switch 616b may be switched between a first communication modality 106-1 or a second communication modality 106-2 (e.g., of FIG. 1, 2, or 6A). Examples of physical components 616 may further include, but are not limited to, a docking component, a device alteration component (e.g., to fold/unfold a device, to slide open or closed a device, a combination thereof, etc.), any combination thereof, and so forth. Examples of manipulations of a user interface feature 610 may further include, by way of example but not limitation, a gesture, an utterance, a tapping, a shaking, non-vocal audio, a physical movement of a device (e.g., opening, closing, unfolding, folding, sliding, unlocking, locking, docking, undocking, a combination thereof, etc.), any combination thereof, and so forth. However, claimed subject matter is not limited to any particular described embodiments, implementations, examples, etc.

For certain example embodiments, a user interface feature 610 may comprise one or more virtual components 618. By way of example but not limitation, a virtual component 618 of a user interface feature 610 may comprise a component that is at least partially implemented in software or firmware as part of a communication device 102. Examples of virtual components 618 may include, but are not limited to, a visual presentation, an aural presentation, a haptic presentation, any combination thereof, and so forth. For certain example implementations, a virtual component 618 may be displayed on a screen, played on a speaker, projected on a screen or other surface, vibrated by a device, any combination thereof, and so forth. A virtual component 618 may be reconfigurable during operation. A virtual component 618 may be displayed at one moment, altered at another moment, removed from a display at another moment, played momentarily, a combination thereof, and so forth. An example of a virtual component 618 that is illustrated in schematic diagram 600C may include, by way of example but not limitation, a display 618a. Physical components 616 or virtual components 618 may not be mutually exclusive. For example, a screen 616a may serve to present a virtual component 618 (e.g., a display 618a) on a physical component 616. Additionally or alternatively, a physical component 616 (e.g., a trackball 616c or a button/key 616d) may be used to select an aspect of a virtual component 618 (e.g., that is part of a display 618a, that has been presented as an aural menu of choices, any combination thereof, etc.). However, claimed subject matter is not limited to any particular described embodiments, implementations, examples, etc.

Figure 6D:
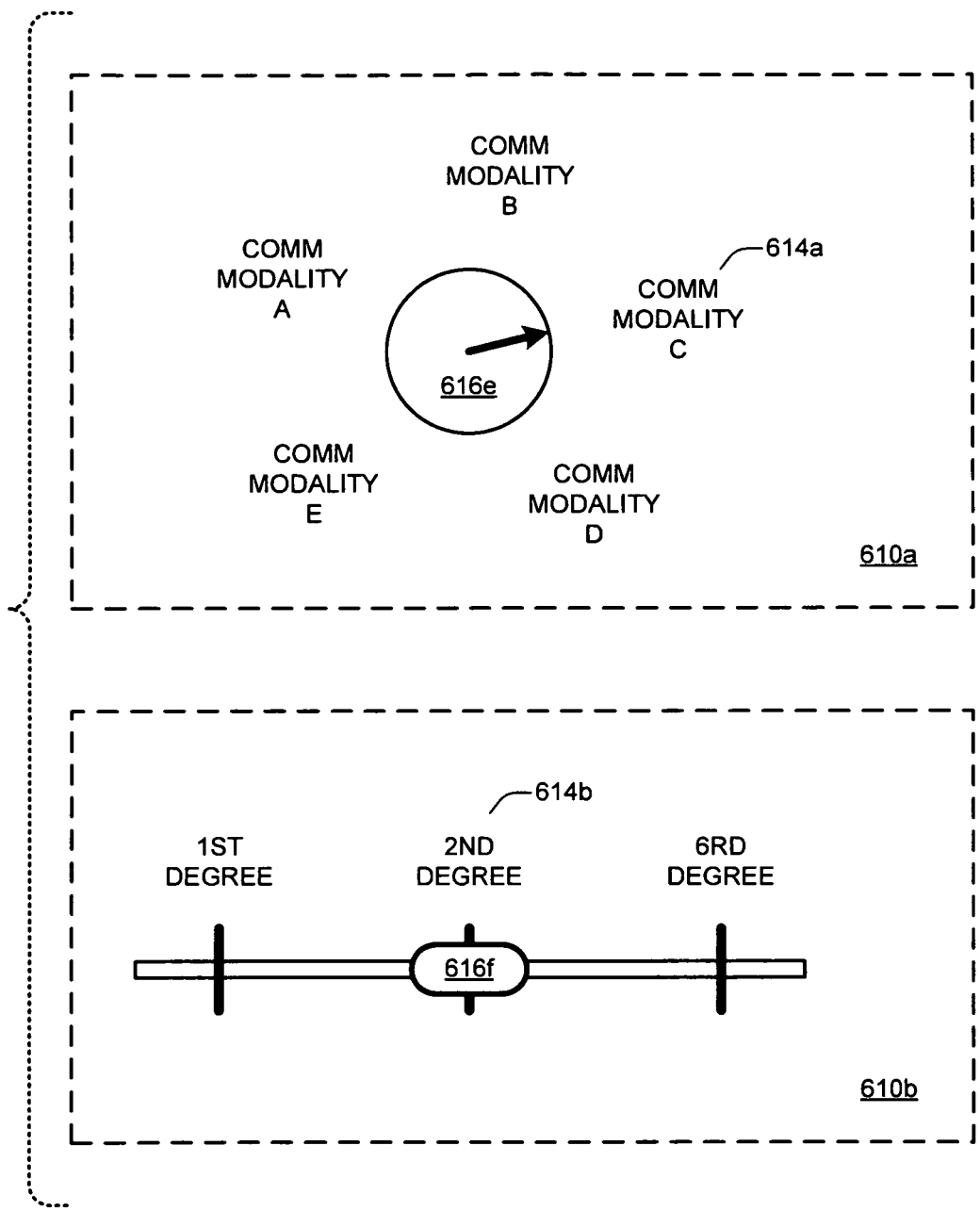
FIGS. 6D-6F are schematic diagrams of example user interface features in accordance with certain example embodiments.
Figure 6E:
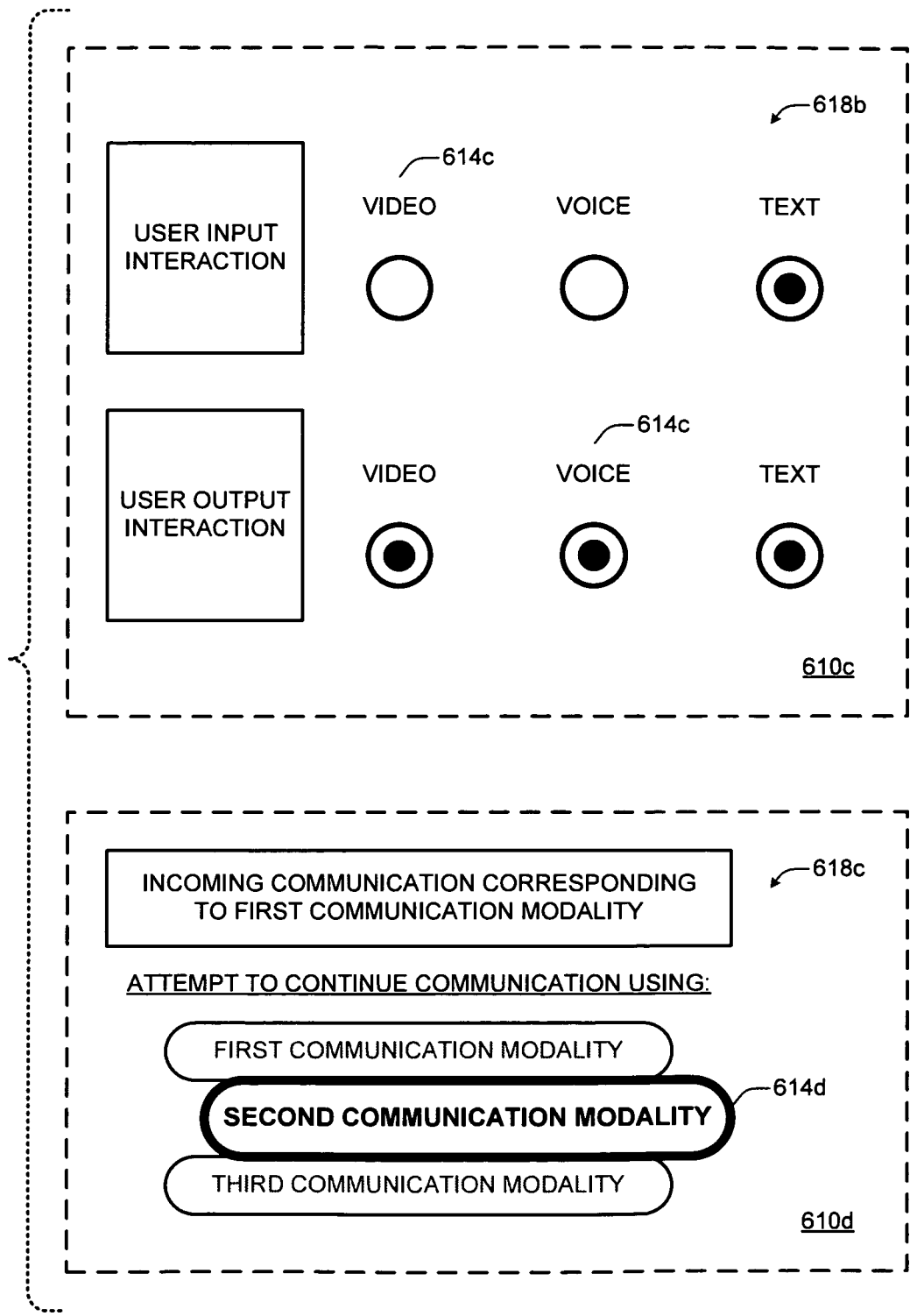
Figure 6F:
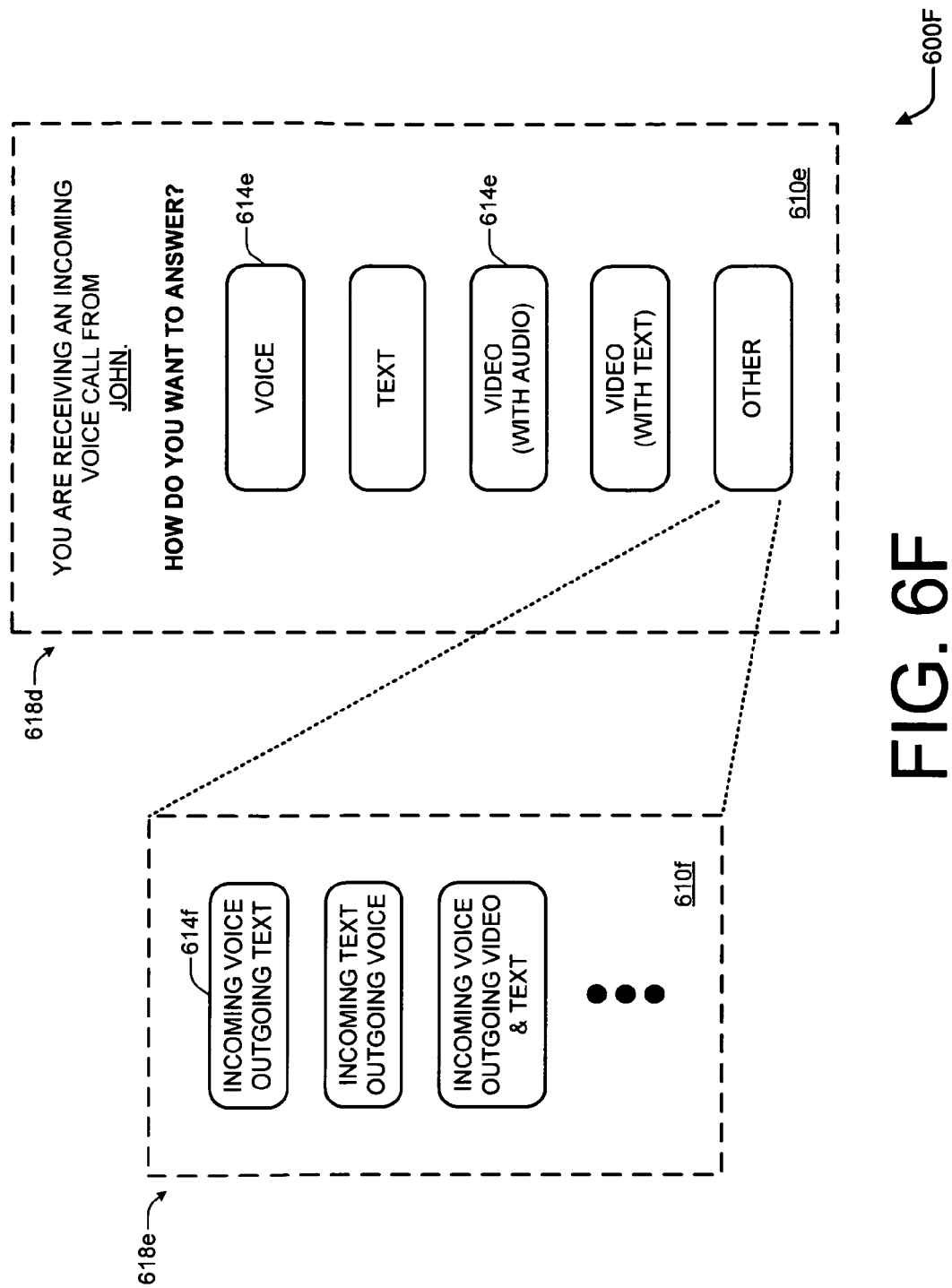

FIGS. 6D-6F are schematic diagrams 600D-600F of example user interface features in accordance with certain example embodiments. As shown in FIGS. 6D-6F, by way of example but not limitation, schematic diagrams 600D-600F may include one or more example user interface features 610a-610f. More specifically, schematic diagram 600D illustrates example user interface feature 610a or 610b that may be implemented at least partially as physical components 616. Schematic diagram 600E illustrates example user interface feature 610c or 610d that may be implemented at least partially as virtual components 618. Schematic diagram 600F illustrates example user interface feature 610e or 610f that may be implemented at least partially as virtual components 618. Schematic diagrams 600D-600F also illustrate examples of communication modality options 614. However, claimed subject matter is not limited to any particular described embodiments, implementations, examples, etc. in schematic diagrams 600D-600F of FIGS. 6D-6F For certain example embodiments, as shown in schematic diagram 600D of FIG. 6D, a user interface feature 610a is illustrated. User interface feature 610a may comprise a dial or knob 616e that enables a user to adjust an intimacy setting 204 (e.g., of FIG. 2, 6A, 6B, etc.). For an example implementation, intimacy knob 616e may be rotated to any of five different communication modalities A, B, C, D, or E. Each respective communication modality A, B, C, D, or E may be represented by a respective communication modality option 614a. (For the sake of visual clarity, each communication modality option 614 may not be separately identified by reference number in each schematic diagram. For instance, one of five communication modality options 614a is explicitly identified for user interface feature 610a.) Each communication modality may correspond, by way of example but not limitation, to a type of user interaction with a communication device, to a type of user interaction with a communication device for user input interaction, to a type of user interaction with a communication device for user output interaction, any combination thereof, and so forth.

For certain example embodiments, as shown in schematic diagram 600D of FIG. 6D, a user interface feature 610b is illustrated. User interface feature 610b may comprise a slider 616f that enables a user to adjust an intimacy setting. For an example implementation, slider 616f may be slid to any of three different communication modalities that correspond to different degrees of communicative exposure: a first degree, a second degree, or a third degree. Each communicative exposure degree may be represented by a respective communication modality option 614b. Each communication modality may correspond, by way of example but not limitation, to textual communication, speech communication, video communication at a first resolution, video communication at a second higher resolution, video communication with stereoscopic (e.g., 3D) images, facial video communication, full-body video communication, any combination thereof, and so forth. Although shown and described in terms of a physical component 616, a dial 616e or a slider 616f may additionally or alternatively be implemented as a virtual component 618 (e.g., that is displayed on a screen, that is played on a speaker, a combination thereof, etc.).

For certain example embodiments, as shown in schematic diagram 600E of FIG. 6E, a user interface feature 610c is illustrated. User interface feature 610c may comprise a display 618b that is separated into user input interaction (e.g., at an upper row) and into user output interaction (e.g., at a lower row). For an example implementation, one or more communication modalities that are presented (e.g., in a menu, that are produced via selection of a menu item, a combination thereof, etc.) may be selected for user input interaction or user output interaction via one or more buttons (e.g., "radio-style" buttons in which selecting one button deselects other button(s), such as those shown at an upper row; buttons in which multiple ones may be selected, such as those shown in a lower row; a combination thereof; etc.). Display 618b may be presented to a user so that a user may adjust input or output user interaction communication modalities, which may be represented by one or more communication modality options 614c. By way of example but not limitation, a user may select video, voice, or text. As shown for example user interface feature 610c, a user has selected to provide input to a communication device as text but to accept output from a communication device as video, voice, or text. A user may make such selections if, for instance, a user is at home and may see, hear, read, etc. incoming communicative signals but wishes to limit outgoing communicative signals because the user has not yet made themselves professionally presentable. Additional or alternative implementations for a virtual component display 618b may include, but are not limited to, at least one selector, at least one checkbox, any combination thereof, and so forth.

For certain example embodiments, as shown in schematic diagram 600E of FIG. 6E, a user interface feature 610d is illustrated. User interface feature 610d may comprise a display 618c that is presented in response to receiving an incoming communication that corresponds to, e.g., a first communication modality. A communication device may ask a user if the user wishes to attempt to continue the communication using one or more communication modality options 614d. For an example implementation, one or more communication modality options 614d may be presented to a user via a menu that is capable of scrolling (e.g., up, down, left, right, a combination thereof, etc.) as shown. A user may scroll through communication modality options 614d until a desired communication modality option is identified or selected. As shown, a second communication modality option may be highlighted for selection by a user via a touch, a movement of a physical component (e.g., including at least one individual component; multiple components; components forming a communication device, such as those enabling sliding or folding; a combination thereof; etc.), some combination thereof, and so forth.

For certain example embodiments, as shown in schematic diagram 600F of FIG. 6F, a user interface feature 610e is illustrated. User interface feature 610e may comprise a display 618d having a pop-up menu that is presented to a user if, by way of example but not limitation, an incoming voice call from a particular person (e.g., "John") is received. A communication device may inquire as to how a user wishes to answer John's incoming voice call. Multiple communication modality options 614e are shown as virtual buttons that may be selected. By way of example but not limitation, available communication modality options may comprise "Voice", "Text", "Video (with Audio)", "Video (with Text)", "Other", and so forth. If a second user selects "Video (with Text)", for instance, a second communication device may answer the voice call and offer to continue the communication with a first user associated with a first communication device under a condition that the second user may interact with the second communication device in accordance with video and text (e.g., which might be desired if a local user is currently located in a noisy environment).

For certain example embodiments, as shown in schematic diagram 600F of FIG. 6F, a user interface feature 610f is illustrated. User interface feature 610f may comprise a display 618e comprising another pop-up menu, which may be presented if a user selects an "Other" virtual button of user interface feature 610e. Multiple communication modality options 614f are shown as virtual buttons that may be selected. By way of example but not limitation, available communication modality options may comprise "Incoming Voice—Outgoing Text", "Incoming Text—Outgoing Voice", and "Incoming Voice—Outgoing Video & Text", and so forth. If a second user selects an "Incoming Voice—Outgoing Text" button, for instance, the second user may interact with a second communication device in accordance with voice communications for device output interaction (e.g., may hear a voice via at least one speaker) and may interact with the second communication device in accordance with textual communications for device input interaction (e.g., may type in text via a physical or a virtual keyboard).

Multiple different embodiments may additionally or alternatively be implemented. For example, degrees of communicative exposure (e.g., of communication modality options 614b of FIG. 6D) may be presented as radio-style buttons (e.g., like communication modality options 614c of FIG. 6E). As another example, display(s) at least similar or analogous to display 618c, 618d, or 618e may be presented to establish at least one intimacy setting 204 prior to arrival of an incoming communication notification (e.g., as a current default setting). As yet another example, communication modality options 614e (e.g., of user interface feature 610e of FIG. 6F) or communication modality options 614c (e.g., of user interface feature 610c of FIG. 6E) may be presented as a slider interface (e.g., as shown in schematic diagram 600D as part of user interface feature 610b of FIG. 6D). As another example, a user interface feature 610 may be accessible via a widget, an icon, a hotkey, a dropdown menu, a press or click and hold mechanism, a combination thereof, etc. of a communication device 102. However, claimed subject matter is not limited to any particular described embodiments, implementations, examples, etc.

Figure 7:
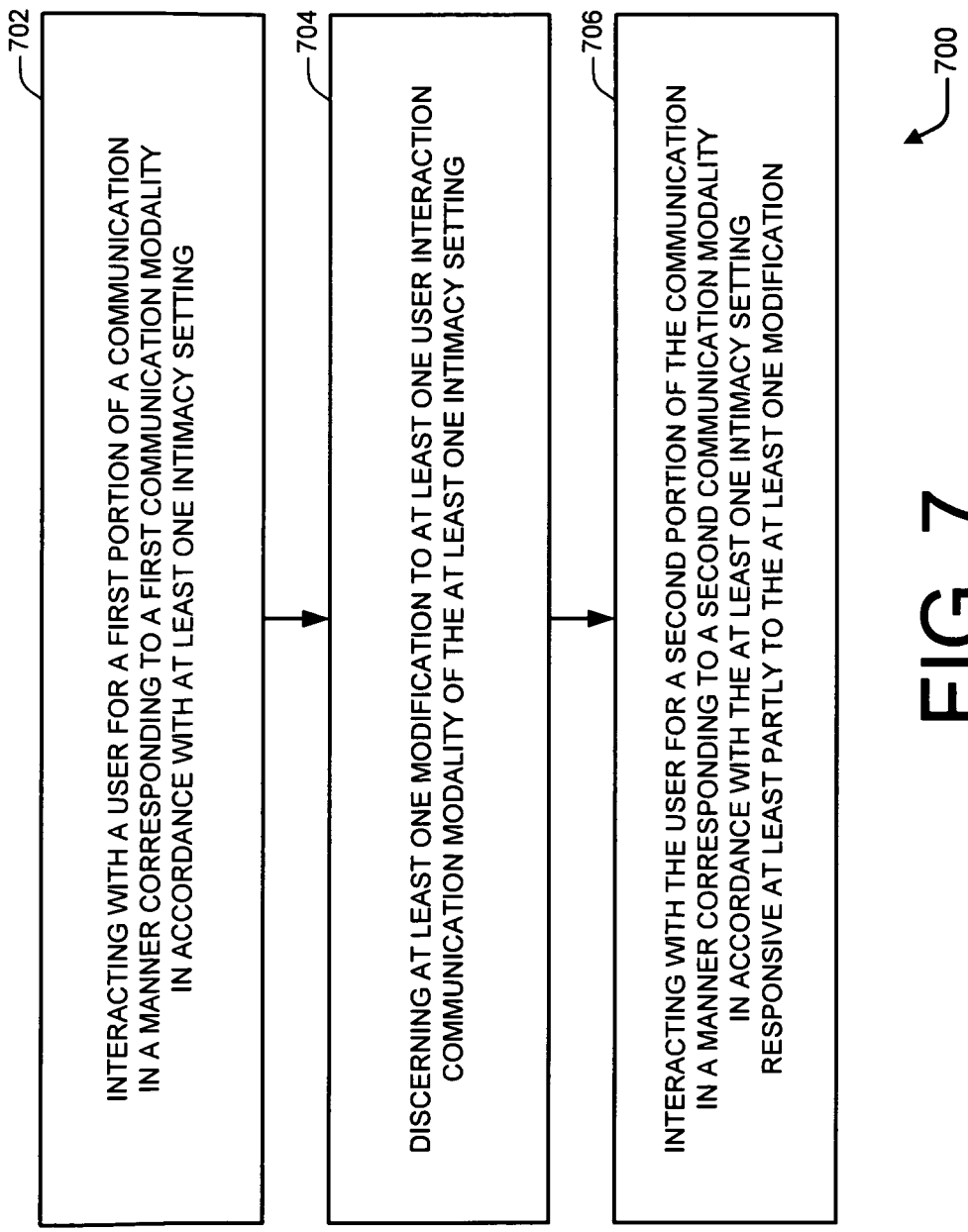
FIG. 7 is a flow diagram illustrating an example method for handling user interaction with a multi-modality communication responsive to a modification of at least one intimacy setting in accordance with certain example embodiments.

FIG. 7 is a flow diagram 700 illustrating an example method for handling user interaction with a multi-modality communication responsive to a modification of at least one intimacy setting in accordance with certain example embodiments. As illustrated, flow diagram 700 may include any of operations 702-706. Although operations 702-706 are shown or described in a particular order, it should be understood that methods may be performed in alternative manners without departing from claimed subject matter, including, but not limited to, with a different order or number of operations or with a different relationship between or among operations. Also, at least some operations of flow diagram 700 may be performed so as to be fully or partially overlapping with other operation(s). For certain example embodiments, one or more operations of flow diagram 700 may be performed by a communication device (e.g., a communication device 102).

For certain example embodiments, a method for handling multi-modality communication modification, which method may be at least partially implemented using hardware, such as that of a communication device, may comprise an operation 702 that may be directed at least partially to interacting with a user for a first portion of a communication in a manner corresponding to a first communication modality in accordance with at least one intimacy setting. By way of example but not limitation, a second communication device 102-2 may interact with a second user 104-2 for a first portion of a communication in a manner corresponding to a first communication modality 106-1 in accordance with at least one intimacy setting 204. However, claimed subject matter is not limited to any particular described embodiments, implementations, examples, etc.

For certain example embodiments, an operation 704 may be directed at least partially to discerning at least one modification to at least one user interaction communication modality of the at least one intimacy setting. By way of example but not limitation, a second communication device 102-2 may discern (e.g., detect, discover, determine, ascertain, recognize, become informed, realize, perceive, a combination thereof, etc.) at least one modification to at least one user interaction communication modality of at least one intimacy setting 204. For certain example implementations, wherein a user interface feature is manipulated by a user to modify at least one user interaction communication modality of at least one intimacy setting 204, a discernment may comprise detecting a manipulation of a user interface feature (e.g., as described herein above with respect to any of FIGS. 6A-6F). However, claimed subject matter is not limited to any particular described embodiments, implementations, examples, etc.

For certain example embodiments, an operation 706 may be directed at least partially to interacting with the user for a second portion of the communication in a manner corresponding to a second communication modality in accordance with the at least one intimacy setting responsive at least partly to the at least one modification. By way of example but not limitation, a second communication device 102-2 may interact with a second user 104-2 for a second portion of a communication in a manner corresponding to a second communication modality 106-2 in accordance with at least one intimacy setting 204 responsive at least partly to at least one modification to at least one user interaction communication modality of at least one intimacy setting 204. However, claimed subject matter is not limited to any particular described embodiments, implementations, examples, etc.

Figure 8A:
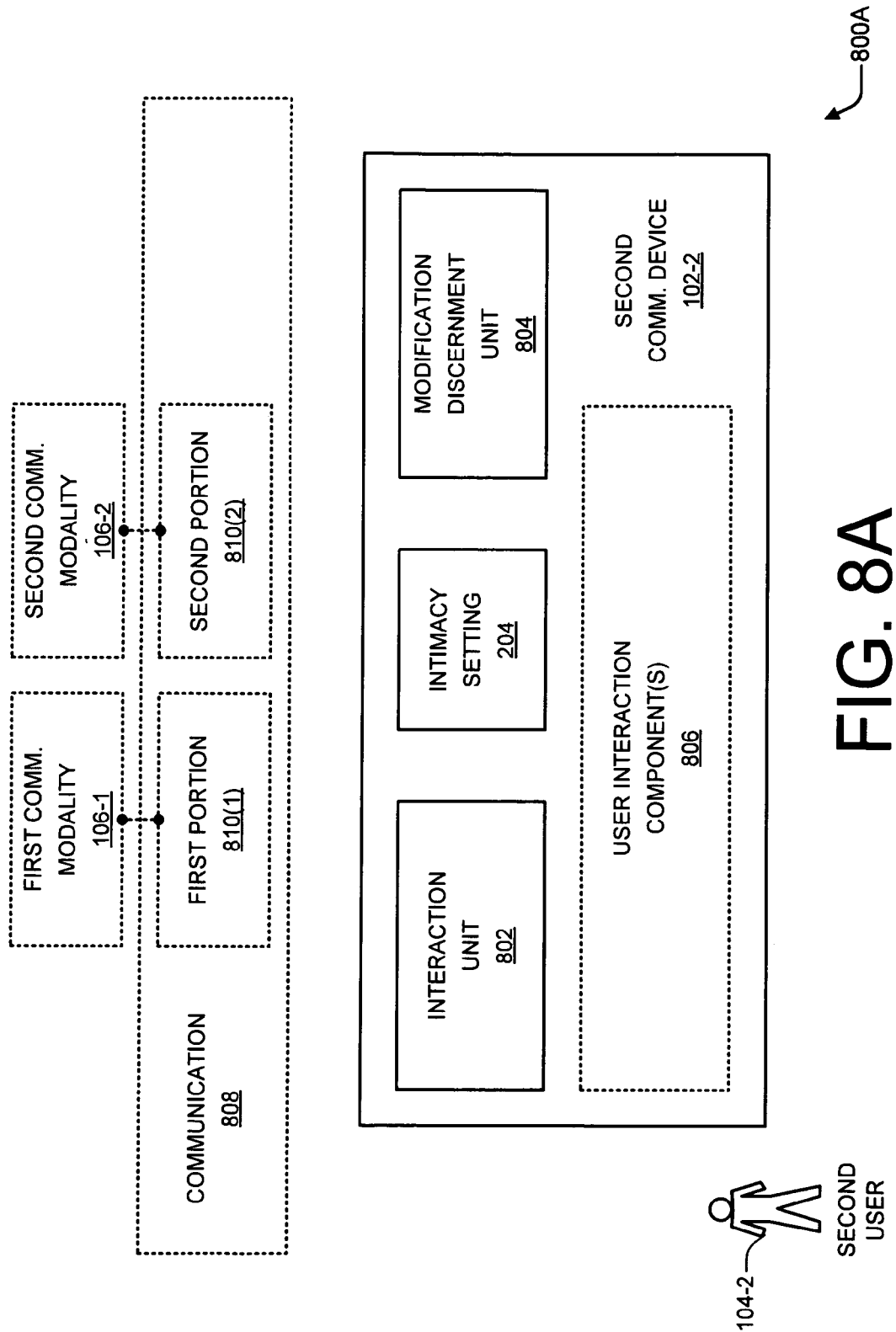
FIG. 8A is a schematic diagram including an example communication device for handling user interaction with a multi-modality communication responsive to a modification of at least one intimacy setting in accordance with certain example embodiments.

FIG. 8A is a schematic diagram 800A including an example communication device for handling user interaction with a multi-modality communication responsive to a modification of at least one intimacy setting in accordance with certain example embodiments. As shown in FIG. 8A, by way of example but not limitation, schematic diagram 800A may include a second communication device 102-2, a second user 104-2, a first communication modality 106-1, a second communication modality 106-2, or at least one communication 808. More specifically, a second communication device 102-2 of schematic diagram 800A may include at least one intimacy setting 204, at least one interaction unit 802, at least one modification discernment unit 804, or one or more user interaction components 806. Moreover, communication 808 may include one or more communication portions 810, such as a first portion 810(1) or a second portion 810(2).

For certain example embodiments, an interaction unit 802 or a modification discernment unit 804 may comprise a single component together, a single component apiece, multiple components (e.g., may be distributed across multiple components), or any combination thereof, and so forth. Example components for a communication device 102 are described herein above with particular reference to at least FIG. 4. By way of example but not limitation, an interaction unit 802 or a modification discernment unit 804 may fully or partially comprise at least one multi-modality-communication-related module, hardware, software, firmware, logic, circuitry, any combination thereof, and so forth. For certain example embodiments, one or more user interaction components 806 may comprise one or more user interface components 416 (e.g., at least one user input component 416a or at least one user output component 416b) (e.g., of FIG. 4); one or more communication interface components 410; at least one user interface feature 610 (e.g., at least one physical component 616 or at least one virtual component 618) (e.g., of any of FIGS. 6B-6F); one or more components that support, provide, utilize, etc. at least one user interface feature 610; any combination thereof; and so forth. However, claimed subject matter is not limited to any particular described embodiments, implementations, examples, etc.

For certain example embodiments, a second communication device 102-2 may comprise at least one interaction unit 802 or at least one modification discernment unit 804. An interaction unit 802 may be configured for interacting with a user for a first portion of a communication in a manner corresponding to a first communication modality in accordance with at least one intimacy setting; a modification discernment unit 804 may be configured for discerning at least one modification to at least one user interaction communication modality of the at least one intimacy setting; and interaction unit 802 may further be configured for interacting with the user for a second portion of the communication in a manner corresponding to a second communication modality in accordance with the at least one intimacy setting responsive at least partly to the at least one modification. By way of example but not limitation, an interaction unit 802 may be configured for interacting with a second user 104-2 for a first portion 810(1) of a communication 808 in a manner corresponding to a first communication modality 106-1 in accordance with at least one intimacy setting 204; a modification discernment unit 804 may be configured for discerning at least one modification to at least one user interaction communication modality of at least one intimacy setting 204; and interaction unit 802 may further be configured for interacting with second user 104-2 for a second portion 810(2) of communication 808 in a manner corresponding to a second communication modality 106-2 in accordance with at least one intimacy setting 204 responsive at least partly to the at least one modification. However, claimed subject matter is not limited to any particular described embodiments, implementations, examples, etc.

For certain example embodiments, a user interaction communication modality may comprise a communication modality, a communication modality option 614 (e.g., of any of FIGS. 6B-6F), a user input interaction communication modality, a user output interaction communication modality, an absolute or conditional communication modality to establish or change an intimacy setting 204, any combination thereof, and so forth. For certain example embodiments, a communication 808 may be related to or participated in by a first communication device 102-1, a first user 104-1, a second communication device 102-2, a second user 104-2, a third communication device, a third user, any combination thereof, and so forth. For certain example embodiments, a modification to at least one user interaction communication modality of at least one intimacy setting may comprise a change, an establishment, a cancellation, an alteration, an addition, a deletion, an expansion, a reduction, a combination thereof, etc. to at least one of a user input interaction communication modality or a user output interaction communication modality of at least one intimacy setting 204. However, claimed subject matter is not limited to any particular described embodiments, implementations, examples, etc.

FIGS. 8B-8F are schematic diagrams 800B-800F, respectively, that include other example communication devices having additional or alternative aspects for handling user interaction with a multi-modality communication responsive to a modification of at least one intimacy setting in accordance with certain example embodiments. For certain example embodiments, units, settings, buffers, other aspects, combinations thereof, etc. of schematic diagrams 800B-800F may comprise a single component together, a single component apiece, multiple components (e.g., may be distributed across multiple components), or any combination thereof, and so forth. Example components for a communication device 102 are described herein above with particular reference to at least FIG. 4. By way of example but not limitation, units, settings, buffers, other aspects, combinations thereof, etc. of schematic diagrams 800B-800F may fully or partially comprise at least one multi-modality-communication-related module, hardware, software, firmware, logic, circuitry, any combination thereof, and so forth. Furthermore, functionality of units, settings, buffers, other aspects, combinations thereof, etc. of schematic diagrams 800B-800F may additionally or alternatively be realized as one or more processes, methods, schemes, combinations thereof, and so forth. Although units, settings, buffers, other aspects, combinations thereof, etc. may be illustrated jointly in one or more of schematic diagrams 800B-800F or described together herein below, embodiments may additionally or alternatively included fewer than such jointly illustrated or described implementations.

Figure 8B:
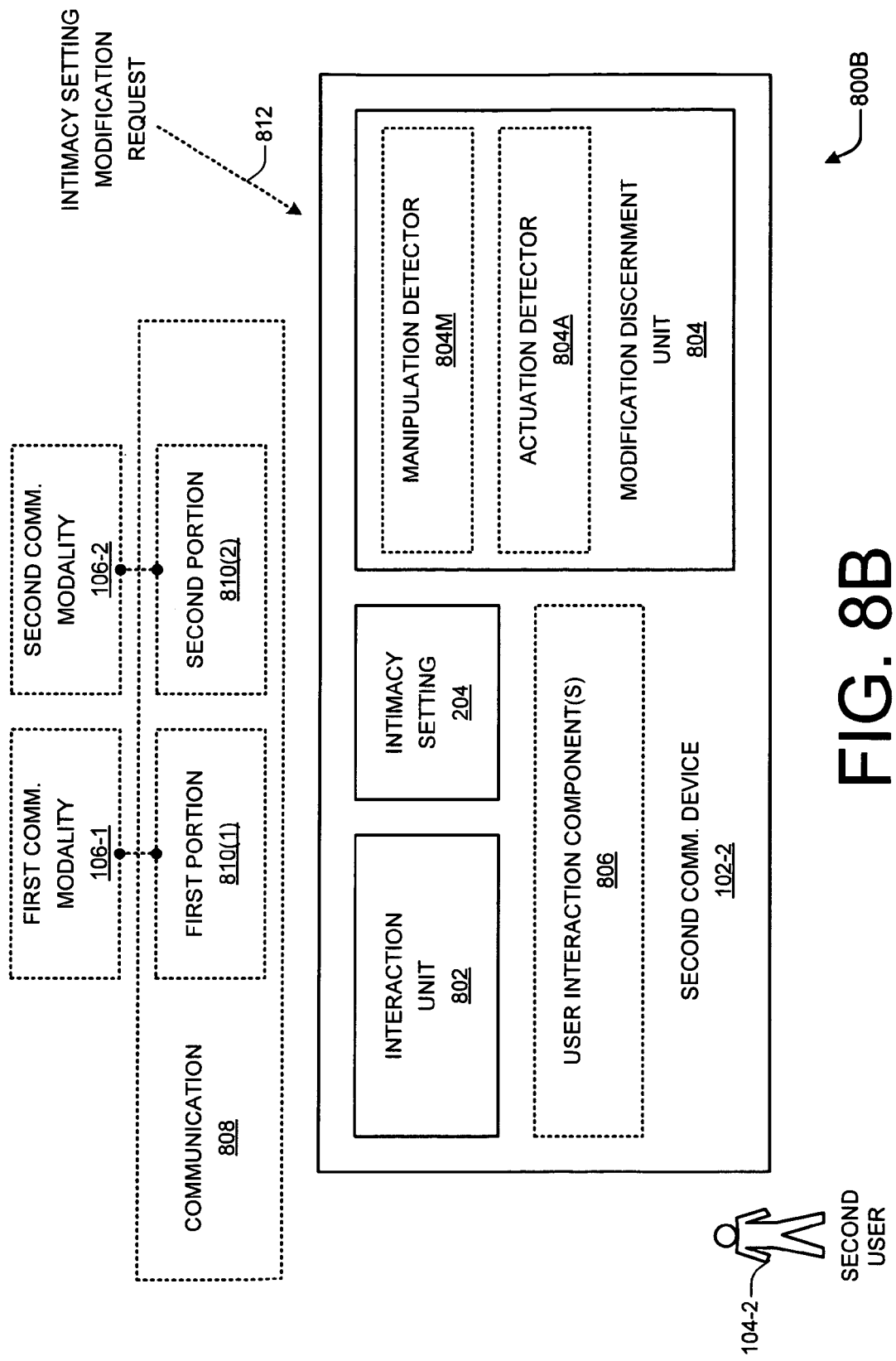
FIGS. 8B-8F are schematic diagrams including other example communication devices having additional or alternative aspects for handling user interaction with a multi-modality communication responsive to a modification of at least one intimacy setting in accordance with certain example embodiments.

FIG. 8B is a schematic diagram 800B including another example communication device for handling user interaction with a multi-modality communication responsive to a modification of at least one intimacy setting in accordance with certain example embodiments. As shown in FIG. 8B, by way of example but not limitation, schematic diagram 800B may include an intimacy setting modification request 812; or a second communication device 102-2 of schematic diagram 800B may further include a modification discernment unit 804 that may comprise a manipulation detector 804M or an actuation detector 804A.

For certain example embodiments, a modification discernment unit 804 may further comprise at least one manipulation detector 804M that is configured for detecting manipulation of at least one user interface feature that modifies the at least one user interaction communication modality of the at least one intimacy setting. By way of example but not limitation, a manipulation detector 804M may be configured for detecting manipulation of at least one user interface feature 610 that modifies at least one user interaction communication modality of at least one intimacy setting 204. However, claimed subject matter is not limited to any particular described embodiments, implementations, examples, etc.

For certain example embodiments, a manipulation detector 804M may further be configured for detecting manipulation of at least one physical component that realizes the at least one user interface feature. By way of example but not limitation, a manipulation detector 804M may further be configured for detecting manipulation of at least one physical component 616 that realizes at least one user interface feature 610. However, claimed subject matter is not limited to any particular described embodiments, implementations, examples, etc.

For certain example embodiments, a manipulation detector 804M may further be configured for detecting manipulation of at least one virtual component that realizes the at least one user interface feature. By way of example but not limitation, a manipulation detector 804M may further be configured for detecting manipulation of at least one virtual component 618 that realizes at least one user interface feature 610. However, claimed subject matter is not limited to any particular described embodiments, implementations, examples, etc.

For certain example embodiments, a modification discernment unit 804 may further comprise at least one actuation detector 804A that is configured for detecting actuation of at least one multi-modality communication auto-activation feature that modifies the at least one user interaction communication modality of the at least one intimacy setting. By way of example but not limitation, an actuation detector 804A may be configured for detecting actuation of at least one multi-modality communication auto-activation feature that modifies at least one user interaction communication modality of at least one intimacy setting 204. For certain example implementations, a second communication device 102-2 may include an auto-activation unit (not explicitly shown) that activates at least one feature that causes a communication corresponding to at least one communication modality to comprise a multi-modality communication corresponding to at least two communication modalities based, at least partly, on one or more parameters (e.g., without contemporaneous user control at a time of activation). Examples of parameters may include, but are not limited to, an executing application, an identity of a party participating in a communication, a day or time, a location of a communication device, an identity or identifies of person(s) that are proximate to a communication device, an ambient sound level, motions that are being experienced by a communication device, a calendar entry, any combination thereof, and so forth. If an auto-activation unit determines that one or more parameters are met, satisfied, a combination thereof, etc., an auto-activation unit may modify at least one user interaction communication modality of at least one intimacy setting 204 during a communication 808. However, claimed subject matter is not limited to any particular described embodiments, implementations, examples, etc.

For certain example embodiments, a modification discernment unit 804 may further comprise at least one actuation detector 804A that is configured for detecting actuation of at least one multi-modality communication remote induction feature that modifies the at least one user interaction communication modality of the at least one intimacy setting. By way of example but not limitation, an actuation detector 804A may be configured for detecting actuation of at least one multi-modality communication remote induction feature that modifies at least one user interaction communication modality of at least one intimacy setting 204. For certain example implementations, a second communication device 102-2 may include a remote induction unit (not explicitly shown) that enables a remote entity (e.g., a first communication device 102-1, a first user 104-1, a network communication device 110, a combination thereof, etc.) to induce second communication device 102-2 to modify at least one user interaction communication modality of at least one intimacy setting 204. By way of example only, a second communication device 102-2 may receive at least one intimacy setting modification request 812 from a remote entity, or a remote induction unit may modify at least one user interaction communication modality of at least one intimacy setting 204 in response to an intimacy setting modification request 812. An example actuation detector 804A may detect receipt of an intimacy setting modification request 812, may detect operation of a remote induction unit, may detect modification of at least one user interaction communication modality of at least one intimacy setting 204, any combination thereof, and so forth. However, claimed subject matter is not limited to any particular described embodiments, implementations, examples, etc.

Figure 8C:
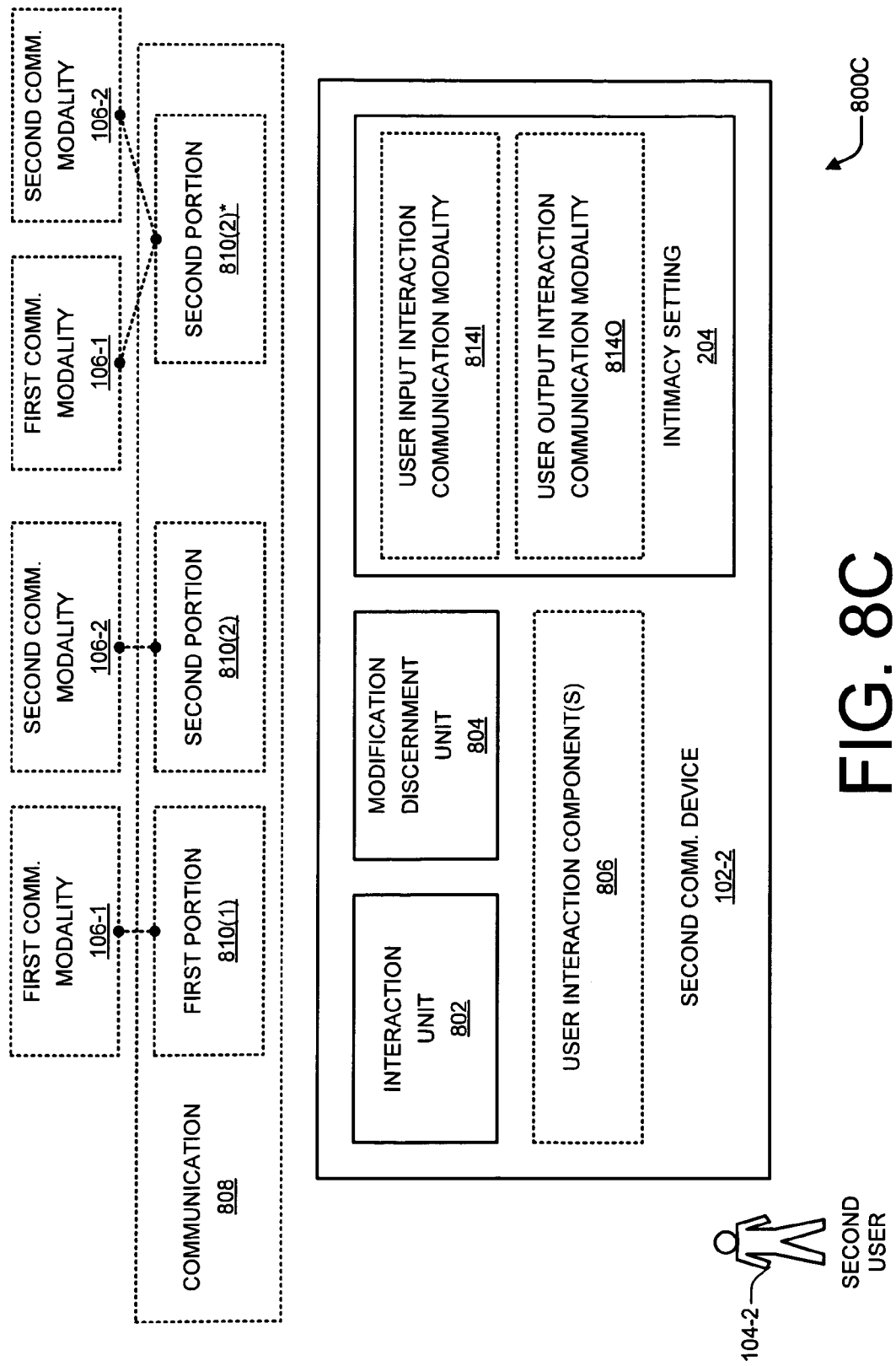

FIG. 8C is a schematic diagram 800C including another example communication device for handling user interaction with a multi-modality communication responsive to a modification of at least one intimacy setting in accordance with certain example embodiments. As shown in FIG. 8C, by way of example but not limitation, a second communication device 102-2 of schematic diagram 800C may further include at least one intimacy setting 204 that may comprise a user input interaction communication modality 814I or a user output interaction communication modality 814O. Although two user interaction communication modalities 814 are shown in schematic diagram 800C for at least one intimacy setting 204, one or more than two may alternatively be implemented. Furthermore, although separate input and output user interaction communication modalities are shown in schematic diagram 800C for at least one intimacy setting 204, one or more joint or combined user interaction communication modalities may additionally or alternatively be implemented.

For certain example embodiments, an interaction unit 802 that is configured for interacting with a user for a first portion of a communication in a manner corresponding to a first communication modality in accordance with at least one intimacy setting may further be configured for accepting user input from the user for the first portion of the communication in a manner corresponding to the first communication modality in accordance with the at least one intimacy setting; and an interaction unit 802 that is configured for interacting with the user for a second portion of the communication in a manner corresponding to a second communication modality in accordance with the at least one intimacy setting responsive at least partly to the at least one modification may further be configured for accepting user input from the user for the second portion of the communication in a manner corresponding to the second communication modality in accordance with the at least one intimacy setting as modified by the at least one modification. By way of example but not limitation, at least a user input interaction communication modality 814I may be modified to comprise a user interaction communication modality corresponding to a second communication modality 106-2. By way of further example but not limitation, an interaction unit 802 that is configured for interacting with a second user 104-2 for a first portion 810(1) of a communication 808 in a manner corresponding to a first communication modality 106-1 in accordance with at least one intimacy setting 204 (e.g., a user input interaction communication modality 814I) may further be configured for accepting user input from second user 104-2 for first portion 810(1) of communication 808 in a manner corresponding to first communication modality 106-1 in accordance with at least one intimacy setting 204; and an interaction unit 802 that is configured for interacting with second user 104-2 for a second portion 810(2) of communication 808 in a manner corresponding to a second communication modality 106-2 in accordance with at least one intimacy setting 204 responsive at least partly to at least one modification (e.g., of user input interaction communication modality 814I) may further be configured for accepting user input from second user 104-2 for second portion 810(2) of communication 808 in a manner corresponding to second communication modality 106-2 in accordance with at least one intimacy setting 204 as modified by the at least one modification (e.g., to user input interaction communication modality 814I). However, claimed subject matter is not limited to any particular described embodiments, implementations, examples, etc.

For certain example embodiments, an interaction unit 802 that is configured for interacting with a user for a first portion of a communication in a manner corresponding to a first communication modality in accordance with at least one intimacy setting may further be configured for presenting user output to the user for the first portion of the communication in a manner corresponding to the first communication modality in accordance with the at least one intimacy setting; and an interaction unit 802 that is configured for interacting with the user for a second portion of the communication in a manner corresponding to a second communication modality in accordance with the at least one intimacy setting responsive at least partly to the at least one modification may further be configured for presenting user output to the user for the second portion of the communication in a manner corresponding to the second communication modality in accordance with the at least one intimacy setting as modified by the at least one modification. By way of example but not limitation, at least a user output interaction communication modality 814O may be modified to comprise a user interaction communication modality corresponding to a second communication modality 106-2. By way of further example but not limitation, an interaction unit 802 that is configured for interacting with a second user 104-2 for a first portion 810(1) of a communication 808 in a manner corresponding to a first communication modality 106-1 in accordance with at least one intimacy setting 204 (e.g., a user output interaction communication modality 814O) may further be configured for presenting user output to second user 104-2 for first portion 810(1) of communication 808 in a manner corresponding to first communication modality 106-1 in accordance with at least one intimacy setting 204; and an interaction unit 802 that is configured for interacting with second user 104-2 for a second portion 810(2) of communication 808 in a manner corresponding to a second communication modality 106-2 in accordance with at least one intimacy setting 204 responsive at least partly to at least one modification (e.g., of user output interaction communication modality 814O) may further be configured for presenting user output to second user 104-2 for second portion 810(2) of communication 808 in a manner corresponding to second communication modality 106-2 in accordance with at least one intimacy setting 204 as modified by the at least one modification (e.g., to user output interaction communication modality 814O). However, claimed subject matter is not limited to any particular described embodiments, implementations, examples, etc.

For certain example embodiments, an interaction unit 802 that is configured for interacting with a user for a first portion of a communication in a manner corresponding to a first communication modality in accordance with at least one intimacy setting may further be configured for accepting user input from the user for the first portion of the communication in a manner corresponding to the first communication modality in accordance with the at least one intimacy setting and for presenting user output to the user for the first portion of the communication in a manner corresponding to the first communication modality in accordance with the at least one intimacy setting; and an interaction unit 802 that is configured for interacting with the user for a second portion of the communication in a manner corresponding to a second communication modality in accordance with the at least one intimacy setting responsive at least partly to the at least one modification may further be configured for accepting user input from the user for the second portion of the communication in a manner corresponding to the first communication modality in accordance with the at least one intimacy setting and for presenting user output to the user for the second portion of the communication in a manner corresponding to the second communication modality in accordance with the at least one intimacy setting as modified by the at least one modification. By way of example but not limitation, a user output interaction communication modality 814O (but not a user input interaction communication modality 814I) may be modified to comprise a user interaction communication modality corresponding to a second communication modality 106-2. By way of further example but not limitation, an interaction unit 802 that is configured for interacting with a second user 104-2 for a first portion 810(1) of a communication 808 in a manner corresponding to a first communication modality 106-1 in accordance with at least one intimacy setting 204 may further be configured for accepting user input from second user 104-2 for first portion 810(1) of communication 808 in a manner corresponding to first communication modality 106-1 in accordance with at least one intimacy setting 204 (e.g., a user input interaction communication modality 814I) and for presenting user output to second user 104-2 for first portion 810(1) of communication 808 in a manner corresponding to first communication modality 106-1 in accordance with at least one intimacy setting 204 (e.g., a user output interaction communication modality 814O); and an interaction unit 802 that is configured for interacting with second user 104-2 for a second portion 810(2)* of communication 808 in a manner corresponding to a second communication modality 106-2 in accordance with at least one intimacy setting 204 responsive at least partly to at least one modification may further be configured for accepting user input from second user 104-2 for second portion 810(2)* of communication 808 in a manner corresponding to first communication modality 106-1 in accordance with at least one intimacy setting 204 (e.g., user input interaction communication modality 814I) and for presenting user output to second user 104-2 for second portion 810(2)* of communication 808 in a manner corresponding to second communication modality 106-2 in accordance with at least one intimacy setting 204 (e.g., user output interaction communication modality 814O) as modified by the at least one modification. Additionally or alternatively, a user input interaction communication modality 814I (but not a user output interaction communication modality 814O) may be modified to comprise a user interaction communication modality corresponding to a second communication modality 106-2. However, claimed subject matter is not limited to any particular described embodiments, implementations, examples, etc.

For certain example embodiments, a communication device may be realized wherein the at least one intimacy setting comprises at least one user input interaction communication modality and at least one user output interaction communication modality and wherein a modification discernment unit 804 that is configured for discerning at least one modification to at least one user interaction communication modality of the at least one intimacy setting may further be configured for discerning the at least one modification with respect to the at least one user input interaction communication modality of the at least one intimacy setting. By way of example but not limitation, a second communication device 102-2 may be realized such that at least one intimacy setting 204 comprises at least one user input interaction communication modality 814I and at least one user output interaction communication modality 814O and wherein a modification discernment unit 804 that is configured for discerning at least one modification to at least one user interaction communication modality 814 of at least one intimacy setting 204 may further be configured for discerning the at least one modification with respect to at least one user input interaction communication modality 814I of at least one intimacy setting 204. Additionally or alternatively, a modification discernment unit 804 may further be configured for discerning the at least one modification with respect to at least one user output interaction communication modality 814O of at least one intimacy setting 204. However, claimed subject matter is not limited to any particular described embodiments, implementations, examples, etc.

For certain example embodiments, a modification discernment unit 804 that is configured for discerning at least one modification to at least one user interaction communication modality of the at least one intimacy setting may further be configured for discerning that the at least one modification to the at least one user interaction communication modality of the at least one intimacy setting comprises a change from the first communication modality to the second communication modality. By way of example but not limitation, a modification discernment unit 804 that is configured for discerning at least one modification to at least one user interaction communication modality 814 of at least one intimacy setting 204 may further be configured for discerning that the at least one modification to at least one user interaction communication modality 814 of at least one intimacy setting 204 comprises a change from first communication modality 106-1 to second communication modality 106-2. However, claimed subject matter is not limited to any particular described embodiments, implementations, examples, etc.

For certain example embodiments, a communication device may be realized wherein the first communication modality comprises a communication modality selected from a group of communication modalities comprising: voice communication, textual communication, or video communication; the second communication modality comprises a communication modality selected from a group of communication modalities comprising: voice communication, textual communication, or video communication; and the first communication modality differs from the second communication modality. By way of example but not limitation, a second communication device 102-2 may be realized wherein a first communication modality 106-1 comprises a communication modality selected from a group of communication modalities comprising: voice communication, textual communication, or video communication; a second communication modality 106-2 comprises a communication modality selected from a group of communication modalities comprising: voice communication, textual communication, or video communication; and first communication modality 106-1 differs from second communication modality 106-2. However, claimed subject matter is not limited to any particular described embodiments, implementations, examples, etc.

Figure 8D:
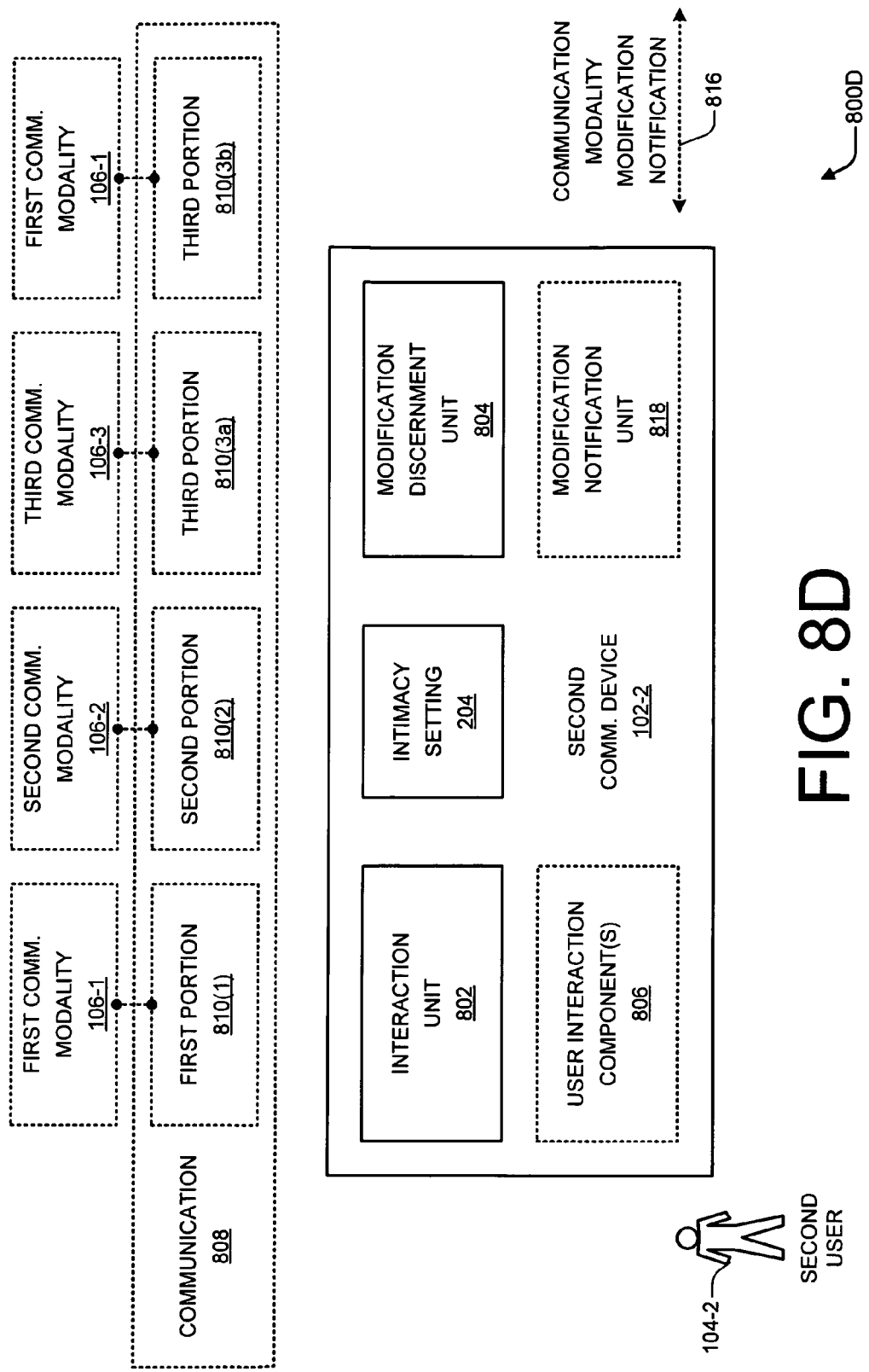

FIG. 8D is a schematic diagram 800D including another example communication device for handling user interaction with a multi-modality communication responsive to a modification of at least one intimacy setting in accordance with certain example embodiments. As shown in FIG. 8D, by way of example but not limitation, a communication 808 of schematic diagram 800D may further include at least a third portion 810(3a) or 810(3b); schematic diagram 800D may further include at least a third communication modality 106-3 or one or more communication modality modification notifications 816; and a second communication device 102-2 of schematic diagram 800D may further include at least one modification notification unit 818.

For certain example embodiments, a communication device may further comprise a modification discernment unit 804 that is configured for discerning at least one other modification to the at least one user interaction communication modality of the at least one intimacy setting and an interaction unit 802 that is configured for interacting with the user for a third portion of the communication in a manner corresponding to a third communication modality in accordance with the at least one intimacy setting responsive at least partly to the at least one other modification. By way of example but not limitation, a second communication device 102-2 may further include a modification discernment unit 804 that is configured for discerning at least one other modification to at least one user interaction communication modality (e.g., to a third communication modality 106-3) of at least one intimacy setting 204 and an interaction unit 802 that is configured for interacting with a second user 104-2 for a third portion 810(3a) of communication 808 in a manner corresponding to a third communication modality 106-3 in accordance with the at least one intimacy setting 204 responsive at least partly to the at least one other modification. For certain example implementations, a second communication device 102-2 may enable another change to a different user interaction communication modality during a given communication 808. However, claimed subject matter is not limited to any particular described embodiments, implementations, examples, etc.

For certain example embodiments, a communication device may further comprise a modification discernment unit 804 that is configured for discerning at least one other modification to the at least one user interaction communication modality of the at least one intimacy setting and an interaction unit 802 that is configured for interacting with the user for a third portion of the communication in a manner corresponding to the first communication modality in accordance with the at least one intimacy setting responsive at least partly to the at least one other modification. By way of example but not limitation, a second communication device 102-2 may further comprise a modification discernment unit 804 that is configured for discerning at least one other modification to at least one user interaction communication modality of at least one intimacy setting 204 and an interaction unit 802 that is configured for interacting with a second user 104-2 for a third portion 810(3b) of communication 808 in a manner corresponding to a first communication modality 106-1 in accordance with at least one intimacy setting 204 responsive at least partly to the at least one other modification. For certain example implementations, a second communication device 102-2 may enable a change "back" to a previous user interaction communication modality during a given communication 808. However, claimed subject matter is not limited to any particular described embodiments, implementations, examples, etc.

For certain example embodiments, a communication device may further comprise a modification notification unit 818 that is configured for sending at least one notification to at least one other party participating in the communication responsive at least partly to the at least one modification, the at least one notification indicating that the user is to interact with the communication device in a manner corresponding to the second communication modality. By way of example but not limitation, a modification notification unit 818 of a second communication device 102-2 may be configured for sending at least one notification (e.g., a communication modality modification notification 816) to at least one other party participating in communication 808 (e.g., a first user 104-1, a first communication device 102-1, a network communication device 110, a combination thereof, etc.) responsive at least partly to at least one modification, with the at least one notification indicating that a second user 104-2 is to interact with second communication device 102-2 in a manner corresponding to a second communication modality 106-2. For certain example implementations, a communication modality modification notification 816 (that is sent or received) may indicate a previous communication modality; a new communication modality; a modified communication modality; a planned, expected, or requested mechanism for conversion between communication modalities; a request to perform a conversion; a request for permission to make a modification; a time at which a modification is to occur; any combination thereof, and so forth. However, claimed subject matter is not limited to any particular described embodiments, implementations, examples, etc.

For certain example embodiments, a communication device may comprise a modification notification unit 818 that is configured for sending at least one notification to at least one network communication device that is related to the communication responsive at least partly to the at least one modification, the at least one notification indicating that the user is to interact with the communication device in a manner corresponding to the second communication modality. By way of example but not limitation, a modification notification unit 818 of a second communication device 102-2 may be configured for sending at least one notification (e.g., a communication modality modification notification 816) to at least one network communication device (e.g., a network communication device 110) that is related to a communication 808 responsive at least partly to at least one modification, with the at least one notification indicating that a second user 104-2 is to interact with second communication device 102-2 in a manner corresponding to second communication modality 106-2. A network communication device 110 may be related to a communication 808 if, by way of example only, a network communication device 110 facilitated establishment (e.g., setting up, initiating, a combination thereof, etc.) of communication 808, a network communication device 110 is propagating communication data for communication 808, a network communication device 110 is performing a communication modality conversion for communication 808, a network communication device 110 exerts a measure of control over a communication device 102 (e.g., a user or communication device is registered or contracted with a network communication device or owner/operator thereof) that is participating in communication 808, any combination thereof, and so forth. However, claimed subject matter is not limited to any particular described embodiments, implementations, examples, etc.

For certain example embodiments, a communication device may comprise a modification notification unit 818 that is configured for receiving at least one notification from at least one other party participating in the communication, the at least one notification indicating that the at least one other party is to change a user interaction communication modality of the at least one other party and for presenting to the user a person-perceptible indication that the at least one other party participating in the communication is to change the user interaction communication modality of the at least one other party. By way of example but not limitation, a modification notification unit 818 of a second communication device 102-2 may be configured for receiving at least one notification (e.g., a communication modality modification notification 816) from at least one other party (e.g., a first user 104-1, a first communication device 102-1, a network communication device 110, a combination thereof, etc.) participating in a communication 808, with the at least one notification indicating that the at least one other party is to change a user interaction communication modality of the at least one other party and for presenting to a second user 104-2 a person-perceptible indication that the at least one other party participating in communication 808 is to change the user interaction communication modality of the at least one other party. For certain example implementations, a modification notification unit 818 (which may operate in conjunction with a user interface feature controller 606, etc.) may present a visual, aural, haptic, a combination thereof, etc. indication that another party to a communication 808 is to change a user interaction communication modality. However, claimed subject matter is not limited to any particular described embodiments, implementations, examples, etc.

Figure 8E:
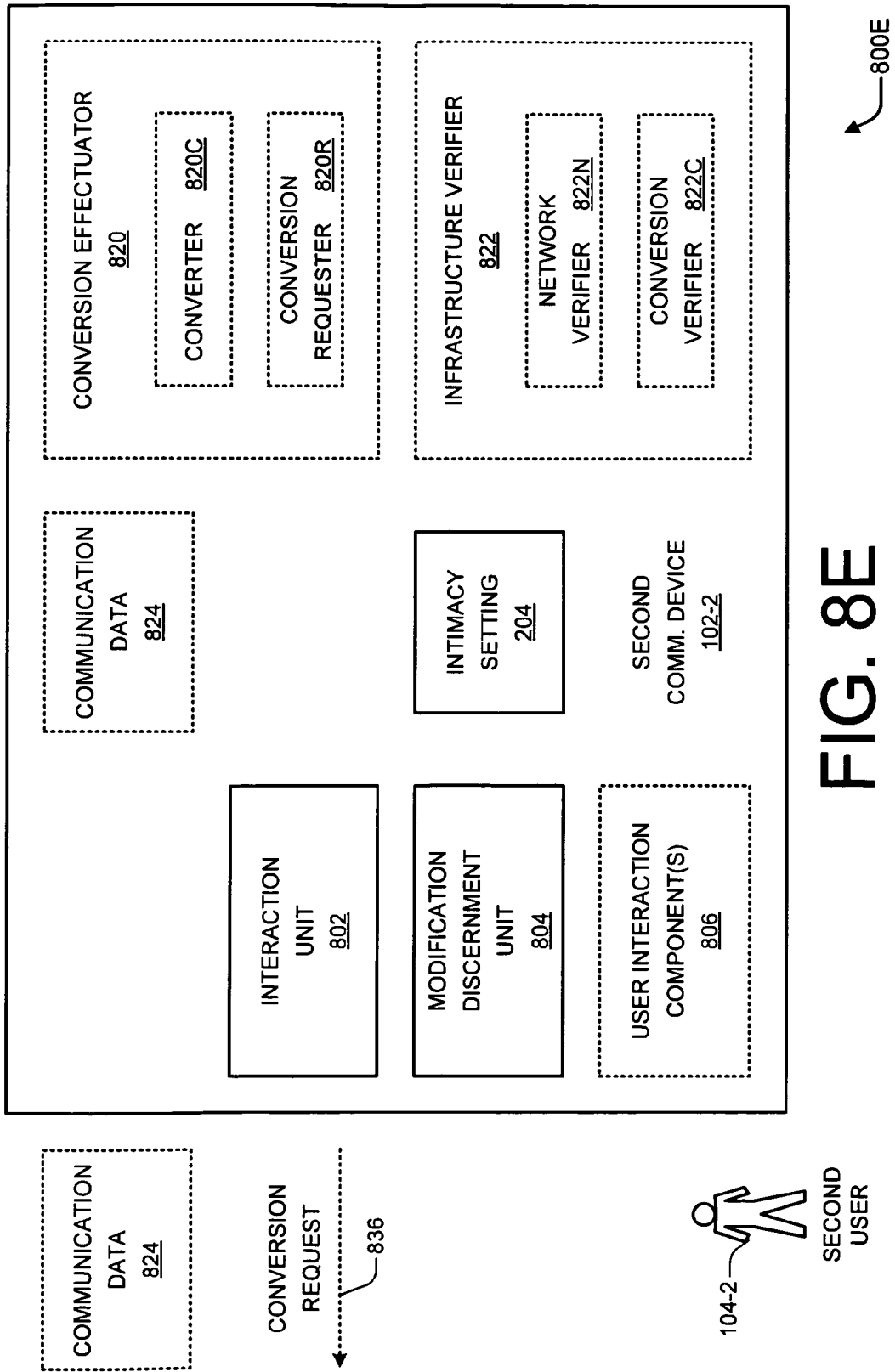

FIG. 8E is a schematic diagram 800E including another example communication device for handling user interaction with a multi-modality communication responsive to a modification of at least one intimacy setting in accordance with certain example embodiments. As shown in FIG. 8E, by way of example but not limitation, schematic diagram 800E may include communication data 824 or at least one conversion request 836; a second communication device 102-2 of schematic diagram 800E may further include communication data 824 or at least one conversion effectuator 820 or at least one infrastructure verifier 822; a conversion effectuator 820 may include a conversion requester 820R or a converter 820C; or an infrastructure verifier 822 may include a network verifier 822N or a conversion verifier 822C. Communication data 824 may be located internal to or external to a second communication device 102-2.

For certain example embodiments, a communication device may further comprise a conversion effectuator that is configured for effectuating at least one conversion of communication data from corresponding to the second communication modality or to corresponding to the second communication modality responsive at least partly to the at least one modification. By way of example but not limitation, a second communication device 102-2 may comprise a conversion effectuator 820 that is configured for effectuating at least one conversion of communication data 824 from corresponding to a second communication modality 106-2 or to corresponding to second communication modality 106-2 responsive at least partly to at least one modification. For certain example implementations, a conversion effectuator 820 may cause communication data 824 corresponding to a first communication modality 106-1 to be converted so as to correspond to a second communication modality 106-2, may cause communication data 824 corresponding to a second communication modality 106-2 to be converted so as to correspond to a first communication modality 106-1, any combination thereof, and so forth. However, claimed subject matter is not limited to any particular described embodiments, implementations, examples, etc.

For certain example embodiments, a conversion effectuator 820 that is configured for effectuating at least one conversion of communication data from corresponding to the second communication modality or to corresponding to the second communication modality responsive at least partly to the at least one modification may include a converter 820C that is configured for converting the communication data at least one of from corresponding to the second communication modality or to corresponding to the second communication modality. By way of example but not limitation, a converter 820C (e.g., a converter 202b of FIG. 2) may be configured for converting communication data 824 at least one of from corresponding to a second communication modality 106-2 or to corresponding to second communication modality 106-2. However, claimed subject matter is not limited to any particular described embodiments, implementations, examples, etc.

For certain example embodiments, a conversion effectuator 820 that is configured for effectuating at least one conversion of communication data from corresponding to the second communication modality or to corresponding to the second communication modality responsive at least partly to the at least one modification may include a conversion requestor 820R that is configured for requesting that at least one network communication device convert the communication data at least one of from corresponding to the second communication modality or to corresponding to the second communication modality. By way of example but not limitation, a conversion requestor 820R may be configured for requesting that at least one network communication device 110 convert (e.g., using a converter 202c of FIG. 2) communication data 824 at least one of from corresponding to a second communication modality 106-2 or to corresponding to second communication modality 106-2. For certain example implementations, a second communication device 102-2 may send (e.g., via one or more channels 108) at least one conversion request 836 to at least one network communication device 110 requesting a conversion of communication data 824. A conversion request 836 may include, by way of example only, an origination format/encoding, a destination format/encoding, a specified latency, at least one preferred conversion provider, whether authorization exists for a conversion to be performed by another (e.g., farmed out), any combination thereof, and so forth. However, claimed subject matter is not limited to any particular described embodiments, implementations, examples, etc.

For certain example embodiments, a conversion effectuator 820 that is configured for effectuating at least one conversion of communication data from corresponding to the second communication modality or to corresponding to the second communication modality responsive at least partly to the at least one modification may include a conversion requestor 820R that is configured for requesting that at least one other communication device, which is associated with at least one other party participating in the communication, convert the communication data at least one of from corresponding to the second communication modality or to corresponding to the second communication modality. By way of example but not limitation, a conversion requestor 820R may be configured for requesting that at least one other communication device (e.g., a first communication device 102-1), which is associated with at least one other party (e.g., a first user 104-1, a first communication device 102-1, a combination thereof, etc.) that is participating in a communication, perform a conversion (e.g., using a converter 202a of FIG. 2) communication data 824 at least one of from corresponding to a second communication modality 106-2 or to corresponding to second communication modality 106-2. For certain example implementations, a second communication device 102-2 may send (e.g., via one or more channels 108) at least one conversion request 836 to at least one other communication device 102 requesting a conversion of communication data 824. However, claimed subject matter is not limited to any particular described embodiments, implementations, examples, etc.

For certain example embodiments, a communication device may further comprise an infrastructure verifier 822 that is configured for verifying if infrastructure is available to accommodate a change of the at least one intimacy setting to the second communication modality responsive at least partly to the at least one modification. By way of example but not limitation, an infrastructure verifier 822 may be configured for verifying if infrastructure is available to accommodate a change of at least one intimacy setting 204 to a second communication modality 106-2 responsive at least partly to the at least one modification. For certain example implementations, infrastructure to be verified may be pertinent to absolute or current capabilities of a second communication device 102-2, absolute or current capabilities of a first communication device 102-1, absolute or current capabilities of at least one network communication device 110 that is related to a communication, any combination thereof, and so forth. Absolute capabilities may refer to if a capability may exist for a given device (e.g., in accordance with manufacturing specs, operating system capabilities, installed applications, a combination thereof, etc.); current capabilities may refer to if a device has a capability at a current time given other demands on a device. For certain example implementations, if infrastructure is not available to accommodate a change of at least one intimacy setting 204 to a second communication modality 106-2, partial or full implementation of a multi-modality communication that is to include communication data corresponding to second communication modality 106-2 may be prevented, implementation of a multi-modality communication including communication data corresponding to second communication modality 106-2 may be rolled back or canceled, a warning or error message may be presented to at least one user (e.g., to a second user 104-2), any combination thereof, and so forth. However, claimed subject matter is not limited to any particular described embodiments, implementations, examples, etc.

For certain example embodiments, an infrastructure verifier 822 that is configured for verifying if infrastructure is available to accommodate a change of the at least one intimacy setting to the second communication modality responsive at least partly to the at least one modification may include a network verifier 822N that is configured for verifying if a current network connection is capable of supporting the second communication modality with respect to the communication device. By way of example but not limitation, a network verifier 822N may be configured for verifying if a current network connection is capable of supporting a second communication modality 106-2 with respect to a second communication device 102-2. For certain example implementations, a current network connection of a second communication device 102-2 may be checked to determine if offers adequate bandwidth, if it meets a minimum latency requirement, if it is permissible or if it violates a service/usage agreement with respect to a network service provider/operator, any combination thereof, and so forth. For instance, if a second communication device 102-2 is currently on a cellular or low-grade Wi-Fi network connection, such a network connection may not be capable of handling a second communication modality 106-2 that comprises a video modality. However, claimed subject matter is not limited to any particular described embodiments, implementations, examples, etc.

For certain example embodiments, an infrastructure verifier 822 that is configured for verifying if infrastructure is available to accommodate a change of the at least one intimacy setting to the second communication modality responsive at least partly to the at least one modification may include a conversion verifier 822C that is configured for verifying if conversion functionality is accessible for application to the communication with regard to communication data corresponding to the second communication modality. By way of example but not limitation, a conversion verifier 822C may be configured for verifying if conversion functionality (e.g., a converter 202 of FIG. 2) (e.g., at a second communication device 102-2, at at least one network communication device 110, at a first communication device 102-1, a combination thereof, etc.) is accessible for application to a communication with regard to communication data that corresponds to a second communication modality 106-2. For certain example implementations, available conversion functionality may be checked to determine if it offers an ability to convert communication data to corresponding to a second communication modality 106-2, an ability to convert communication data from corresponding to a second communication modality 106-2, an ability to convert to or from corresponding to a second communication modality 106-2 at a sufficiently fast rate, any combination thereof, and so forth. However, claimed subject matter is not limited to any particular described embodiments, implementations, examples, etc.

Figure 8F:
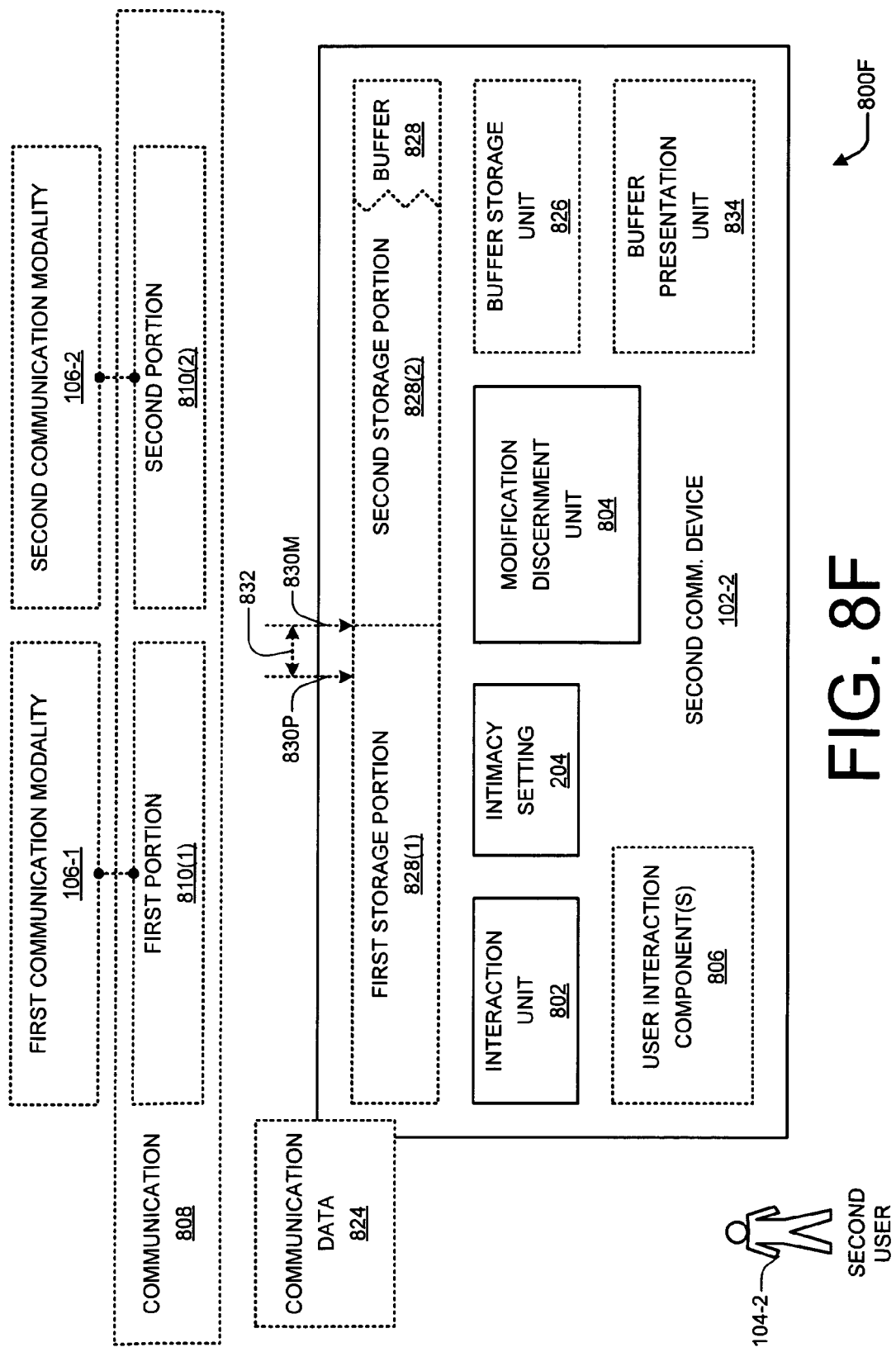

FIG. 8F is a schematic diagram 800F including another example communication device for handling user interaction with a multi-modality communication responsive to a modification of at least one intimacy setting in accordance with certain example embodiments. As shown in FIG. 8F, by way of example but not limitation, a second communication device 102-2 of schematic diagram 800F may further include at least one buffer storage unit 826, at least one buffer 828, or at least one buffer presentation unit 834; or buffer 828 may include at least a first storage portion 828(1) or a second storage portion 828(2).

For certain example embodiments, a communication device may further comprise a buffer storage unit 826 that is configured for storing in at least one buffer communication data for the communication in a format corresponding to at least one of the first communication modality or the second communication modality. By way of example but not limitation, a buffer storage unit 826 may be configured for storing in at least one buffer 828 communication data 824 for a communication 808 in a format corresponding to at least one of a first communication modality 106-1 or a second communication modality 106-2. For instance, communication data 824 may be stored in buffer 828 (e.g., in one or more media 404) in a sound format (e.g., mp3), in a text format (e.g., plain text, HTML, XML, etc.), in a video format (e.g., MPEG4), in multiple formats, etc. such that communication data 824 may be presented without conversion (although, e.g., decoding may be involved as part of a presentation). Some formats (e.g., HTML5) may correspond to multiple different communication modalities 106. However, claimed subject matter is not limited to any particular described embodiments, implementations, examples, etc.

For certain example embodiments, a buffer storage unit 826 that is configured for storing in at least one buffer communication data for the communication in a format corresponding to at least one of the first communication modality or the second communication modality may further be configured for storing in the at least one buffer communication data for the communication in a first format corresponding to the first communication modality and in a second format corresponding to the second communication modality. By way of example but not limitation, a buffer storage unit 826 may be configured for storing in at least one buffer 828 communication data 824 for a communication 808 in a first format corresponding to a first communication modality 106-1 and in a second format corresponding to a second communication modality 106-2. For certain example implementations, a buffer 828 may be separated into at least a first storage portion 828(1) or a second storage portion 828(2). By way of example only, first storage portion 828(1) may correspond to first portion 810(1) of communication 808, or second storage portion 828(2) may correspond to second portion 810(2) of communication 808. For certain example implementations, a buffer storage unit 826 may store communication data 824 in a first storage portion 828(1) of at least one buffer 828 in a format that corresponds to a first communication modality 106-1 or may store communication data 824 in a second storage portion 828(2) of at least one buffer 828 in a format that corresponds to a second communication modality 106-2. Additionally or alternatively, a buffer storage unit 826 may store communication data 824 in a first storage portion 828(1) of at least one buffer 828 in a format that corresponds to a second communication modality 106-2 or may store communication data 824 in a second storage portion 828(2) of at least one buffer 828 in a format that corresponds to a first communication modality 106-1 (e.g., before or after conversion). Additionally or alternatively, a buffer storage unit 826 may store communication data 824 in a first storage portion 828(1) in a format that corresponds to a first communication modality 106-1 and in a format that corresponds to a second communication modality 106-2 or may store communication data 824 in a second storage portion 828(2) in a format that corresponds to a first communication modality 106-1 and in a format that corresponds to a second communication modality 106-2. However, claimed subject matter is not limited to any particular described embodiments, implementations, examples, etc.

For certain example embodiments, a communication device may further comprise a buffer presentation unit that is configured for providing a user interface that enables the user to re-present at least a portion of the communication and switch at least between experiencing a re-presentation in a manner that corresponds to the first communication modality and experiencing the re-presentation in a manner that corresponds to the second communication modality using the communication data that is stored in the at least one buffer. By way of example but not limitation, a buffer presentation unit 834 may be configured for providing a user interface (e.g., via one or more of a user interface feature controller 606, a user interface feature 610, a user interface feature provider 612, a combination thereof, etc.) that enables a second user 104-2 to re-present (e.g., display on a screen or via projection, play on a speaker, a combination thereof, etc.) (e.g., via one or more user interaction components 806) at least a portion of a communication 808 and switch at least between experiencing a re-presentation in a manner that corresponds to a first communication modality 106-1 or experiencing the re-presentation in a manner that corresponds to a second communication modality 106-2 using communication data 824 that is stored in at least one buffer 828. For certain example implementations, a buffer presentation unit 824 may be capable of playing back a communication 808 stored in a buffer 828 (e.g., as first storage portion 828(1), second storage portion 828(2), a combination thereof, etc.) using a format in which communication data 824 is stored, using a different format (e.g., via effectuating a conversion), any combination thereof, and so forth. However, claimed subject matter is not limited to any particular described embodiments, implementations, examples, etc.

For certain example embodiments, a communication device may further comprise a buffer presentation unit that is configured for presenting to the user at least a portion of the communication data from the at least one buffer in a format corresponding to the second communication modality with the at least a portion of the communication data corresponding to a time that precedes a modification time responsive at least partly to the at least one modification. By way of example but not limitation, a buffer presentation unit 834 of a second communication device 102-2 may be configured for presenting to a second user 104-2 at least a portion 832 of communication data 824 from at least one buffer 828 in a format corresponding to a second communication modality 106-2 with at least a portion 832 of communication data 824 corresponding to a time 830P that precedes a modification time 830M responsive at least partly to the at least one modification. For certain example implementations, for context, clarity, transition ease, etc., a buffer presentation unit 834 may present to a second user 104-2 a portion 832 of communication data 824 from at least one buffer 828 that precedes a modification time 830M (e.g., a backstep portion of a communication) in a manner that corresponds to a second communication modality 106-2 to which a user interaction communication modality of at least one intimacy setting 204 is being modified. A modification time 830M may comprise, by way of example only, an approximate time a which a modification is requested, an approximate time at which an intimacy setting user interface feature is manipulated, an approximate time at which an intimacy setting is modified (e.g., via actuation or manipulation), an approximate time at which a modification is put into effect, an approximate specified communication modality modification time, an approximate time of transition between storage portions 828(1) and 828(2) of a buffer 828, any combination thereof, and so forth. Approximate times may vary, by way of example only, based on device or network capability, bandwidth, or latency; within a time frame that is imperceptible to humans; any combination thereof; and so forth. However, claimed subject matter is not limited to any particular described embodiments, implementations, examples, etc.

For certain example embodiments, a buffer presentation unit that is configured for presenting to the user at least a portion of the communication data from the at least one buffer in a format corresponding to the second communication modality with the at least a portion of the communication data corresponding to a time that precedes a modification time responsive at least partly to the at least one modification may further be configured for identifying the at least a portion of the communication data to be presented based, at least partly, on a temporal period. By way of example but not limitation, a buffer presentation unit 834 may further be configured for identifying at least a portion 832 of communication data 824 to be presented (e.g., re-presented, but in a manner corresponding to a communication modality to which user interaction is being switched) based, at least partly, on a temporal period. For certain example implementations, a temporal period (e.g., 3 seconds, 5 seconds, 10 seconds, etc.) may at least partially define a size, a location (e.g., in buffer 828), a length, a combination thereof, etc. of a portion 832. A temporal period may be settable by a user to a desired length during a communication or outside of a communication. However, claimed subject matter is not limited to any particular described embodiments, implementations, examples, etc.

For certain example embodiments, a buffer presentation unit that is configured for presenting to the user at least a portion of the communication data from the at least one buffer in a format corresponding to the second communication modality with the at least a portion of the communication data corresponding to a time that precedes a modification time responsive at least partly to the at least one modification may further be configured for identifying the at least a portion of the communication data to be presented based, at least partly, on a person-perceptible communication segment. By way of example but not limitation, a buffer presentation unit 834 may further be configured for identifying at least a portion 832 of communication data 824 to be presented based, at least partly, on a person-perceptible communication segment. For certain example implementations, a person-perceptible communication segment may at least partially define a size, a location (e.g., in buffer 828), a length, a combination thereof, etc. of a portion 832. A person-perceptible communication segment may be settable by a user to a desired value during a communication or outside of a communication. Examples of a person-perceptible communication segment may include, but are not limited to, a particular number of text communications (e.g., one, three, etc.), a particular number of sentences or questions (e.g., three sentences or one question), a portion of a communication in between two quiet periods (e.g., quiet periods lasting half a second or more) from which it may be inferred that a person has paused speaking, a portion of a communication that ends when a person's mouth ceases to move (e.g., for a communication that includes a video communication modality on at least one side), any combination thereof, and so forth. However, claimed subject matter is not limited to any particular described embodiments, implementations, examples, etc.

It should be appreciated that the particular embodiments (e.g., processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain acts, operations, etc. need not be performed in the order described, and they may be modified and/or may be omitted entirely, depending on the circumstances. Moreover, in various implementations, the acts or operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/ or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any one or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, and so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, and so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
    circuitry for interacting with a user for a first portion of a communication in at least one manner corresponding to a first communication modality in accordance with at least one intimacy setting;
    circuitry for discerning an attempt for at least one modification to at least one user interaction communication modality of the at least one intimacy setting during the communication;
    circuitry for verifying if infrastructure is available to accommodate a change of the at least one intimacy setting to a second communication modality responsive at least partly to the circuitry for discerning an attempt for at least one modification, the circuitry for verifying configured to at least partially prevent implementation of a change to the second communication modality if the circuitry for verifying fails to verify that infrastructure is available to accommodate the change, wherein the circuitry for verifying is configured to verify the availability of infrastructure that includes at least network communication infrastructure; and
    circuitry for interacting with the user for a second portion of the communication, when implementation of the change to the second communication modality is not wholly prevented by the circuitry for verifying, in at least one manner corresponding at least in part to the second communication modality in accordance with the at least one intimacy setting responsive at least partly to the circuitry for discerning an attempt for at least one modification; and
    wherein the circuitry for interacting with the user for a second portion of the communication is configured to interact with the user for the second portion of the communication without at least full implementation of the change to the second communication modality when implementation of the change to the second communication modality is at least partially prevented by the circuitry for verifying.

2. The device of claim 1, wherein the circuitry for discerning an attempt for at least one modification to at least one user interaction communication modality of the at least one intimacy setting during the communication comprises:
    circuitry for detecting manipulation of at least one user interface feature that modifies the at least one user interaction communication modality of the at least one intimacy setting.

3. The device of claim 2, wherein the circuitry for detecting manipulation of at least one user interface feature that modifies the at least one user interaction communication modality of the at least one intimacy setting comprises:
    at least one of:
    circuitry for detecting manipulation of at least one physical component that realizes the at least one user interface feature; or
    circuitry for detecting manipulation of at least one virtual component that realizes the at least one user interface feature.

4. The device of claim 1, wherein the circuitry for discerning an attempt for at least one modification to at least one user interaction communication modality of the at least one intimacy setting during the communication comprises:
    at least one of:
    circuitry for detecting actuation of at least one multi-modality communication auto-activation feature that modifies the at least one user interaction communication modality of the at least one intimacy setting; or circuitry for detecting actuation of at least one multi-modality communication remote induction feature that modifies the at least one user interaction communication modality of the at least one intimacy setting.

5. The device of claim 1, wherein:
the circuitry for interacting with a user for a first portion of a communication in at least one manner corresponding to a first communication modality in accordance with at least one intimacy setting includes at least:
  circuitry for accepting user input from the user for the first portion of the communication in at least one manner corresponding to the first communication modality in accordance with the at least one intimacy setting; and
the circuitry for interacting with the user for a second portion of the communication, when implementation of the change to the second communication modality is not wholly prevented by the circuitry for verifying, in at least one manner corresponding at least in part to the second communication modality in accordance with the at least one intimacy setting responsive at least partly to the circuitry for discerning an attempt for at least one modification includes at least:
  circuitry for accepting user input from the user for the second portion of the communication in at least one manner corresponding to the second communication modality in accordance with the at least one intimacy setting as modified by the at least one modification.

6. The device of claim 1, wherein:
the circuitry for interacting with a user for a first portion of a communication in at least one manner corresponding to a first communication modality in accordance with at least one intimacy setting includes at least:
  circuitry for presenting user output to the user for the first portion of the communication in at least one manner corresponding to the first communication modality in accordance with the at least one intimacy setting; and
the circuitry for interacting with the user for a second portion of the communication, when implementation of the change to the second communication modality is not wholly prevented by the circuitry for verifying, in at least one manner corresponding at least in part to the second communication modality in accordance with the at least one intimacy setting responsive at least partly to the circuitry for discerning an attempt for at least one modification includes at least:
  circuitry for presenting user output to the user for the second portion of the communication in at least one manner corresponding to the second communication modality in accordance with the at least one intimacy setting as modified by the at least one modification.

7. The device of claim 1, wherein:
the circuitry for interacting with a user for a first portion of a communication in at least one manner corresponding to a first communication modality in accordance with at least one intimacy setting includes at least:
  circuitry for accepting user input from the user for the first portion of the communication in at least one manner corresponding to the first communication modality in accordance with the at least one intimacy setting; and
  circuitry for presenting user output to the user for the first portion of the communication in at least one manner corresponding to the first communication modality in accordance with the at least one intimacy setting; and the circuitry for interacting with the user for a second portion of the communication, when implementation of the change to the second communication modality is not wholly prevented by the circuitry for verifying, in at least one manner corresponding at least in part to the second communication modality in accordance with the at least one intimacy setting responsive at least partly to the circuitry for discerning an attempt for at least one modification includes at least:
  circuitry for accepting user input from the user for the second portion of the communication in at least one manner corresponding to the first communication modality in accordance with the at least one intimacy setting; and
  circuitry for presenting user output to the user for the second portion of the communication in at least one manner corresponding to the second communication modality in accordance with the at least one intimacy setting as modified by the at least one modification.

8. The device of claim 1, wherein the at least one intimacy setting includes at least one user input interaction communication modality and at least one user output interaction communication modality; and wherein the circuitry for discerning an attempt for at least one modification to at least one user interaction communication modality of the at least one intimacy setting during the communication comprises:
  circuitry for discerning the attempt for at least one modification with respect to the at least one user input interaction communication modality of the at least one intimacy setting.

9. The device of claim 1, wherein the circuitry for discerning an attempt for at least one modification to at least one user interaction communication modality of the at least one intimacy setting during the communication comprises:
  circuitry for discerning that the attempt for at least one modification to the at least one user interaction communication modality of the at least one intimacy setting includes at least a change from the first communication modality to the second communication modality.

10. The device of claim 1, wherein: the first communication modality includes at least one of a voice communication modality, a textual communication modality, or a video communication modality; the second communication modality includes at least one of a voice communication modality, a textual communication modality, or a video communication modality; and the first communication modality is different from the second communication modality.

11. The device of claim 1, further comprising:
  circuitry for discerning an attempt for at least one other modification to the at least one user interaction communication modality of the at least one intimacy setting during the communication; and
  circuitry for interacting with the user for a third portion of the communication in at least one manner corresponding to a third communication modality in accordance with the at least one intimacy setting responsive at least partly to the attempt for at least one other modification.

12. The device of claim 1, further comprising:
  circuitry for discerning an attempt for at least one other modification to the at least one user interaction communication modality of the at least one intimacy setting during the communication; and
  circuitry for interacting with the user for a third portion of the communication in at least one manner corresponding to the first communication modality in accordance with the at least one intimacy setting responsive at least partly to the attempt for at least one other modification.

13. The device of claim 1, further comprising:
circuitry for sending at least one notification to at least one other party that is a participant in the communication responsive at least partly to the attempt for at least one modification, the at least one notification indicative that the device is capable of interacting with the user in at least one manner corresponding to the second communication modality.

14. The device of claim 1, further comprising:
circuitry for sending at least one notification to at least one network communication device that is related to the communication responsive at least partly to the attempt for at least one modification, the at least one notification indicative that the user is to be enabled to interact with the device in at least one manner corresponding to the second communication modality.

15. The device of claim 1, further comprising:
circuitry for receiving at least one notification from at least one other party that is a participant in the communication, the at least one notification indicative that at least one user interaction communication modality of the at least one other party is to change; and
circuitry for presenting to the user a person-perceptible indication that the at least one user interaction communication modality of the at least one other party is to change.

16. The device of claim 1, further comprising:
circuitry for effectuating at least one conversion of communication data at least one of (i) from corresponding to the second communication modality or (ii) to corresponding to the second communication modality responsive at least partly to the attempt for at least one modification.

17. The device of claim 16, wherein the circuitry for effectuating at least one conversion of communication data at least one of (i) from corresponding to the second communication modality or (ii) to corresponding to the second communication modality responsive at least partly to the attempt for at least one modification comprises:
circuitry for converting the communication data at least one of (i) from corresponding to the second communication modality or (ii) to corresponding to the second communication modality.

18. The device of claim 16, wherein the circuitry for effectuating at least one conversion of communication data at least one of (i) from corresponding to the second communication modality or (ii) to corresponding to the second communication modality responsive at least partly to the attempt for at least one modification comprises:
at least one of:
circuitry for requesting that at least one network communication device convert the communication data at least one of (i) from corresponding to the second communication modality or (ii) to corresponding to the second communication modality; or
circuitry for requesting that at least one communication device, which is associated with at least one other party that is a participant in the communication, convert the communication data at least one of (i) from corresponding to the second communication modality or (ii) to corresponding to the second communication modality.

19. The device of claim 1, wherein the circuitry for verifying if infrastructure is available to accommodate a change of the at least one intimacy setting to the second communication modality responsive at least partly to the circuitry for discerning an attempt for at least one modification comprises:
circuitry for determining if current capabilities of the infrastructure are sufficient for the change of the at least one intimacy setting to the second communication modality responsive at least partly to the attempt for at least one modification, the circuitry for determining configured to perform the determining at least partly based on one or more indications of competing demands on the infrastructure.

20. The device of claim 1, wherein the circuitry for verifying if infrastructure is available to accommodate a change of the at least one intimacy setting to the second communication modality responsive at least partly to the circuitry for discerning an attempt for at least one modification comprises:
circuitry for verifying if a current network connection is capable of supporting the second communication modality with respect to at least the device, the circuitry for verifying a current network connection configured to verify a current network connection at least partly by checking at least one of if the current network connection offers adequate bandwidth for the second communication modality, if the current network connection meets a minimum latency requirement with respect to the second communication modality, or if use of the current network connection for the second communication modality violates at least one of a service or a usage agreement.

21. The device of claim 1, wherein the circuitry for verifying if infrastructure is available to accommodate a change of the at least one intimacy setting to the second communication modality responsive at least partly to the circuitry for discerning an attempt for at least one modification comprises:
circuitry for verifying if conversion functionality is accessible for application to the communication with regard to communication data corresponding to the second communication modality.

22. A device comprising:
circuitry for interacting with a user for a first portion of a communication in at least one manner corresponding to a first communication modality in accordance with at least one intimacy setting;
circuitry for discerning an attempt for at least one modification to at least one user interaction communication modality of the at least one intimacy setting;
circuitry for verifying if infrastructure is available to accommodate a change of the at least one intimacy setting to a second communication modality responsive at least partly to the circuitry for discerning an attempt for at least one modification, the circuitry for verifying configured to at least partially prevent implementation of the change to the second communication modality if the circuitry for verifying fails to verify that infrastructure is available to accommodate the change, wherein the circuitry for verifying is configured to verify the availability of infrastructure that includes at least network communication infrastructure;
circuitry for interacting with the user for a second portion of the communication, when implementation of the change to the second communication modality is not wholly prevented by the circuitry for verifying, in at least one manner at least in part corresponding to the second communication modality in accordance with the at least one intimacy setting responsive at least partly to the circuitry for discerning an attempt for at least one modification and wherein the circuitry for interacting with the user for a second portion of the communication is configured to interact with the user for the second portion of the communication without at least full implementation of the change to the second communication modality when implementation of the change to the second communication modality is at least partially prevented by the circuitry for verifying; and circuitry for storing in at least one buffer communication data for the communication in at least one format corresponding to at least one of the first communication modality or the second communication modality.

23. The device of claim 22, wherein the circuitry for storing in at least one buffer communication data for the communication in at least one format corresponding to at least one of the first communication modality or the second communication modality comprises:

circuitry for storing in the at least one buffer communication data for the communication in a first format corresponding to the first communication modality and in a second format corresponding to the second communication modality.

24. The device of claim 23, further comprising:

circuitry for providing at least one user interface that enables the user to re-present at least a previously presented portion of the communication and to switch back and forth at least between (i) experiencing a re-presentation in at least one manner corresponding to the first communication modality based at least in part on retrieving data stored in the at least one buffer in a first format corresponding to the first communication modality and (ii) experiencing a re-presentation in at least one manner corresponding to the second communication modality using the communication data that is stored in the at least one buffer based at least in part on retrieving data stored in the at least one buffer in a second format corresponding to the second communication modality.

25. The device of claim 22, further comprising:

circuitry for presenting to the user at least a portion of the communication data from the at least one buffer in at least one manner corresponding to the second communication modality with the at least a portion of the communication data corresponding to a time that precedes a modification time responsive at least partly to the attempt for at least one modification.

26. The device of claim 25, wherein the circuitry for presenting to the user at least a portion of the communication data from the at least one buffer in at least one manner corresponding to the second communication modality with the at least a portion of the communication data corresponding to a time that precedes a modification time responsive at least partly to the attempt for at least one modification comprises:

circuitry for identifying at least a length of the at least a portion of the communication data to be presented based at least partly on at least one temporal period.

27. The device of claim 25, wherein the circuitry for presenting to the user at least a portion of the communication data from the at least one buffer in at least one manner corresponding to the second communication modality with the at least a portion of the communication data corresponding to a time that precedes a modification time responsive at least partly to the attempt for at least one modification comprises:

circuitry for identifying the at least a portion of the communication data to be presented based at least partly on at least one person-perceptible communication segment.

28. A communication device for handling multi-modality communication modification, the computing device comprising:

at least one interaction unit configured for interacting with a user for a first portion of a communication in at least one manner corresponding to a first communication modality in accordance with at least one intimacy setting;

at least one modification discernment unit configured for discerning an attempt for at least one modification to at least one user interaction communication modality of the at least one intimacy setting during the communication; and at least one verification unit configured for verifying if infrastructure is available to accommodate a change of the at least one intimacy setting to a second communication modality responsive at least partly to the at least one modification discernment unit, the at least one verification unit further configured to at least partially prevent implementation of the change to the second communication modality if the at least one verification unit fails to verify that infrastructure is available to accommodate the change, wherein the at least one verification unit is configured to verify the availability of infrastructure that includes at least network communication infrastructure; and wherein the at least one interaction unit is further configured for interacting, when implementation to the second communication modality is not wholly prevented by the at least one verification unit, with the user for a second portion of the communication in at least one manner corresponding at least in part to the second communication modality in accordance with the at least one intimacy setting responsive at least partly to the at least one modification discernment unit; and wherein the at least one interaction unit is further configured to interact with the user for the second portion of the communication without at least full implementation of the change to the second communication modality when implementation of the change to the second communication modality is at least partially prevented by the at least one verification unit.

29. One or more processor-accessible non-transitory media bearing processor executable instructions, the processor executable instructions comprising:

one or more instructions for interacting with a user for a first portion of a communication in at least one manner corresponding to a first communication modality in accordance with at least one intimacy setting;

one or more instructions for discerning an attempt for at least one modification to at least one user interaction communication modality of the at least one intimacy setting during the communication;

one or more instructions for verifying if infrastructure is available to accommodate a change of the at least one intimacy setting to a second communication modality responsive at least partly to the one or more instructions for discerning an attempt for at least one modification, the one or more instructions for verifying configured to at least partially prevent implementation of the change to the second communication modality if the one or more instructions for verifying fail to verify that infrastructure is available to accommodate the change, wherein the one or more instructions for verifying are configured to verify the availability of infrastructure that includes at least network communication infrastructure; and one or more instructions for interacting with the user for a second portion of the communication, when implementation of the change to the second communication modality is not wholly prevented by the one or more instructions for verifying, in at least one manner corresponding at least in part to the second communication modality in accordance with the at least one intimacy setting responsive at least partly to the one or more instructions for discerning an attempt for at least one modification; and wherein the one or more instructions for interacting with the user for a second portion of the communication are configured to interact with the user for the second portion of the communication without at least full implementation of the change to the second communication modality when implementation of the change to the second communication modality is at least partially prevented by the one or more instructions for verifying.

30. The device of claim 1, wherein said circuitry for verifying if infrastructure is available to accommodate a change of the at least one intimacy setting to the second communication modality responsive at least partly to the circuitry for discerning an attempt for at least one modification, the circuitry for verifying configured to at least partially prevent implementation of a change to the second communication modality if the circuitry for verifying fails to verify that infrastructure is available to accommodate the change, wherein the circuitry for verifying is configured to verify the availability of infrastructure that includes at least network communication infrastructure comprises:

circuitry for at least partially preventing implementation of the change to the second communication modality by at least one of cancelling or rolling back communication data corresponding to the second communication modality.

31. The device of claim 1, wherein said circuitry for verifying if infrastructure is available to accommodate a change of the at least one intimacy setting to a second communication modality responsive at least partly to the circuitry for discerning an attempt for at least one modification, the circuitry for verifying configured to at least partially prevent implementation of a change to the second communication modality if the circuitry for verifying fails to verify that infrastructure is available to accommodate the change, wherein the circuitry for verifying is configured to verify the availability of infrastructure that includes at least network communication infrastructure comprises:

circuitry for issuing at least one of a warning or an error message to a user regarding implementation of the change of the at least one intimacy setting to the second communication modality.

32. The device of claim 1, wherein the circuitry for verifying if infrastructure is available to accommodate a change of the at least one intimacy setting to the second communication modality responsive at least partly to the circuitry for discerning an attempt for at least one modification comprises:

circuitry for determining if one or more absolute capabilities of the infrastructure, without regard to competing demand on the infrastructure, are sufficient for the change of the at least one intimacy setting to the second communication modality responsive at least partly to the attempt for at least one modification.

33. The device of claim 1, wherein the circuitry for verifying if infrastructure is available to accommodate a change of the at least one intimacy setting to a second communication modality responsive at least partly to the circuitry for discerning an attempt for at least one modification, the circuitry for verifying configured to at least partially prevent implementation of a change to the second communication modality if the circuitry for verifying fails to verify that infrastructure is available to accommodate the change, wherein the circuitry for verifying is configured to verify the availability of infrastructure that includes at least network communication infrastructure comprises:

circuitry for verifying that is configured to verify availability of network communication infrastructure that includes at least one of a network device, a network connection, or a device configured to provide conversion functionality.

* * * * *

UNITED STATES PATENT AND TRADEMARK OFFICE
CERTIFICATE OF CORRECTION

PATENT NO.        : 9,503,550 B2
APPLICATION NO.   : 13/374079
DATED             : November 22, 2016
INVENTOR(S)       : Levien et al.

It is certified that error appears in the above-identified patent and that said Letters Patent is hereby corrected as shown below:

In the Claims

Column 52, Line 23, Claim 20 delete "checking at least one of if the current network" and insert --checking at least one of the current network--

Column 52, Line 33, Claim 21 delete "change of the at least one intimacy setting to the second" and insert --change of the at least one intimacy setting to a second--

Column 55, Line 26, Claim 30 delete "change of the at least one intimacy setting to the second" and insert --change of the at least one intimacy setting to a second--

Column 55, Line 38, Claim 30 delete "by at least one of cancelling or rolling back" and insert --by at least rolling back--

Column 56, Line 16, Claim 32 delete "change of the at least one intimacy setting to the second" and insert --change of the at least one intimacy setting to a second--

Signed and Sealed this
Fourteenth Day of March, 2017

Michelle K. Lee
*Director of the United States Patent and Trademark Office*